United States Patent
Worley et al.

(10) Patent No.: US 12,480,961 B2
(45) Date of Patent: Nov. 25, 2025

(54) METHODS FOR DIAGNOSING ALZHEIMER'S DISEASE AND OTHER NEUROLOGICAL DISORDERS

(71) Applicants: Cognext Diagnostics LLC, Baltimore, MD (US); The Johns Hopkins University, Baltimore, MD (US)

(72) Inventors: Paul F. Worley, Baltimore, MD (US); Meifang Xiao, Lutherville-Timonium, MD (US); Desheng Xu, Lutherville-Timonium, MD (US)

(73) Assignees: Cognext Diagnostics LLC, Baltimore, MD (US); The Johns Hopkins University, Baltimore, MD (US)

( * ) Notice: Subject to any disclaimer, the term of this patent is extended or adjusted under 35 U.S.C. 154(b) by 508 days.

(21) Appl. No.: 17/553,173

(22) Filed: Dec. 16, 2021

(65) Prior Publication Data
US 2022/0187321 A1    Jun. 16, 2022

Related U.S. Application Data

(60) Provisional application No. 63/126,411, filed on Dec. 16, 2020.

(51) Int. Cl.
*G01N 33/68* (2006.01)
*C12Q 1/6851* (2018.01)

(52) U.S. Cl.
CPC ....... *G01N 33/6896* (2013.01); *C12Q 1/6851* (2013.01); *G01N 2800/2814* (2013.01); *G01N 2800/52* (2013.01)

(58) Field of Classification Search
CPC ........... G01N 33/6896; G01N 2800/52; G01N 2800/2814; C12Q 1/6851; C12Q 1/6804
See application file for complete search history.

(56) References Cited

U.S. PATENT DOCUMENTS

| | | | |
|---|---|---|---|
| 10,222,386 B2 * | 3/2019 | Worley | G01N 33/566 |
| 10,914,749 B2 * | 2/2021 | Worley | G01N 33/6851 |
| 2017/0292963 A1 | 10/2017 | Worley et al. | |

FOREIGN PATENT DOCUMENTS

WO    WO-2007/108756 A1    9/2007

OTHER PUBLICATIONS

"NPTX2 Modulator Cognitive Vitality Reports," Alzheimer's Drug Discovery Foundation, <https://www.alzdiscovery.org/uploads/cognitive_vitality_media/NPTX2-Modulator.pdf>, dated Jul. 20, 2020 (16 pages).
Bagchi et al., "In Situ Proximity Ligation Assay (PLA)," Methods Mol Biol. 1318:149-59 (2015) (12 pages).
Belbin et al., "Cerebrospinal fluid profile of NPTX2 supports role of Alzheimer's disease-related inhibitory circuit dysfunction in adults with Down syndrome," Mol Neurodegener. 15(1):46 (2020) (10 pages).
International Search Report and Written Opinion for International Application No. PCT/US21/63843, mailed Mar. 15, 2022 (13 pages).
Lim, Bryant Bak-Yin, Thesis: "Clinical Validation of Neuronal Pentraxin Receptor as a Candidate Biomarker for Alzheimer's Disease," Master of Science in Laboratory Medicine and Pathobiology, University of Toronto, 2020 (50 pages).
Ma et al., "Neuronal pentraxin 1: A synaptic-derived plasma biomarker in Alzheimer's disease," available in PMC May 3, 2021, published in final edited form as: Neurobiol Dis. 114:120-8 (2018) (21 pages).
Shao et al., "Association between serum NPTX2 and cognitive function in patients with vascular dementia," Brain Behav. 10(10):e01779 (2020) (6 pages).
Van der Ende et al., "Neuronal pentraxin 2: a synapse-derived CSF biomarker in genetic frontotemporal dementia," J Neurol Neurosurg Psychiatry. 91(6):612-21 (2020).
Van Steenoven et al., "Identification of novel cerebrospinal fluid biomarker candidates for dementia with Lewy bodies: a proteomic approach, " Mol Neurodegener. 15(1):36 (2020) (15 pages).
Yin et al., "Neuronal pentraxin receptor in cerebrospinal fluid as a potential biomarker for neurodegenerative diseases," Brain Res. 1265:158-70 (2009).
Camporesi et al., "Fluid Biomarkers for Synaptic Dysfunction and Loss," Biomark Insights. 15:1177271920950319 (Aug. 2020) (17 pages).
Dulewicz et al., "Neurogranin and VILIP-1 as Molecular Indicators of Neurodegeneration in Alzheimer's Disease: A Systematic Review and Meta-Analysis," Int J Mol Sci. 21(21):8335 (Nov. 2020) (19 pages).
Xiao et al., "NPTX2 and cognitive dysfunction in Alzheimer's Disease," Elife. 6:e23798 (Mar. 2017) (47 pages).

* cited by examiner

*Primary Examiner* — Olga N Chernyshev
(74) *Attorney, Agent, or Firm* — Clark & Elbing LLP

(57) ABSTRACT

Disclosed herein are methods for diagnosing a subject as having a neurological disorder, such as Alzheimer's disease, using proximity-based detection assays capable of detecting complexes containing two or more synaptic proteins, such as neuronal pentraxins, from a blood, cerebrospinal fluid, or other fluid sample of the subject. Also disclosed are methods of evaluating and monitoring subjects having or at risk of developing a neurological disorder using the aforementioned assays.

8 Claims, 17 Drawing Sheets

Specification includes a Sequence Listing.

SEQUENCE LISTING

```
<160> NUMBER OF SEQ ID NOS: 5

<210> SEQ ID NO 1
<211> LENGTH: 59
<212> TYPE: DNA
<213> ORGANISM: Artificial Sequence
<220> FEATURE:
<223> OTHER INFORMATION: Synthetic Construct

<400> SEQUENCE: 1
cgcatcgccc ttggactacg actgacgaac cgctttgcct gactgatcgc taaatcgtg      59

<210> SEQ ID NO 2
<211> LENGTH: 61
<212> TYPE: DNA
<213> ORGANISM: Artificial Sequence
<220> FEATURE:
<223> OTHER INFORMATION: Synthetic Construct

<400> SEQUENCE: 2
tcgtgtctaa agtccgttac cttgattccc ctaaccctct tgaaaaattc ggcatcggtg      60
a                                                                     61

<210> SEQ ID NO 3
<211> LENGTH: 26
<212> TYPE: DNA
<213> ORGANISM: Artificial Sequence
<220> FEATURE:
```

```
<223> OTHER INFORMATION: Synthetic Construct

<400> SEQUENCE: 3
tacttagaca cgacacgatt tagttt                                              26

<210> SEQ ID NO 4
<211> LENGTH: 19
<212> TYPE: DNA
<213> ORGANISM: Artificial Sequence
<220> FEATURE:
<223> OTHER INFORMATION: Synthetic Construct

<400> SEQUENCE: 4
catcgccctt ggactacga                                                      19

<210> SEQ ID NO 5
<211> LENGTH: 24
<212> TYPE: DNA
<213> ORGANISM: Artificial Sequence
<220> FEATURE:
<223> OTHER INFORMATION: Synthetic Construct

<400> SEQUENCE: 5
gggaatcaag gtaacggact ttag                                                24
```

METHODS FOR DIAGNOSING ALZHEIMER'S DISEASE AND OTHER NEUROLOGICAL DISORDERS

STATEMENT AS TO FEDERALLY SPONSORED RESEARCH

This invention was made with government support under R35NS097966 awarded by of the National Institutes of Health. The government has certain rights in the invention.

SEQUENCE LISTING

The instant application contains a Sequence Listing which has been submitted electronically in ASCII format and is hereby incorporated by reference in its entirety. Said ASCII copy, created on Dec. 14, 2021 is named "51556-002002_Sequence_Listing_12_14_21_ST25" and is 1,354 bytes in size.

FIELD OF THE INVENTION

The disclosure relates to methods for diagnosing Alzheimer's disease and other neurological disorders.

BACKGROUND

Neurodegeneration is a pathophysiological process that is observed in a number of diseases associated with progressive dementia, such as Alzheimer's disease (AD). A key feature of this process is the neuronal degeneration and death that causes the wholesale destruction of brain tissue and an accompanying gamut of cognitive and behavioral deficits including cognitive decline, language impairments, and memory loss, among others.

AD is a late-onset neurodegenerative disorder responsible for the majority of dementia cases in the elderly. AD patients suffer from a progressive cognitive decline characterized by symptoms including an insidious loss of short- and long-term memory, attention deficits, language-specific problems, disorientation, impulse control, social withdrawal, anhedonia, and other symptoms. Distinguishing neuropathological features of AD are extracellular aggregates of amyloid-β plaques and neurofibrillary tangles composed of hyperphosphorylated microtubule-associated tau proteins. Accumulation of these aggregates is associated with neuronal loss and atrophy in a number of brain regions including the frontal, temporal, and parietal lobes of the cerebral cortex as well as subcortical structures like the basal forebrain cholinergic system and the locus coeruleus within the brainstem. These distinguishing diagnostic hallmarks, although highly indicative of a disease burden, are often discovered long after symptom onset or posthumously. Thus, there exists a need for improved methods of diagnosing subjects as having or at risk of developing AD and other neurological disorders.

SUMMARY OF THE INVENTION

In a first aspect, the present disclosure provides a method of identifying a subject as having or at risk of developing a neurological disorder, the method including the steps of: (i) contacting a blood sample obtained from the subject with a first affinity ligand specific to a first synaptic protein selected from the group consisting of neuronal pentraxin 2 (NPTX2), neuronal pentraxin 1 (NPTX1), and neuronal pentraxin receptor (NPTXR) and a second affinity ligand specific to a second synaptic protein selected from the group consisting of NPTX2, NPTX1, and NPTXR, wherein the first and second synaptic proteins are in a first complex, wherein the contacting produces a second complex that includes the first affinity ligand, the first synaptic protein, the second affinity ligand, and the second synaptic protein, wherein the first and second synaptic proteins are different proteins, and wherein the first affinity ligand is conjugated to an oligonucleotide plus strand and the second affinity ligand is conjugated to an oligonucleotide minus strand; (ii) contacting the second complex with a single-stranded connector oligonucleotide and a ligase enzyme, thereby producing a ligated plus-minus oligonucleotide strand (LPMOS), wherein the LPMOS is capable of hybridizing to a forward primer oligonucleotide and a reverse primer oligonucleotide; (iii) performing amplification on the LPMOS, wherein the amplification produces a proximity signal when the first synaptic protein is within a proximity distance threshold with respect to the second synaptic protein; and (iv) detecting the proximity signal in the blood sample, wherein the proximity signal indicates an amount of the first complex in the blood sample; wherein an increase in the amount of the first complex in the blood sample of the subject as compared to an amount of a first complex in a reference blood sample identifies the subject as having or at risk of developing the neurological disorder.

In another aspect, the disclosure provides a method of identifying a subject as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR and a second affinity ligand specific to a second synaptic protein, wherein the first and second synaptic proteins are in a first complex, wherein the contacting produces a second complex that includes the first affinity ligand, the first synaptic protein, the second affinity ligand, and the second synaptic protein, wherein the first and second synaptic proteins are different proteins, and wherein the first affinity ligand is conjugated to an oligonucleotide plus strand and the second affinity ligand is conjugated to an oligonucleotide minus strand; (ii) contacting the second complex with a single-stranded connector oligonucleotide and a ligase enzyme, thereby producing a LPMOS, wherein the LPMOS is capable of hybridizing to a forward primer oligonucleotide and a reverse primer oligonucleotide; (iii) performing amplification on the LPMOS, wherein the amplification produces a proximity signal when the first synaptic protein is within a proximity distance threshold with respect to the second synaptic protein; and (iv) detecting the proximity signal in the blood sample, wherein the proximity signal indicates an amount of the first complex in the blood sample; wherein a decrease in the amount of the first complex in the blood sample of the subject as compared to an amount of a first complex in a reference blood sample identifies the subject as having or at risk of developing the neurological disorder.

In another aspect, the disclosure provides a method of identifying a subject as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR and a second affinity ligand specific to a second synaptic protein, wherein the first and second synaptic proteins are in a first complex, wherein the contacting produces a second complex that includes the first affinity ligand, the first synaptic protein, the second affinity ligand, and the second synaptic protein, wherein the first and second synaptic proteins are different proteins, and wherein the first affinity ligand is conjugated to a first oligonucleotide plus strand and the second affinity ligand is conjugated to a second oligonucleotide minus strand; (ii) contacting the second complex with a single-stranded connector oligonucleotide and a ligase enzyme, thereby producing a first LPMOS, wherein the first LPMOS is capable of hybridizing to a first forward primer oligonucleotide and a first reverse primer oligonucleotide; (iii) performing amplification on the first LPMOS, wherein the amplification produces a first proximity signal when the first synaptic protein is within a proximity distance threshold with respect to the second synaptic protein; (iv) detecting the first proximity signal in the blood sample, wherein the first proximity signal indicates an amount of the first complex in the blood sample; (v) contacting a blood sample obtained from the subject with a third affinity ligand specific to a third synaptic protein selected from the group consisting of NPTX2, NPTX1, and NPTXR, and a fourth affinity ligand specific to a fourth synaptic protein selected from the group consisting of NPTX2, NPTX1, and NPTXR, wherein the third and fourth synaptic proteins are in a third complex, wherein the contacting produces a fourth complex that includes the third affinity ligand, the third synaptic protein, the fourth affinity ligand, and the fourth synaptic protein, wherein the third and fourth synaptic proteins are different proteins, and wherein the third affinity ligand is conjugated to a second oligonucleotide plus strand and the fourth affinity ligand is conjugated to a second oligonucleotide minus strand; (vi) contacting the fourth complex with a second single-stranded connector oligonucleotide and a ligase enzyme, thereby producing a second LPMOS, wherein the second LPMOS is capable of hybridizing to a second forward primer oligonucleotide and a second reverse primer oligonucleotide; (vii) performing amplification on the second LPMOS, wherein the amplification produces a second proximity signal when the third synaptic protein is within a proximity distance threshold with respect to the fourth synaptic protein; and (viii) detecting the second proximity signal in the blood sample, wherein the second proximity signal indicates an amount of the third complex in the blood sample; and (ix) quantifying a ratio of the first complex to the third complex by dividing the amount of the first complex by the amount of the third complex; wherein a decrease in the ratio of the first complex to the third complex in the blood sample of the subject as compared to a ratio of a first complex to a third complex in a reference blood sample identifies the subject as having or at risk of developing the neurological disorder. In some embodiments, the method further comprises contacting the blood sample with an immobilized affinity ligand specific to the third synaptic protein.

In another aspect, the disclosure provides a method of identifying a subject as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR and a second affinity ligand specific to a second synaptic protein selected from the group consisting of NPTX2, NPTX1, and NPTXR, wherein the first and second synaptic proteins are in a first complex, wherein the first and second synaptic proteins are different proteins; and (ii) determining an amount of the first complex in the blood sample of the subject; wherein an increase in the amount of the first complex in the blood sample of the subject as compared to an amount of a first complex in a reference blood sample identifies the subject as having or at risk of developing the neurological disorder. In some embodiments, the first affinity ligand is conjugated to a first proximity detector and the second affinity ligand is conjugated to a second proximity detector.

In another aspect, the disclosure provides a method of identifying a subject as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR and a second affinity ligand specific to a second synaptic protein, wherein the first and second synaptic proteins are in a first complex, wherein the first and second synaptic proteins are different proteins; and (ii) determining an amount of the first complex in the blood sample of the subject; wherein a decrease in the amount of the first complex in the blood sample of the subject as compared to an amount of a first complex in a reference blood sample identifies the subject as having or at risk of developing the neurological disorder. In some embodiments, the first affinity ligand is conjugated to a first proximity detector and the second affinity ligand is conjugated to a second proximity detector.

In another aspect, the disclosure provides a method of identifying a subject as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR and a second affinity ligand specific to a second synaptic protein, and a second affinity ligand specific to a second synaptic protein, wherein the first and second synaptic proteins are in a first complex, wherein the first and second synaptic proteins are different proteins; (ii) determining an amount of the first complex in the blood sample of the subject; (iii) contacting a blood sample obtained from the subject with a third affinity ligand specific to a third synaptic protein selected from the group consisting of NPTX2, NPTX1, and NPTXR and a fourth affinity ligand specific to a fourth synaptic protein selected from the group consisting of NPTX2, NPTX1, and NPTXR, wherein the third and fourth synaptic proteins are in a second complex, wherein the third and fourth synaptic proteins are different proteins; (iv) determining an amount of the second complex in the blood sample of the subject; and (v) quantifying a ratio of the first complex to the second complex by dividing the amount of the first complex by the amount of the second complex; wherein a decrease in the ratio of the first complex to the second complex in the blood sample of the subject as compared to a ratio of the first complex to the second complex in a reference blood sample identifies the subject as having or at risk of developing the neurological disorder. In some embodiments, the method further comprises contacting the blood sample with an immobilized affinity ligand specific to the third synaptic protein. In some embodiments, the first affinity ligand comprises (e.g., is conjugated to) a first proximity detector and the second affinity ligand comprises a second proximity detector. In some embodiments, the third affinity ligand comprises a third proximity detector and the fourth affinity ligand comprises a fourth proximity detector.

In another aspect, the disclosure provides a method of selecting a subject identified as having or at risk of developing a neurological disorder for treatment with a therapeutic agent, the method including the steps of: (i) contacting a blood sample obtained from the subject with a first affinity ligand specific to a first synaptic protein selected from the group consisting of NPTX2, NPTX1, and NPTXR and a second affinity ligand specific to a second synaptic protein selected from the group consisting of NPTX2, NPTX1, and NPTXR, wherein the first and second synaptic proteins are in a first complex, wherein the contacting produces a second complex that includes the first affinity ligand, the first synaptic protein, the second affinity ligand, and the second synaptic protein, wherein the first and second synaptic proteins are different proteins, and wherein the first affinity ligand is conjugated to an oligonucleotide plus strand and the second affinity ligand is conjugated to an oligonucleotide minus strand; (ii) contacting the second complex with a single-stranded connector oligonucleotide and a ligase enzyme, thereby producing a LPMOS, wherein the LPMOS is capable of hybridizing to a forward primer oligonucleotide and a reverse primer oligonucleotide; (iii) performing amplification on the LPMOS, wherein the amplification produces a proximity signal when the first synaptic protein is within a proximity distance threshold with respect to the second synaptic protein; and (iv) detecting the proximity signal in the blood sample, wherein the proximity signal indicates an amount of the first complex in the blood sample; wherein the subject is selected for treatment with the therapeutic agent if the amount of the first complex in the blood sample of the subject is increased as compared to an amount of a first complex in a reference blood sample.

In another aspect, the disclosure provides a method of selecting a subject identified as having or at risk of developing a neurological disorder for treatment with a therapeutic agent, the method including the steps of: (i) contacting a blood sample obtained from the subject with a first affinity ligand specific to a first synaptic protein selected from the group consisting of NPTX2, NPTX1, and NPTXR and a second affinity ligand specific to a second synaptic protein, wherein the first and second synaptic proteins are in a first complex, wherein the contacting produces a second complex that includes the first affinity ligand, the first synaptic protein, the second affinity ligand, and the second synaptic protein, wherein the first and second synaptic proteins are different proteins, and wherein the first affinity ligand is conjugated to an oligonucleotide plus strand and the second affinity ligand is conjugated to an oligonucleotide minus strand; (ii) contacting the second complex with a single-stranded connector oligonucleotide and a ligase enzyme, thereby producing a LPMOS, wherein the LPMOS is capable of hybridizing to a forward primer oligonucleotide and a reverse primer oligonucleotide; (iii) performing amplification on the LPMOS, wherein the amplification produces a proximity signal when the first synaptic protein is within a proximity distance threshold with respect to the second synaptic protein; and (iv) detecting the proximity signal in the blood sample, wherein the proximity signal indicates an amount of the first complex in the blood sample; wherein the subject is selected for treatment with the therapeutic agent if the amount of the first complex in the blood sample of the subject is decreased as compared to an amount of a first complex in a reference blood sample In another aspect, the disclosure provides a method of selecting a subject identified as having or at risk of developing a neurological disorder for treatment with a therapeutic agent, the method including the steps of: (i) contacting a blood sample obtained from the subject with a first affinity ligand specific to a first synaptic protein selected from the group consisting of NPTX2, NPTX1, and NPTXR and a second affinity ligand specific to a second synaptic protein, wherein the first and second synaptic proteins are in a first complex, wherein the contacting produces a second complex that includes the first affinity ligand, the first synaptic protein, the second affinity ligand, and the second synaptic protein, wherein the first and second synaptic proteins are different proteins, and wherein the first affinity ligand is conjugated to a first oligonucleotide plus strand and the second affinity ligand is conjugated to a second oligonucleotide minus strand; (ii) contacting the second complex with a single-stranded connector oligonucleotide and a ligase enzyme, thereby producing a first LPMOS, wherein the first LPMOS is capable of hybridizing to a first forward primer oligonucleotide and a first reverse primer oligonucleotide; (iii) performing amplification on the first LPMOS, wherein the amplification produces a first proximity signal when the first synaptic protein is within a proximity distance threshold with respect to the second synaptic protein; (iv) detecting the first proximity signal in the blood sample, wherein the first proximity signal indicates an amount of the first complex in the blood sample; (v) contacting a blood sample obtained from the subject with a third affinity ligand specific to a third synaptic protein selected from the group consisting of NPTX2, NPTX1, and NPTXR, and a fourth affinity ligand specific to a fourth synaptic protein selected from the group consisting of NPTX2, NPTX1, and NPTXR, wherein the third and fourth synaptic proteins are in a third complex, wherein the contacting produces a fourth complex that includes the third affinity ligand, the third synaptic protein, the fourth affinity ligand, and the fourth synaptic protein, wherein the third and fourth synaptic proteins are different proteins, and wherein the third affinity ligand is conjugated to a second oligonucleotide plus strand and the fourth affinity ligand is conjugated to a second oligonucleotide minus strand; (vi) contacting the fourth complex with a second single-stranded connector oligonucleotide and a ligase enzyme, thereby producing a second LPMOS, wherein the second LPMOS is capable of hybridizing to a second forward primer oligonucleotide and a second reverse primer oligonucleotide; (vii) performing amplification on the second LPMOS, wherein the amplification produces a second proximity signal when the third synaptic protein is within a proximity distance threshold with respect to the fourth synaptic protein; and (viii) detecting the second proximity signal in the blood sample, wherein the second proximity signal indicates an amount of the third complex in the blood sample; and (ix) quantifying a ratio of the first complex to the third complex by dividing the amount of the first complex by the amount of the third complex; wherein the subject is selected for treatment with the therapeutic agent if the ratio of the first complex to the third complex in the blood sample of the subject is decreased as compared to a ratio of a first complex to a third complex in a reference blood sample. In some embodiments, the method further comprises contacting the blood sample with an immobilized affinity ligand specific to the third synaptic protein.

In another aspect, the disclosure provides a method of selecting a subject identified as having or at risk of developing a neurological disorder for treatment with a therapeutic agent, the method including the steps of: (i) contacting a blood sample obtained from the subject with a first affinity ligand specific to a first synaptic protein selected from the group consisting of NPTX2, NPTX1, and NPTXR and a second affinity ligand specific to a second synaptic protein selected from the group consisting of NPTX2, NPTX1, and NPTXR, wherein the first and second synaptic proteins are in a first complex, wherein the first and second synaptic proteins are different proteins; and (ii) determining an amount of the first complex in the blood sample of the subject; wherein the subject is selected for treatment with the therapeutic agent if the amount of the first complex in the blood sample of the subject is increased as compared to an amount of a first complex in a reference blood sample. In some embodiments, the first affinity ligand is conjugated to a first proximity detector and the second affinity ligand is conjugated to a second proximity detector.

In another aspect, the disclosure provides a method of selecting a subject identified as having or at risk of developing a neurological disorder for treatment with a therapeutic agent, the method including the steps of: (i) contacting a blood sample obtained from the subject with a first affinity ligand specific to a first synaptic protein selected from the group consisting of NPTX2, NPTX1, and NPTXR and a second affinity ligand specific to a second synaptic protein, wherein the first and second synaptic proteins are in a first complex, wherein the first and second synaptic proteins are different proteins; and (ii) determining an amount of the first complex in the blood sample of the subject; wherein the subject is selected for treatment with the therapeutic agent if the amount of the first complex in the blood sample of the subject is decreased as compared to an amount of a first complex in a reference blood sample. In some embodiments, the first affinity ligand is conjugated to a first proximity detector and the second affinity ligand is conjugated to a second proximity detector.

In another aspect, the disclosure provides a method of selecting a subject identified as having or at risk of developing a neurological disorder for treatment with a therapeutic agent, the method including the steps of: (i) contacting a blood sample obtained from the subject with a first affinity ligand specific to a first synaptic protein selected from the group consisting of NPTX2, NPTX1, and NPTXR and a second affinity ligand specific to a second synaptic protein, and a second affinity ligand specific to a second synaptic protein, wherein the first and second synaptic proteins are in a first complex, wherein the first and second synaptic proteins are different proteins; and (ii) determining an amount of the first complex in the blood sample of the subject; (iii) contacting a blood sample obtained from the subject with a third affinity ligand specific to a third synaptic protein selected from the group consisting of NPTX2, NPTX1, and NPTXR and a fourth affinity ligand specific to a fourth synaptic protein selected from the group consisting of NPTX2, NPTX1, and NPTXR, wherein the third and fourth synaptic proteins are in a second complex, wherein the third and fourth synaptic proteins are different proteins; (iv) determining an amount of the second complex in the blood sample of the subject; and (v) quantifying a ratio of the first complex to the second complex by dividing the amount of the first complex by the amount of the second complex; wherein the subject is selected for treatment with the therapeutic agent if the ratio of the first complex to the second complex in the blood sample of the subject is decreased as compared to a ratio of a first complex to a second complex in a reference blood sample. In some embodiments, the first affinity comprises a first proximity detector and the second affinity ligand comprises a second proximity detector. In some embodiments, the third affinity ligand comprises a third proximity detector and the fourth affinity ligand comprises a fourth proximity detector. In some embodiments, the method further comprises contacting the blood sample with an immobilized affinity ligand specific to the third synaptic protein.

In another aspect, the disclosure provides a method of assessing resilience in a subject identified as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR and a second affinity ligand specific to a second synaptic protein selected from the group consisting of NPTX2, NPTX1, and NPTXR, wherein the first and second synaptic proteins are in a first complex, wherein the contacting produces a second complex that includes the first affinity ligand, the first synaptic protein, the second affinity ligand, and the second synaptic protein, wherein the first and second synaptic proteins are different proteins, and wherein the first affinity ligand is conjugated to an oligonucleotide plus strand and the second affinity ligand is conjugated to an oligonucleotide minus strand; (ii) contacting the second complex with a single-stranded connector oligonucleotide and a ligase enzyme, thereby producing a LPMOS, wherein the LPMOS is capable of hybridizing to a forward primer oligonucleotide and a reverse primer oligonucleotide; (iii) performing amplification on the LPMOS, wherein the amplification produces a proximity signal when the first synaptic protein is within a proximity distance threshold with respect to the second synaptic protein; and (iv) detecting the proximity signal in the blood sample, wherein the proximity signal indicates an amount of the first complex in the blood sample; wherein the subject is determined to not be resilient to the neurological disorder if the amount of the first complex in the blood sample of the subject is increased as compared to an amount of a first complex in a reference blood sample, wherein the subject is determined to be resilient to the neurological disorder if the amount of the first complex in the blood sample of the subject is unchanged or decreased as compared to an amount of a first complex in the reference blood sample.

In another aspect, the disclosure provides a method of assessing resilience in a subject identified as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR and a second affinity ligand specific to a second synaptic protein, wherein the first and second synaptic proteins are in a first complex, wherein the contacting produces a second complex that includes the first affinity ligand, the first synaptic protein, the second affinity ligand, and the second synaptic protein, wherein the first and second synaptic proteins are different proteins, and wherein the first affinity ligand is conjugated to an oligonucleotide plus strand and the second affinity ligand is conjugated to an oligonucleotide minus strand; (ii) contacting the second complex with a single-stranded connector oligonucleotide and a ligase enzyme, thereby producing a LPMOS, wherein the LPMOS is capable of hybridizing to a forward primer oligonucleotide and a reverse primer oligonucleotide; (iii) performing amplification on the LPMOS, wherein the amplification produces a proximity signal when the first synaptic protein is within a proximity distance threshold with respect to the second synaptic protein; and (iv) detecting the proximity signal in the blood sample, wherein the proximity signal indicates an amount of the first complex in the blood sample; wherein the subject is determined to not be resilient to the neurological disorder if the amount of the first complex in the blood sample of the subject is decreased as compared to an amount of a first complex in a reference blood sample, wherein the subject is determined to be resilient to the neurological disorder if the amount of the first complex in the blood sample of the subject is unchanged or increased as compared to an amount of a first complex in the reference blood sample.

In another aspect, the disclosure provides a method of assessing resilience in a subject identified as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR and a second affinity ligand specific to a second synaptic protein, wherein the first and second synaptic proteins are in a first complex, wherein the contacting produces a second complex that includes the first affinity ligand, the first synaptic protein, the second affinity ligand, and the second synaptic protein, wherein the first and second synaptic proteins are different proteins, and wherein the first affinity ligand is conjugated to a first oligonucleotide plus strand and the second affinity ligand is conjugated to a second oligonucleotide minus strand; (ii) contacting the second complex with a single-stranded connector oligonucleotide and a ligase enzyme, thereby producing a first LPMOS, wherein the first LPMOS is capable of hybridizing to a first forward primer oligonucleotide and a first reverse primer oligonucleotide; (iii) performing amplification on the first LPMOS, wherein the amplification produces a first proximity signal when the first synaptic protein is within a proximity distance threshold with respect to the second synaptic protein; (iv) detecting the first proximity signal in the blood sample, wherein the first proximity signal indicates an amount of the first complex in the blood sample; (v) contacting a blood sample obtained from the subject with a third affinity ligand specific to a third synaptic protein selected from the group consisting of NPTX2, NPTX1, and NPTXR, and a fourth affinity ligand specific to a fourth synaptic protein selected from the group consisting of NPTX2, NPTX1, and NPTXR, wherein the third and fourth synaptic proteins are in a third complex, wherein the contacting produces a fourth complex that includes the third affinity ligand, the third synaptic protein, the fourth affinity ligand, and the fourth synaptic protein, wherein the third and fourth synaptic proteins are different proteins, and wherein the third affinity ligand is conjugated to a second oligonucleotide plus strand and the fourth affinity ligand is conjugated to a second oligonucleotide minus strand; (vi) contacting the fourth complex with a second single-stranded connector oligonucleotide and a ligase enzyme, thereby producing a second LPMOS, wherein the second LPMOS is capable of hybridizing to a second forward primer oligonucleotide and a second reverse primer oligonucleotide; (vii) performing amplification on the second LPMOS, wherein the amplification produces a second proximity signal when the third synaptic protein is within a proximity distance threshold with respect to the fourth synaptic protein; and (viii) detecting the second proximity signal in the blood sample, wherein the second proximity signal indicates an amount of the third complex in the blood sample; and (ix) quantifying a ratio of the first complex to the third complex by dividing the amount of the first complex by the amount of the third complex; wherein the subject is determined to not be resilient to the neurological disorder if the ratio of the first complex to the third complex in the blood sample of the subject is decreased as compared to a ratio of a first complex to a third complex in a reference blood sample, wherein the subject is determined to be resilient to the neurological disorder if the ratio of the first complex to the third complex in the blood sample of the subject is unchanged or increased as compared to the ratio of the first complex to the third complex in the reference blood sample. In some embodiments, the method further comprises contacting the blood sample with an immobilized affinity ligand specific to the third synaptic protein.

In another aspect, the disclosure provides a method of assessing resilience in a subject identified as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR and a second affinity ligand specific to a second synaptic protein selected from the group consisting of NPTX2, NPTX1, and NPTXR, wherein the first and second synaptic proteins are in a first complex, wherein the first and second synaptic proteins are different proteins; and (ii) determining an amount of the first complex in the blood sample of the subject; wherein the subject is determined to not be resilient to the neurological disorder if the amount of the first complex in the blood sample of the subject is increased as compared to an amount of a first complex in a reference blood sample, wherein the subject is determined to be resilient to the neurological disorder if the amount of the first complex in the blood sample of the subject is unchanged or decreased as compared to an amount of a first complex in the reference blood sample. In some embodiments, the first affinity ligand is conjugated to a first proximity detector and the second affinity ligand is conjugated to a second proximity detector.

In another aspect, the disclosure provides a method of assessing resilience in a subject identified as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR and a second affinity ligand specific to a second synaptic protein, wherein the first and second synaptic proteins are in a first complex, wherein the first and second synaptic proteins are different proteins; and (ii) determining an amount of the first complex in the blood sample of the subject; wherein the subject is determined to not be resilient to the neurological disorder if the amount of the first complex in the blood sample of the subject is decreased as compared to an amount of a first complex in a reference blood sample, wherein the subject is determined to be resilient to the neurological disorder if the amount of the first complex in the blood sample of the subject is unchanged or increased as compared to an amount of a first complex in the reference blood sample. In some embodiments, the first affinity ligand is conjugated to a first proximity detector and the second affinity ligand is conjugated to a second proximity detector.

In another aspect, the disclosure provides a method of assessing resilience in a subject identified as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR and a second affinity ligand specific to a second synaptic protein, and a second affinity ligand specific to a second synaptic protein, wherein the first and second synaptic proteins are in a first complex, wherein the first and second synaptic proteins are different proteins; and (ii) determining an amount of the first complex in the blood sample of the subject; (iii) contacting a blood sample obtained from the subject with a third affinity ligand specific to a third synaptic protein selected from the group consisting of NPTX2, NPTX1, and NPTXR and a fourth affinity ligand specific to a fourth synaptic protein selected from the group consisting of NPTX2, NPTX1, and NPTXR, wherein the third and fourth synaptic proteins are in a second complex, wherein the third and fourth synaptic proteins are different proteins; (iv) determining an amount of the second complex in the blood sample of the subject; and (v) quantifying a ratio of the first complex to the second complex by dividing the amount of the first complex by the amount of the second complex; wherein the subject is determined to not be resilient to the neurological disorder if the ratio of the first complex to the second complex in the blood sample of the subject is decreased as compared to a ratio of a first complex to a second complex in a reference blood sample, wherein the subject is determined to be resilient to the neurological disorder if the ratio of the first complex to the second complex in the blood sample of the subject is unchanged or decreased as compared to a ratio of a first complex to a second complex in a reference blood sample. In some embodiments, the first affinity ligand comprises a first proximity detector and the second affinity ligand comprises a second proximity detector. In some embodiments, the third affinity ligand comprises a third proximity detector and the fourth affinity ligand comprises a fourth proximity detector. In some embodiments, the method further comprises contacting the blood sample with an immobilized affinity ligand specific to the third synaptic protein.

In another aspect, the disclosure provides a method of determining therapeutic efficacy of an agent in a subject identified as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR and a second affinity ligand specific to a second synaptic protein selected from the group consisting of NPTX2, NPTX1, and NPTXR, wherein the first and second synaptic proteins are in a first complex, wherein the contacting produces a second complex that includes the first affinity ligand, the first synaptic protein, the second affinity ligand, and the second synaptic protein, wherein the first and second synaptic proteins are different proteins, and wherein the first affinity ligand is conjugated to an oligonucleotide plus strand and the second affinity ligand is conjugated to an oligonucleotide minus strand; (ii) contacting the second complex with a single-stranded connector oligonucleotide and a ligase enzyme, thereby producing a LPMOS, wherein the LPMOS is capable of hybridizing to a forward primer oligonucleotide and a reverse primer oligonucleotide; (iii) performing amplification on the LPMOS, wherein the amplification produces a proximity signal when the first synaptic protein is within a proximity distance threshold with respect to the second synaptic protein; and (iv) detecting the proximity signal in the blood sample, wherein the proximity signal indicates an amount of the first complex in the blood sample; wherein the agent is determined to be therapeutically effective in the subject if the amount of the first complex in the blood sample of the subject is unchanged or decreased as compared to an amount of a first complex in a reference blood sample.

In another aspect, the disclosure provides a method of determining therapeutic efficacy of an agent in a subject identified as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR and a second affinity ligand specific to a second synaptic protein, wherein the first and second synaptic proteins are in a first complex, wherein the contacting produces a second complex that includes the first affinity ligand, the first synaptic protein, the second affinity ligand, and the second synaptic protein, wherein the first and second synaptic proteins are different proteins, and wherein the first affinity ligand is conjugated to a first oligonucleotide plus strand and the second affinity ligand is conjugated to a second oligonucleotide minus strand; (ii) contacting the second complex with a single-stranded connector oligonucleotide and a ligase enzyme, thereby producing a first LPMOS, wherein the first LPMOS is capable of hybridizing to a first forward primer oligonucleotide and a first reverse primer oligonucleotide; (iii) performing amplification on the first LPMOS, wherein the amplification produces a first proximity signal when the first synaptic protein is within a proximity distance threshold with respect to the second synaptic protein; (iv) detecting the first proximity signal in the blood sample, wherein the first proximity signal indicates an amount of the first complex in the blood sample; (v) contacting a blood sample obtained from the subject with a third affinity ligand specific to a third synaptic protein selected from the group consisting of NPTX2, NPTX1, and NPTXR, and a fourth affinity ligand specific to a fourth synaptic protein selected from the group consisting of NPTX2, NPTX1, and NPTXR, wherein the third and fourth synaptic proteins are in a third complex, wherein the contacting produces a fourth complex that includes the third affinity ligand, the third synaptic protein, the fourth affinity ligand, and the fourth synaptic protein, wherein the third and fourth synaptic proteins are different proteins, and wherein the third affinity ligand is conjugated to a second oligonucleotide plus strand and the fourth affinity ligand is conjugated to a second oligonucleotide minus strand; (v) contacting the fourth complex with a second single-stranded connector oligonucleotide and a ligase enzyme, thereby producing a second LPMOS, wherein the second LPMOS is capable of hybridizing to a second forward primer oligonucleotide and a second reverse primer oligonucleotide; (vii) performing amplification on the second LPMOS, wherein the amplification produces a second proximity signal when the third synaptic protein is within a proximity distance threshold with respect to the fourth synaptic protein; and (viii) detecting the second proximity signal in the blood sample, wherein the second proximity signal indicates an amount of the third complex in the blood sample; and (ix) quantifying a ratio of the first complex to the third complex by dividing the amount of the first complex by the amount of the third complex; wherein the agent is determined to be therapeutically effective in the subject if the ratio of the first complex to the third complex in the blood sample of the subject is unchanged or increased as compared to a ratio of a first complex to a third complex in a reference blood sample. In some embodiments, the method further comprises contacting the blood sample with an immobilized affinity ligand specific to the third synaptic protein.

In another aspect, the disclosure provides a method of determining therapeutic efficacy of an agent in a subject identified as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR and a second affinity ligand specific to a second synaptic protein selected from the group consisting of NPTX2, NPTX1, and NPTXR, wherein the first and second synaptic proteins are in a first complex, wherein the first and second synaptic proteins are different proteins; and (ii) determining an amount of the first complex in the blood sample of the subject; wherein the agent is determined to be therapeutically effective in the subject if the amount of the first complex in the blood sample of the subject is unchanged or decreased as compared to an amount of a first complex in a reference blood sample. In some embodiments, the first affinity ligand is conjugated to a first proximity detector and the second affinity ligand is conjugated to a second proximity detector.

In another aspect, the disclosure provides a method of determining therapeutic efficacy of an agent in a subject identified as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR and a second affinity ligand specific to a second synaptic protein, wherein the first and second synaptic proteins are in a first complex, wherein the first and second synaptic proteins are different proteins; and (ii) determining an amount of the first complex in the blood sample of the subject; wherein the agent is determined to be therapeutically effective in the subject if the amount of the first complex in the blood sample of the subject is unchanged or increased as compared to an amount of a first complex in a reference blood sample. In some embodiments, the first affinity ligand is conjugated to a first proximity detector and the second affinity ligand is conjugated to a second proximity detector.

In another aspect, the disclosure provides a method of determining therapeutic efficacy of an agent in a subject identified as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR and a second affinity ligand specific to a second synaptic protein, and a second affinity ligand specific to a second synaptic protein, wherein the first and second synaptic proteins are in a first complex, wherein the first and second synaptic proteins are different proteins; and (ii) determining an amount of the first complex in the blood sample of the subject; (iii) contacting a blood sample obtained from the subject with a third affinity ligand specific to a third synaptic protein selected from the group consisting of NPTX2, NPTX1, and NPTXR and a fourth affinity ligand specific to a fourth synaptic protein selected from the group consisting of NPTX2, NPTX1, and NPTXR, wherein the third and fourth synaptic proteins are in a second complex, wherein the third and fourth synaptic proteins are different proteins; (iv) determining an amount of the second complex in the blood sample of the subject; and (v) quantifying a ratio of the first complex to the second complex by dividing the amount of the first complex by the amount of the second complex; wherein the agent is determined to be therapeutically effective in the subject if the ratio of the first complex to the second complex in the blood sample of the subject is unchanged or increased as compared to a ratio of a first complex to a second complex in a reference blood sample. In some embodiments, the method further comprises contacting the blood sample with an immobilized affinity ligand specific to the third synaptic protein. In some embodiments, the first affinity ligand comprises a first proximity detector and the second affinity ligand comprises a second proximity detector. In some embodiments, the third affinity ligand comprises a third proximity detector and the fourth affinity ligand comprises a fourth proximity detector.

In another aspect, the disclosure provides a method of assessing learning and memory in a subject identified as having or at risk of developing a neurological disease or disorder, the method including the steps of: (i) contacting a blood sample obtained from the subject with a first affinity ligand specific to a first synaptic protein selected from the group consisting of NPTX2, NPTX1, and NPTXR and a second affinity ligand specific to a second synaptic protein selected from the group consisting of NPTX2, NPTX1, and NPTXR, wherein the first and second synaptic proteins are in a first complex, wherein the contacting produces a second complex that includes the first affinity ligand, the first synaptic protein, the second affinity ligand, and the second synaptic protein, wherein the first and second synaptic proteins are different proteins, and wherein the first affinity ligand is conjugated to an oligonucleotide plus strand and the second affinity ligand is conjugated to an oligonucleotide minus strand; (ii) contacting the second complex with a single-stranded connector oligonucleotide and a ligase enzyme, thereby producing a LPMOS, wherein the LPMOS is capable of hybridizing to a forward primer oligonucleotide and a reverse primer oligonucleotide; (iii) performing amplification on the LPMOS, wherein the amplification produces a proximity signal when the first synaptic protein is within a proximity distance threshold with respect to the second synaptic protein; and (iv) detecting the proximity signal in the blood sample, wherein the proximity signal indicates an amount of the first complex in the blood sample; wherein an increase in the amount of the first complex in the blood sample of the subject as compared to an amount of a first complex in a reference blood sample indicates reduced learning and memory in the subject.

In another aspect, the disclosure provides a method of assessing learning and memory in a subject identified as having or at risk of developing a neurological disease or disorder, the method including the steps of: (i) contacting a blood sample obtained from the subject with a first affinity ligand specific to a first synaptic protein selected from the group consisting of NPTX2, NPTX1, and NPTXR and a second affinity ligand specific to a second synaptic protein, wherein the first and second synaptic proteins are in a first complex, wherein the contacting produces a second complex that includes the first affinity ligand, the first synaptic protein, the second affinity ligand, and the second synaptic protein, wherein the first and second synaptic proteins are different proteins, and wherein the first affinity ligand is conjugated to an oligonucleotide plus strand and the second affinity ligand is conjugated to an oligonucleotide minus strand; (ii) contacting the second complex with a single-stranded connector oligonucleotide and a ligase enzyme, thereby producing a LPMOS, wherein the LPMOS is capable of hybridizing to a forward primer oligonucleotide and a reverse primer oligonucleotide; (iii) performing amplification on the LPMOS, wherein the amplification produces a proximity signal when the first synaptic protein is within a proximity distance threshold with respect to the second synaptic protein; and (iv) detecting the proximity signal in the blood sample, wherein the proximity signal indicates an amount of the first complex in the blood sample; wherein an decrease in the amount of the first complex in the blood sample of the subject as compared to an amount of a first complex in a reference blood sample indicates reduced learning and memory in the subject.

In another aspect, the disclosure provides a method of assessing learning and memory in a subject identified as having or at risk of developing a neurological disease or disorder, the method including the steps of: (i) contacting a blood sample obtained from the subject with a first affinity ligand specific to a first synaptic protein selected from the group consisting of NPTX2, NPTX1, and NPTXR and a second affinity ligand specific to a second synaptic protein, wherein the first and second synaptic proteins are in a first complex, wherein the contacting produces a second complex that includes the first affinity ligand, the first synaptic protein, the second affinity ligand, and the second synaptic protein, wherein the first and second synaptic proteins are different proteins, and wherein the first affinity ligand is conjugated to a first oligonucleotide plus strand and the second affinity ligand is conjugated to a second oligonucleotide minus strand; (ii) contacting the second complex with a single-stranded connector oligonucleotide and a ligase enzyme, thereby producing a first LPMOS, wherein the first LPMOS is capable of hybridizing to a first forward primer oligonucleotide and a first reverse primer oligonucleotide; (iii) performing amplification on the first LPMOS, wherein the amplification produces a first proximity signal when the first synaptic protein is within a proximity distance threshold with respect to the second synaptic protein; (iv) detecting the first proximity signal in the blood sample, wherein the first proximity signal indicates an amount of the first complex in the blood sample; (v) contacting a blood sample obtained from the subject with a third affinity ligand specific to a third synaptic protein selected from the group consisting of NPTX2, NPTX1, and NPTXR, and a fourth affinity ligand specific to a fourth synaptic protein selected from the group consisting of NPTX2, NPTX1, and NPTXR, wherein the third and fourth synaptic proteins are in a third complex, wherein the contacting produces a fourth complex that includes the third affinity ligand, the third synaptic protein, the fourth affinity ligand, and the fourth synaptic protein, wherein the third and fourth synaptic proteins are different proteins, and wherein the third affinity ligand is conjugated to a second oligonucleotide plus strand and the fourth affinity ligand is conjugated to a second oligonucleotide minus strand; (vi) contacting the fourth complex with a second single-stranded connector oligonucleotide and a ligase enzyme, thereby producing a second LPMOS, wherein the second LPMOS is capable of hybridizing to a second forward primer oligonucleotide and a second reverse primer oligonucleotide; (vii) performing amplification on the second LPMOS, wherein the amplification produces a second proximity signal when the third synaptic protein is within a proximity distance threshold with respect to the fourth synaptic protein; and (viii) detecting the second proximity signal in the blood sample, wherein the second proximity signal indicates an amount of the third complex in the blood sample; and (ix) quantifying a ratio of the first complex to the third complex by dividing the amount of the first complex by the amount of the third complex; wherein a reduced ratio of the first complex to the second complex in the blood sample of the subject as compared to a ratio of a first complex to a second complex in a reference blood sample indicates reduced learning and memory in the subject. In some embodiments, the method further comprises contacting the blood sample with an immobilized affinity ligand specific to the third synaptic protein.

In another aspect, the disclosure provides a method of assessing learning and memory in a subject identified as having or at risk of developing a neurological disease or disorder, the method including the steps of: (i) contacting a blood sample obtained from the subject with a first affinity ligand specific to a first synaptic protein selected from the group consisting of NPTX2, NPTX1, and NPTXR and a second affinity ligand specific to a second synaptic protein selected from the group consisting of NPTX2, NPTX1, and NPTXR, wherein the first and second synaptic proteins are in a first complex, wherein the first and second synaptic proteins are different proteins; and (ii) determining an amount of the first complex in the blood sample of the subject; wherein an increase in the amount of the first complex in the blood sample of the subject as compared to an amount of a first complex in a reference blood sample indicates reduced learning and memory in the subject. In some embodiments, the first affinity ligand is conjugated to a first proximity detector and the second affinity ligand is conjugated to a second proximity detector.

In another aspect, the disclosure provides a method of assessing learning and memory in a subject identified as having or at risk of developing a neurological disease or disorder, the method including the steps of: (i) contacting a blood sample obtained from the subject with a first affinity ligand specific to a first synaptic protein selected from the group consisting of NPTX2, NPTX1, and NPTXR and a second affinity ligand specific to a second synaptic protein, wherein the first and second synaptic proteins are in a first complex, wherein the first and second synaptic proteins are different proteins; and (ii) determining an amount of the first complex in the blood sample of the subject; wherein an decrease in the amount of the first complex in the blood sample of the subject as compared to an amount of a first complex in a reference blood sample indicates reduced learning and memory in the subject. In some embodiments, the first affinity ligand is conjugated to a first proximity detector and the second affinity ligand is conjugated to a second proximity detector.

In another aspect, the disclosure provides a method of assessing learning and memory in a subject identified as having or at risk of developing a neurological disease or disorder, the method including the steps of: (i) contacting a blood sample obtained from the subject with a first affinity ligand specific to a first synaptic protein selected from the group consisting of NPTX2, NPTX1, and NPTXR and a second affinity ligand specific to a second synaptic protein, and a second affinity ligand specific to a second synaptic protein, wherein the first and second synaptic proteins are in a first complex, wherein the first and second synaptic proteins are different proteins; and (ii) determining an amount of the first complex in the blood sample of the subject; (iii) contacting a blood sample obtained from the subject with a third affinity ligand specific to a third synaptic protein selected from the group consisting of NPTX2, NPTX1, and NPTXR and a fourth affinity ligand specific to a fourth synaptic protein selected from the group consisting of NPTX2, NPTX1, and NPTXR, wherein the third and fourth synaptic proteins are in a second complex, wherein the third and fourth synaptic proteins are different proteins; (iv) determining an amount of the second complex in the blood sample of the subject; and (v) quantifying a ratio of the first complex to the second complex by dividing the amount of the first complex by the amount of the second complex; wherein a reduced ratio of the first complex to the second complex in the blood sample of the subject as compared to a ratio of a first complex to a second complex in a reference blood sample indicates reduced learning and memory in the subject. In some embodiments, the method further comprises contacting the blood sample with an immobilized affinity ligand specific to the third synaptic protein. In some embodiments, the first affinity ligand comprises a first proximity detector and the second affinity ligand comprises a second proximity detector. In some embodiments, the third affinity ligand comprises a third proximity detector and the fourth affinity ligand comprises a fourth proximity detector.

In another aspect, the disclosure provides a method of quantifying an amount of a synaptic protein complex that includes two or more synaptic proteins in a blood sample of a subject identified as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR and a second affinity ligand specific to a second synaptic protein selected from the group consisting of NPTX2, NPTX1, and NPTXR, wherein the first and second synaptic proteins are in a first complex, wherein the contacting produces a second complex that includes the first affinity ligand, the first synaptic protein, the second affinity ligand, and the second synaptic protein, wherein the first and second synaptic proteins are different proteins, and wherein the first affinity ligand is conjugated to an oligonucleotide plus strand and the second affinity ligand is conjugated to an oligonucleotide minus strand; (ii) contacting the second complex with a single-stranded connector oligonucleotide and a ligase enzyme, thereby producing a LPMOS, wherein the LPMOS is capable of hybridizing to a forward primer oligonucleotide and a reverse primer oligonucleotide; (iii) performing amplification on the LPMOS, wherein the amplification produces a proximity signal when the first synaptic protein is within a proximity distance threshold with respect to the second synaptic protein; and (iv) detecting the proximity signal in the blood sample, wherein the proximity signal indicates an amount of synaptic protein in the blood sample.

In another aspect, the disclosure provides a method of quantifying an amount of a synaptic protein complex that includes two or more synaptic proteins in a blood sample of a subject identified as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR and a second affinity ligand specific to a second synaptic protein selected from the group consisting of NPTX2, NPTX1, and NPTXR, wherein the first and second synaptic proteins are in a first complex, wherein the first and second synaptic proteins are different proteins; and (ii) determining an amount of the first complex in the blood sample of the subject;

wherein the amount of the first complex indicates the quantity of the synaptic protein complex in a blood sample of the subject. In some embodiments, the first affinity ligand is conjugated to a first proximity detector and the second affinity ligand is conjugated to a second proximity detector.

In another aspect, the disclosure provides a method of quantifying an amount of a synaptic protein complex that includes two or more synaptic proteins in a blood sample of a subject identified as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR and a second affinity ligand specific to a second synaptic protein, wherein the first and second synaptic proteins are in a first complex, wherein the first and second synaptic proteins are different proteins; and (ii) determining an amount of the first complex in the blood sample of the subject; wherein the amount of the first complex indicates the quantity of the synaptic protein complex in a blood sample of the subject. In some embodiments, the first affinity ligand is conjugated to a first proximity detector and the second affinity ligand is conjugated to a second proximity detector.

In some embodiments of any of the foregoing aspects, the method further comprises contacting the blood sample with an immobilized affinity ligand specific to the first synaptic protein, thereby capturing the ligand on a surface (e.g., a solid support, such as, e.g., a plate, resin, particle (e.g., bead). In some embodiments of any of the foregoing aspects, the method further comprises contacting the blood sample with an immobilized affinity ligand specific to the third synaptic protein, thereby capturing the ligand on a surface.

In another aspect, the disclosure provides a method of identifying a subject as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR, wherein the first synaptic protein is part of a first complex with a second synaptic protein selected from the group consisting of NPTX2, NPTX1, and NPTXR, wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein, wherein the contacting produces a third complex that includes the second complex, the second affinity ligand, and the third affinity ligand, wherein the second affinity ligand is conjugated to an oligonucleotide plus strand (e.g., SEQ ID NO: 1) and the third affinity ligand is conjugated to an oligonucleotide minus strand (e.g., SEQ ID NO: 2); (iii) contacting the third complex with a single-stranded connector oligonucleotide (e.g., splint oligonucleotide; e.g., SEQ ID NO: 3) and a ligase enzyme (e.g., T4 DNA ligase), thereby producing a LPMOS, wherein the LPMOS is capable of hybridizing to a forward primer oligonucleotide (e.g., SEQ ID NO: 4) and a reverse primer oligonucleotide (e.g., SEQ ID NO: 5); (iv) performing amplification on the LPMOS, wherein the amplification produces a proximity signal when the first synaptic protein is within a proximity distance threshold with respect to the second synaptic protein; and (v) detecting the proximity signal in the blood sample, wherein the proximity signal indicates an amount of the first complex in the blood sample; wherein an increase in the amount of the first complex in the blood sample of the subject as compared to an amount of a first complex in a reference blood sample identifies the subject as having or at risk of developing the neurological disorder.

In another aspect, the present disclosure provides a method of identifying a subject as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein (e.g., any one of the synaptic proteins listed in Table 1), wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein, wherein the contacting produces a third complex that includes the second complex, the second affinity ligand, and the third affinity ligand, wherein the second affinity ligand is conjugated to an oligonucleotide plus strand and the third affinity ligand is conjugated to an oligonucleotide minus strand; (iii) contacting the third complex with a single-stranded connector oligonucleotide and a ligase enzyme, thereby producing a LPMOS, wherein the LPMOS is capable of hybridizing to a forward primer oligonucleotide and a reverse primer oligonucleotide; (iv) performing amplification on the LPMOS, wherein the amplification produces a proximity signal when the first synaptic protein is within a proximity distance threshold with respect to the second synaptic protein; and (v) detecting the proximity signal in the blood sample, wherein the proximity signal indicates an amount of the first complex in the blood sample; wherein a decrease in the amount of the first complex in the blood sample of the subject as compared to an amount of a first complex in a reference blood sample identifies the subject as having or at risk of developing the neurological disorder.

In another aspect, the present disclosure provides a method of identifying a subject as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein (e.g., any one of the synaptic proteins listed in Table 1), wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein, wherein the contacting produces a third complex that includes the second complex, the second affinity ligand, and the third affinity ligand, wherein the second affinity ligand is conjugated to a first oligonucleotide plus strand and the third affinity ligand is conjugated to a second oligonucleotide minus strand; (iii) contacting the third complex with a first single-stranded connector oligonucleotide and a ligase enzyme, thereby producing a first LPMOS, wherein the first LPMOS is capable of hybridizing to a first forward primer oligonucleotide and a first reverse primer oligonucleotide; (iv) performing amplification on the first LPMOS, wherein the amplification produces a first proximity signal when the first synaptic protein is within a proximity distance threshold with respect to the second synaptic protein; (v) detecting the first proximity signal in the blood sample, wherein the first proximity signal indicates an amount of the first complex in the blood sample; (vi) contacting a blood sample obtained from the subject with a fourth affinity ligand specific to a third synaptic protein selected from the group consisting of NPTX2, NPTX1, and NPTXR, wherein the fourth affinity ligand is immobilized on a surface, wherein the third synaptic protein is part of a fourth complex with a fourth synaptic protein selected from the group consisting of NPTX2, NPTX1, and NPTXR, wherein the contacting produces a fifth complex that includes the fourth affinity ligand, the third synaptic protein, and the fourth synaptic protein, wherein the third and fourth synaptic proteins are different proteins; (vii) contacting the fifth complex with a fifth affinity ligand specific to the third synaptic protein and a sixth affinity ligand specific to the fourth synaptic protein, wherein the contacting produces a sixth complex that includes the fifth complex, the fifth affinity ligand, and the sixth affinity ligand, wherein the fifth affinity ligand is conjugated to a second oligonucleotide plus strand and the sixth affinity ligand is conjugated to a second oligonucleotide minus strand; (viii) contacting the fifth complex with a second single-stranded connector oligonucleotide and a ligase enzyme, thereby producing a second LPMOS, wherein the second LPMOS is capable of hybridizing to a second forward primer oligonucleotide and a second reverse primer oligonucleotide; (ix) performing amplification on the second LPMOS, wherein the amplification produces a second proximity signal when the third synaptic protein is within a proximity distance threshold with respect to the fourth synaptic protein; and (x) detecting the second proximity signal in the blood sample, wherein the second proximity signal indicates an amount of the fourth complex in the blood sample; and (xi) quantifying a ratio of the first complex to the fourth complex by dividing the amount of the first complex by the amount of the fourth complex; wherein a decrease in the ratio of the first complex to the fourth complex in the blood sample of the subject as compared to a ratio of a first complex to a fourth complex in a reference blood sample identifies the subject as having or at risk of developing the neurological disorder.

In another aspect, the present disclosure provides a method of identifying a subject as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein selected from the group consisting of NPTX2, NPTX1, and NPTXR, wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein; and (iii) determining an amount of the first complex in the blood sample of the subject; wherein an increase in the amount of the first complex in the blood sample of the subject as compared to an amount of a first complex in a reference blood sample identifies the subject as having or at risk of developing the neurological disorder.

In another aspect, the present disclosure provides a method of identifying a subject as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein (e.g., any one of the synaptic proteins listed in Table 1), wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein; and (iii) determining an amount of the first complex in the blood sample of the subject; wherein a decrease in the amount of the first complex in the blood sample of the subject as compared to an amount of a first complex in a reference blood sample identifies the subject as having or at risk of developing the neurological disorder.

In another aspect, the present disclosure provides a method of identifying a subject as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein (e.g., any one of the synaptic proteins listed in Table 1), wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein; (iii) determining an amount of the first complex in the blood sample of the subject; (iv) contacting a blood sample obtained from the subject with a fourth affinity ligand specific to a third synaptic protein selected from the group consisting of NPTX2, NPTX1, and NPTXR, wherein the fourth affinity ligand is immobilized on a surface, wherein the third synaptic protein is part of a third complex with a fourth synaptic protein selected from the group consisting of NPTX2, NPTX1, and NPTXR, wherein the contacting produces a fourth complex that includes the fourth affinity ligand, the third synaptic protein, and the fourth synaptic protein, wherein the third and fourth synaptic proteins are different proteins; (v) contacting the fourth complex with a fifth affinity ligand specific to the third synaptic protein and a sixth affinity ligand specific to the fourth synaptic protein; and (vi) determining an amount of the third complex in the blood sample of the subject; and (vii) quantifying a ratio of the first complex to the third complex by dividing the amount of the first complex by the amount of the third complex; wherein a decrease in the ratio of the first complex to the third complex in the blood sample of the subject as compared to a ratio of the first complex to the third complex in a reference blood sample identifies the subject as having or at risk of developing the neurological disorder.

In another aspect, the present disclosure provides a method of selecting a subject identified as having or at risk of developing a neurological disorder for treatment with a therapeutic agent, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein selected from the group consisting of NPTX2, NPTX1, and NPTXR, wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein, wherein the contacting produces a third complex that includes the second complex, the second affinity ligand, and the third affinity ligand, wherein the second affinity ligand is conjugated to an oligonucleotide plus strand and the third affinity ligand is conjugated to an oligonucleotide minus strand; (iii) contacting the third complex with a single-stranded connector oligonucleotide and a ligase enzyme, thereby producing an LPMOS, wherein the LPMOS is capable of hybridizing to a forward primer oligonucleotide and a reverse primer oligonucleotide; (iv) performing amplification on the LPMOS, wherein the amplification produces a proximity signal when the first synaptic protein is within a proximity distance threshold with respect to the second synaptic protein; and (v) detecting the proximity signal in the blood sample, wherein the proximity signal indicates an amount of the first complex in the blood sample; wherein the subject is selected for treatment with the therapeutic agent if the amount of the first complex in the blood sample of the subject is increased as compared to an amount of a first complex in a reference blood sample.

In another aspect, the present disclosure provides a method of selecting a subject identified as having or at risk of developing a neurological disorder for treatment with a therapeutic agent, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein (e.g., any one of the synaptic proteins listed in Table 1), wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein, wherein the contacting produces a third complex that includes the second complex, the second affinity ligand, and the third affinity ligand, wherein the second affinity ligand is conjugated to an oligonucleotide plus strand and the third affinity ligand is conjugated to an oligonucleotide minus strand; (iii) contacting the third complex with a single-stranded connector oligonucleotide and a ligase enzyme, thereby producing a LPMOS, wherein the LPMOS is capable of hybridizing to a forward primer oligonucleotide and a reverse primer oligonucleotide; (iv) performing amplification on the LPMOS, wherein the amplification produces a proximity signal when the first synaptic protein is within a proximity distance threshold with respect to the second synaptic protein; and (v) detecting the proximity signal in the blood sample, wherein the proximity signal indicates an amount of the first complex in the blood sample; wherein the subject is selected for treatment with the therapeutic agent if the amount of the first complex in the blood sample of the subject is decreased as compared to an amount of a first complex in a reference blood sample.

In another aspect, the present disclosure provides a method of selecting a subject identified as having or at risk of developing a neurological disorder for treatment with a therapeutic agent, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein (e.g., any one of the synaptic proteins listed in Table 1), wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein, wherein the contacting produces a third complex that includes the second complex, the second affinity ligand, and the third affinity ligand, wherein the second affinity ligand is conjugated to a first oligonucleotide plus strand and the third affinity ligand is conjugated to a second oligonucleotide minus strand; (iii) contacting the third complex with a first single-stranded connector oligonucleotide and a ligase enzyme, thereby producing a first LPMOS, wherein the first LPMOS is capable of hybridizing to a first forward primer oligonucleotide and a first reverse primer oligonucleotide; (iv) performing amplification on the first LPMOS, wherein the amplification produces a first proximity signal when the first synaptic protein is within a proximity distance threshold with respect to the second synaptic protein; (v) detecting the first proximity signal in the blood sample, wherein the first proximity signal indicates an amount of the first complex in the blood sample; (vi) contacting a blood sample obtained from the subject with a fourth affinity ligand specific to a third synaptic protein selected from the group consisting of NPTX2, NPTX1, and NPTXR, wherein the fourth affinity ligand is immobilized on a surface, wherein the third synaptic protein is part of a fourth complex with a fourth synaptic protein selected from the group consisting of NPTX2, NPTX1, and NPTXR, wherein the contacting produces a fifth complex that includes the fourth affinity ligand, the third synaptic protein, and the fourth synaptic protein, wherein the third and fourth synaptic proteins are different proteins; (vii) contacting the fifth complex with a fifth affinity ligand specific to the third synaptic protein and a sixth affinity ligand specific to the fourth synaptic protein, wherein the contacting produces a sixth complex that includes the fifth complex, the fifth affinity ligand, and the sixth affinity ligand, wherein the fifth affinity ligand is conjugated to a second oligonucleotide plus strand and the sixth affinity ligand is conjugated to a second oligonucleotide minus strand; (viii) contacting the fifth complex with a second single-stranded connector oligonucleotide and a ligase enzyme, thereby producing a second LPMOS, wherein the second LPMOS is capable of hybridizing to a second forward primer oligonucleotide and a second reverse primer oligonucleotide; (ix) performing amplification on the second LPMOS, wherein the amplification produces a second proximity signal when the third synaptic protein is within a proximity distance threshold with respect to the fourth synaptic protein; and (x) detecting the second proximity signal in the blood sample, wherein the second proximity signal indicates an amount of the fourth complex in the blood sample; and (xi) quantifying a ratio of the first complex to the fourth complex by dividing the amount of the first complex by the amount of the fourth complex; wherein the subject is selected for treatment with the therapeutic agent if the ratio of the first complex to the fourth complex in the blood sample of the subject is decreased as compared to a ratio of a first complex to a fourth complex in a reference blood sample.

In another aspect, the present disclosure provides a method of selecting a subject identified as having or at risk of developing a neurological disorder for treatment with a therapeutic agent, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein selected from the group consisting of NPTX2, NPTX1, and NPTXR, wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein; and (iii) determining an amount of the first complex in the blood sample of the subject; wherein the subject is selected for treatment with the therapeutic agent if the amount of the first complex in the blood sample of the subject is increased as compared to an amount of a first complex in a reference blood sample.

In another aspect, the present disclosure provides a method of selecting a subject identified as having or at risk of developing a neurological disorder for treatment with a therapeutic agent, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein (e.g., any one of the synaptic proteins listed in Table 1), wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein; and (iii) determining an amount of the first complex in the blood sample of the subject; wherein the subject is selected for treatment with the therapeutic agent if the amount of the first complex in the blood sample of the subject is decreased as compared to an amount of a first complex in a reference blood sample.

In another aspect, the present disclosure provides a method of selecting a subject identified as having or at risk of developing a neurological disorder for treatment with a therapeutic agent, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein (e.g., any one of the synaptic proteins listed in Table 1), wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein; (iii) determining an amount of the first complex in the blood sample of the subject; (iv) contacting a blood sample obtained from the subject with a fourth affinity ligand specific to a third synaptic protein selected from the group consisting of NPTX2, NPTX1, and NPTXR, wherein the fourth affinity ligand is immobilized on a surface, wherein the third synaptic protein is part of a third complex with a fourth synaptic protein selected from the group consisting of NPTX2, NPTX1, and NPTXR, wherein the contacting produces a fourth complex that includes the fourth affinity ligand, the third synaptic protein, and the fourth synaptic protein, wherein the third and fourth synaptic proteins are different proteins; (v) contacting the fourth complex with a fifth affinity ligand specific to the third synaptic protein and a sixth affinity ligand specific to the fourth synaptic protein; (vi) determining an amount of the third complex in the blood sample of the subject; and (vii) quantifying a ratio of the first complex to the third complex by dividing the amount of the first complex by the amount of the third complex; wherein the subject is selected for treatment with the therapeutic agent if the ratio of the first complex to the third complex in the blood sample of the subject is decreased as compared to a ratio of a first complex to a third complex in a reference blood sample.

In another aspect, the present disclosure provides a method of assessing resilience in a subject identified as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein selected from the group consisting of NPTX2, NPTX1, and NPTXR, wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein, wherein the contacting produces a third complex that includes the second complex, the second affinity ligand, and the third affinity ligand, wherein the second affinity ligand is conjugated to an oligonucleotide plus strand and the third affinity ligand is conjugated to an oligonucleotide minus strand; (iii) contacting the third complex with a single-stranded connector oligonucleotide and a ligase enzyme, thereby producing an LPMOS, wherein the LPMOS is capable of hybridizing to a forward primer oligonucleotide and a reverse primer oligonucleotide; (iv) performing amplification on the LPMOS, wherein the amplification produces a proximity signal when the first synaptic protein is within a proximity distance threshold with respect to the second synaptic protein; and (v) detecting the proximity signal in the blood sample, wherein the proximity signal indicates an amount of the first complex in the blood sample; wherein the subject is determined to not be resilient to the neurological disorder if the amount of the first complex in the blood sample of the subject is increased as compared to an amount of a first complex in a reference blood sample, wherein the subject is determined to be resilient to the neurological disorder if the amount of the first complex in the blood sample of the subject is unchanged or decreased as compared to an amount of a first complex in the reference blood sample.

In another aspect, the present disclosure provides a method of assessing resilience in a subject identified as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein (e.g., any one of the synaptic proteins listed in Table 1), wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein, wherein the contacting produces a third complex that includes the second complex, the second affinity ligand, and the third affinity ligand, wherein the second affinity ligand is conjugated to an oligonucleotide plus strand and the third affinity ligand is conjugated to an oligonucleotide minus strand; (iii) contacting the third complex with a single-stranded connector oligonucleotide and a ligase enzyme, thereby producing an LPMOS, wherein the LPMOS is capable of hybridizing to a forward primer oligonucleotide and a reverse primer oligonucleotide; (iv) performing amplification on the LPMOS, wherein the amplification produces a proximity signal when the first synaptic protein is within a proximity distance threshold with respect to the second synaptic protein; and (v) detecting the proximity signal in the blood sample, wherein the proximity signal indicates an amount of the first complex in the blood sample; wherein the subject is determined to not be resilient to the neurological disorder if the amount of the first complex in the blood sample of the subject is decreased as compared to an amount of a first complex in a reference blood sample, wherein the subject is determined to be resilient to the neurological disorder if the amount of the first complex in the blood sample of the subject is unchanged or increased as compared to an amount of a first complex in the reference blood sample.

In another aspect, the present disclosure provides a method of assessing resilience in a subject identified as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein (e.g., any one of the synaptic proteins listed in Table 1), wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein, wherein the contacting produces a third complex that includes the second complex, the second affinity ligand, and the third affinity ligand, wherein the second affinity ligand is conjugated to a first oligonucleotide plus strand and the third affinity ligand is conjugated to a second oligonucleotide minus strand; (iii) contacting the third complex with a first single-stranded connector oligonucleotide and a ligase enzyme, thereby producing a first LPMOS, wherein the first LPMOS is capable of hybridizing to a first forward primer oligonucleotide and a first reverse primer oligonucleotide; (iv) performing amplification on the first LPMOS, wherein the amplification produces a first proximity signal when the first synaptic protein is within a proximity distance threshold with respect to the second synaptic protein; (v) detecting the first proximity signal in the blood sample, wherein the first proximity signal indicates an amount of the first complex in the blood sample; (vi) contacting a blood sample obtained from the subject with a fourth affinity ligand specific to a third synaptic protein selected from the group consisting of NPTX2, NPTX1, and NPTXR, wherein the fourth affinity ligand is immobilized on a surface, wherein the third synaptic protein is part of a fourth complex with a fourth synaptic protein selected from the group consisting of NPTX2, NPTX1, and NPTXR, wherein the contacting produces a fifth complex that includes the fourth affinity ligand, the third synaptic protein, and the fourth synaptic protein, wherein the third and fourth synaptic proteins are different proteins; (vii) contacting the fifth complex with a fifth affinity ligand specific to the third synaptic protein and a sixth affinity ligand specific to the fourth synaptic protein, wherein the contacting produces a sixth complex that includes the fifth complex, the fifth affinity ligand, and the sixth affinity ligand, wherein the fifth affinity ligand is conjugated to a second oligonucleotide plus strand and the sixth affinity ligand is conjugated to a second oligonucleotide minus strand; (viii) contacting the fifth complex with a second single-stranded connector oligonucleotide and a ligase enzyme, thereby producing a second LPMOS, wherein the second LPMOS is capable of hybridizing to a second forward primer oligonucleotide and a second reverse primer oligonucleotide; (ix) performing amplification on the second LPMOS, wherein the amplification produces a second proximity signal when the third synaptic protein is within a proximity distance threshold with respect to the fourth synaptic protein; and (x) detecting the second proximity signal in the blood sample, wherein the second proximity signal indicates an amount of the fourth complex in the blood sample; and (xi) quantifying a ratio of the first complex to the fourth complex by dividing the amount of the first complex by the amount of the fourth complex; wherein the subject is determined to not be resilient to the neurological disorder if the ratio of the first complex to the fourth complex in the blood sample of the subject is decreased as compared to a ratio of a first complex to a fourth complex in a reference blood sample, wherein the subject is determined to be resilient to the neurological disorder if the ratio of the first complex to the fourth complex in the blood sample of the subject is unchanged or increased as compared to the ratio of the first complex to the fourth complex in the reference blood sample.

In another aspect, the present disclosure provides a method of assessing resilience in a subject identified as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein selected from the group consisting of NPTX2, NPTX1, and NPTXR, wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein; and (iii) determining an amount of the first complex in the blood sample of the subject; wherein the subject is determined to not be resilient to the neurological disorder if the amount of the first complex in the blood sample of the subject is increased as compared to an amount of a first complex in a reference blood sample, wherein the subject is determined to be resilient to the neurological disorder if the amount of the first complex in the blood sample of the subject is unchanged or decreased as compared to an amount of a first complex in the reference blood sample.

In another aspect, the present disclosure provides a method of assessing resilience in a subject identified as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein (e.g., any one of the synaptic proteins listed in Table 1), wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein; and (iii) determining an amount of the first complex in the blood sample of the subject; wherein the subject is determined to not be resilient to the neurological disorder if the amount of the first complex in the blood sample of the subject is decreased as compared to an amount of a first complex in a reference blood sample, wherein the subject is determined to be resilient to the neurological disorder if the amount of the first complex in the blood sample of the subject is unchanged or increased as compared to an amount of a first complex in the reference blood sample.

In another aspect, the present disclosure provides a method of assessing resilience in a subject identified as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein (e.g., any one of the synaptic proteins listed in Table 1), wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein; (iii) determining an amount of the first complex in the blood sample of the subject; (iv) contacting a blood sample obtained from the subject with a fourth affinity ligand specific to a third synaptic protein selected from the group consisting of NPTX2, NPTX1, and NPTXR, wherein the fourth affinity ligand is immobilized on a surface, wherein the third synaptic protein is part of a third complex with a fourth synaptic protein selected from the group consisting of NPTX2, NPTX1, and NPTXR, wherein the contacting produces a fourth complex that includes the fourth affinity ligand, the third synaptic protein, and the fourth synaptic protein, wherein the third and fourth synaptic proteins are different proteins; (v) contacting the fourth complex with a fifth affinity ligand specific to the third synaptic protein and a sixth affinity ligand specific to the fourth synaptic protein; and (vi) determining an amount of the third complex in the blood sample of the subject; and (vii) quantifying a ratio of the first complex to the third complex by dividing the amount of the first complex by the amount of the third complex; wherein the subject is determined to not be resilient to the neurological disorder if the ratio of the first complex to the third complex in the blood sample of the subject is decreased as compared to a ratio of a first complex to a fourth complex in a reference blood sample, wherein the subject is determined to be resilient to the neurological disorder if the ratio of the first complex to the third complex in the blood sample of the subject is unchanged or decreased as compared to a ratio of a first complex to a fourth complex in a reference blood sample.

In another aspect, the present disclosure provides a method of determining therapeutic efficacy of an agent in a subject identified as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein selected from the group consisting of NPTX2, NPTX1, and NPTXR, wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein, wherein the contacting produces a third complex that includes the second complex, the second affinity ligand, and the third affinity ligand, wherein the second affinity ligand is conjugated to an oligonucleotide plus strand and the third affinity ligand is conjugated to an oligonucleotide minus strand; (iii) contacting the third complex with a single-stranded connector oligonucleotide and a ligase enzyme, thereby producing an LPMOS, wherein the LPMOS is capable of hybridizing to a forward primer oligonucleotide and a reverse primer oligonucleotide; (iv) performing amplification on the LPMOS, wherein the amplification produces a proximity signal when the first synaptic protein is within a proximity distance threshold with respect to the second synaptic protein; and (v) detecting the proximity signal in the blood sample, wherein the proximity signal indicates an amount of the first complex in the blood sample; wherein the agent is determined to be therapeutically effective in the subject if the amount of the first complex in the blood sample of the subject is unchanged or decreased as compared to an amount of a first complex in a reference blood sample.

In another aspect, the present disclosure provides a method of determining therapeutic efficacy of an agent in a subject identified as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein (e.g., any one of the synaptic proteins listed in Table 1), wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein, wherein the contacting produces a third complex that includes the second complex, the second affinity ligand, and the third affinity ligand, wherein the second affinity ligand is conjugated to an oligonucleotide plus strand and the third affinity ligand is conjugated to an oligonucleotide minus strand; (iii) contacting the third complex with a single-stranded connector oligonucleotide and a ligase enzyme, thereby producing an LPMOS, wherein the LPMOS is capable of hybridizing to a forward primer oligonucleotide and a reverse primer oligonucleotide; (iv) performing amplification on the LPMOS, wherein the amplification produces a proximity signal when the first synaptic protein is within a proximity distance threshold with respect to the second synaptic protein; and (v) detecting the proximity signal in the blood sample, wherein the proximity signal indicates an amount of the first complex in the blood sample; wherein the agent is determined to be therapeutically effective in the subject if the amount of the first complex in the blood sample of the subject is unchanged or increased as compared to an amount of a first complex in a reference blood sample.

In another aspect, the present disclosure provides a method of determining therapeutic efficacy of an agent in a subject identified as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein (e.g., any one of the synaptic proteins listed in Table 1), wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein, wherein the contacting produces a third complex that includes the second complex, the second affinity ligand, and the third affinity ligand, wherein the second affinity ligand is conjugated to a first oligonucleotide plus strand and the third affinity ligand is conjugated to a second oligonucleotide minus strand; (iii) contacting the third complex with a first single-stranded connector oligonucleotide and a ligase enzyme, thereby producing a first LPMOS, wherein the first LPMOS is capable of hybridizing to a first forward primer oligonucleotide and a first reverse primer oligonucleotide; (iv) performing amplification on the first LPMOS, wherein the amplification produces a first proximity signal when the first synaptic protein is within a proximity distance threshold with respect to the second synaptic protein; (v) detecting the first proximity signal in the blood sample, wherein the first proximity signal indicates an amount of the first complex in the blood sample; (vi) contacting a blood sample obtained from the subject with a fourth affinity ligand specific to a third synaptic protein selected from the group consisting of NPTX2, NPTX1, and NPTXR, wherein the fourth affinity ligand is immobilized on a surface, wherein the third synaptic protein is part of a fourth complex with a fourth synaptic protein selected from the group consisting of NPTX2, NPTX1, and NPTXR, wherein the contacting produces a fifth complex that includes the fourth affinity ligand, the third synaptic protein, and the fourth synaptic protein, wherein the third and fourth synaptic proteins are different proteins; (vii) contacting the fifth complex with a fifth affinity ligand specific to the third synaptic protein and a sixth affinity ligand specific to the fourth synaptic protein, wherein the contacting produces a sixth complex that includes the fifth complex, the fifth affinity ligand, and the sixth affinity ligand, wherein the fifth affinity ligand is conjugated to a second oligonucleotide plus strand and the sixth affinity ligand is conjugated to a second oligonucleotide minus strand; (viii) contacting the fifth complex with a second single-stranded connector oligonucleotide and a ligase enzyme, thereby producing a second LPMOS, wherein the second LPMOS is capable of hybridizing to a second forward primer oligonucleotide and a second reverse primer oligonucleotide; (ix) performing amplification on the second LPMOS, wherein the amplification produces a second proximity signal when the third synaptic protein is within a proximity distance threshold with respect to the fourth synaptic protein; and (x) detecting the second proximity signal in the blood sample, wherein the second proximity signal indicates an amount of the fourth complex in the blood sample; and (xi) quantifying a ratio of the first complex to the fourth complex by dividing the amount of the first complex by the amount of the fourth complex; wherein the agent is determined to be therapeutically effective in the subject if the ratio of the first complex to the fourth complex in the blood sample of the subject is unchanged or increased as compared to a ratio of a first complex to a fourth complex in a reference blood sample.

In another aspect, the present disclosure provides a method of determining therapeutic efficacy of an agent in a subject identified as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein selected from the group consisting of NPTX2, NPTX1, and NPTXR, wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein; and (iii) determining an amount of the first complex in the blood sample of the subject; wherein the agent is determined to be therapeutically effective in the subject if the amount of the first complex in the blood sample of the subject is unchanged or decreased as compared to an amount of a first complex in a reference blood sample.

In another aspect, the present disclosure provides a method of determining therapeutic efficacy of an agent in a subject identified as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein (e.g., any one of the synaptic proteins of Table 1), wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein; and (iii) determining an amount of the first complex in the blood sample of the subject; wherein the agent is determined to be therapeutically effective in the subject if the amount of the first complex in the blood sample of the subject is unchanged or increased as compared to an amount of a first complex in a reference blood sample.

In another aspect, the present disclosure provides a method of determining therapeutic efficacy of an agent in a subject identified as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein (e.g., any one of the synaptic proteins listed in Table 1), wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein; (iii) determining an amount of the first complex in the blood sample of the subject; (iv) contacting a blood sample obtained from the subject with a fourth affinity ligand specific to a third synaptic protein selected from the group consisting of NPTX2, NPTX1, and NPTXR, wherein the fourth affinity ligand is immobilized on a surface, wherein the third synaptic protein is part of a third complex with a fourth synaptic protein selected from the group consisting of NPTX2, NPTX1, and NPTXR, wherein the contacting produces a fourth complex that includes the fourth affinity ligand, the third synaptic protein, and the fourth synaptic protein, wherein the third and fourth synaptic proteins are different proteins; (v) contacting the fourth complex with a fifth affinity ligand specific to the third synaptic protein and a sixth affinity ligand specific to the fourth synaptic protein; and (vi) determining an amount of the third complex in the blood sample of the subject; and (vii) quantifying a ratio of the first complex to the third complex by dividing the amount of the first complex by the amount of the third complex; wherein the agent is determined to be therapeutically effective in the subject if the ratio of the first complex to the third complex in the blood sample of the subject is unchanged or increased as compared to a ratio of a first complex to a third complex in a reference blood sample.

In another aspect, the present disclosure provides a method of assessing learning and memory in a subject identified as having or at risk of developing a neurological disease or disorder, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein selected from the group consisting of NPTX2, NPTX1, and NPTXR, wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein, wherein the contacting produces a third complex that includes the second complex, the second affinity ligand, and the third affinity ligand, wherein the second affinity ligand is conjugated to an oligonucleotide plus strand and the third affinity ligand is conjugated to an oligonucleotide minus strand; (iii) contacting the third complex with a single-stranded connector oligonucleotide and a ligase enzyme, thereby producing an LPMOS, wherein the LPMOS is capable of hybridizing to a forward primer oligonucleotide and a reverse primer oligonucleotide; (iv) performing amplification on the LPMOS, wherein the amplification produces a proximity signal when the first synaptic protein is within a proximity distance threshold with respect to the second synaptic protein; and (v) detecting the proximity signal in the blood sample, wherein the proximity signal indicates an amount of the first complex in the blood sample; wherein an increase in the amount of the first complex in the blood sample of the subject as compared to an amount of a first complex in a reference blood sample indicates reduced learning and memory in the subject.

In another aspect, the present disclosure provides a method of assessing learning and memory in a subject identified as having or at risk of developing a neurological disease or disorder, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein (e.g., any one of the synaptic proteins listed in Table 1), wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein, wherein the contacting produces a third complex that includes the second complex, the second affinity ligand, and the third affinity ligand, wherein the second affinity ligand is conjugated to an oligonucleotide plus strand and the third affinity ligand is conjugated to an oligonucleotide minus strand; (iii) contacting the third complex with a single-stranded connector oligonucleotide and a ligase enzyme, thereby producing an LPMOS, wherein the LPMOS is capable of hybridizing to a forward primer oligonucleotide and a reverse primer oligonucleotide; (iv) performing amplification on the LPMOS, wherein the amplification produces a proximity signal when the first synaptic protein is within a proximity distance threshold with respect to the second synaptic protein; and (v) detecting the proximity signal in the blood sample, wherein the proximity signal indicates an amount of the first complex in the blood sample; wherein an decrease in the amount of the first complex in the blood sample of the subject as compared to an amount of a first complex in a reference blood sample indicates reduced learning and memory in the subject.

In another aspect, the present disclosure provides a method of assessing learning and memory in a subject identified as having or at risk of developing a neurological disease or disorder, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein (e.g., any one of the synaptic proteins listed in Table 1), wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein, wherein the contacting produces a third complex that includes the second complex, the second affinity ligand, and the third affinity ligand, wherein the second affinity ligand is conjugated to a first oligonucleotide plus strand and the third affinity ligand is conjugated to a second oligonucleotide minus strand; (iii) contacting the third complex with a first single-stranded connector oligonucleotide and a ligase enzyme, thereby producing a LPMOS, wherein the first LPMOS is capable of hybridizing to a first forward primer oligonucleotide and a first reverse primer oligonucleotide; (iv) performing amplification on the first LPMOS, wherein the amplification produces a first proximity signal when the first synaptic protein is within a proximity distance threshold with respect to the second synaptic protein; (v) detecting the first proximity signal in the blood sample, wherein the first proximity signal indicates an amount of the first complex in the blood sample; (vi) contacting a blood sample obtained from the subject with a fourth affinity ligand specific to a third synaptic protein selected from the group consisting of NPTX2, NPTX1, and NPTXR, wherein the fourth affinity ligand is immobilized on a surface, wherein the third synaptic protein is part of a fourth complex with a fourth synaptic protein selected from the group consisting of NPTX2, NPTX1, and NPTXR, wherein the contacting produces a fifth complex that includes the fourth affinity ligand, the third synaptic protein, and the fourth synaptic protein, wherein the third and fourth synaptic proteins are different proteins; (vii) contacting the fifth complex with a fifth affinity ligand specific to the third synaptic protein and a sixth affinity ligand specific to the fourth synaptic protein, wherein the contacting produces a sixth complex that includes the fifth complex, the fifth affinity ligand, and the sixth affinity ligand, wherein the fifth affinity ligand is conjugated to a second oligonucleotide plus strand and the sixth affinity ligand is conjugated to a second oligonucleotide minus strand; (viii) contacting the fifth complex with a second single-stranded connector oligonucleotide and a ligase enzyme, thereby producing a second LPMOS, wherein the second LPMOS is capable of hybridizing to a second forward primer oligonucleotide and a second reverse primer oligonucleotide; (ix) performing amplification on the second LPMOS, wherein the amplification produces a second proximity signal when the third synaptic protein is within a proximity distance threshold with respect to the fourth synaptic protein; and (x) detecting the second proximity signal in the blood sample, wherein the second proximity signal indicates an amount of the fourth complex in the blood sample; and (xi) quantifying a ratio of the first complex to the fourth complex by dividing the amount of the first complex by the amount of the fourth complex; wherein a reduced ratio of the first complex to the fourth complex in the blood sample of the subject as compared to a ratio of a first complex to a fourth complex in a reference blood sample indicates reduced learning and memory in the subject.

In another aspect, the present disclosure provides a method of assessing learning and memory in a subject identified as having or at risk of developing a neurological disease or disorder, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein selected from the group consisting of NPTX2, NPTX1, and NPTXR, wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein; and (iii) determining an amount of the first complex in the blood sample of the subject; wherein an increase in the amount of the first complex in the blood sample of the subject as compared to an amount of a first complex in a reference blood sample indicates reduced learning and memory in the subject.

In another aspect, the present disclosure provides a method of assessing learning and memory in a subject identified as having or at risk of developing a neurological disease or disorder, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein (e.g., any one of the synaptic proteins listed in Table 1), wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein; and (iii) determining an amount of the first complex in the blood sample of the subject; wherein an decrease in the amount of the first complex in the blood sample of the subject as compared to an amount of a first complex in a reference blood sample indicates reduced learning and memory in the subject.

In another aspect, the present disclosure provides a method of assessing learning and memory in a subject identified as having or at risk of developing a neurological disease or disorder, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein (e.g., any one of the synaptic proteins listed in Table 1), wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein; (iii) determining an amount of the first complex in the blood sample of the subject; (iv) contacting a blood sample obtained from the subject with a fourth affinity ligand specific to a third synaptic protein selected from the group consisting of NPTX2, NPTX1, and NPTXR, wherein the fourth affinity ligand is immobilized on a surface, wherein the third synaptic protein is part of a third complex with a fourth synaptic protein selected from the group consisting of NPTX2, NPTX1, and NPTXR, wherein the contacting produces a fourth complex that includes the fourth affinity ligand, the third synaptic protein, and the fourth synaptic protein, wherein the third and fourth synaptic proteins are different proteins; (v) contacting the fourth complex with a fifth affinity ligand specific to the third synaptic protein and a sixth affinity ligand specific to the fourth synaptic protein; and (vi) determining an amount of the third complex in the blood sample of the subject; and (vii) quantifying a ratio of the first complex to the third complex by dividing the amount of the first complex by the amount of the third complex; wherein a reduced ratio of the first complex to the third complex in the blood sample of the subject as compared to a ratio of a first complex to a fourth complex in a reference blood sample indicates reduced learning and memory in the subject.

In another aspect, the present disclosure provides a method of quantifying an amount of a synaptic protein complex that includes two or more synaptic proteins in a blood sample of a subject identified as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein selected from the group consisting of NPTX2, NPTX1, and NPTXR, wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein, wherein the contacting produces a third complex that includes the second complex, the second affinity ligand, and the third affinity ligand, wherein the second affinity ligand is conjugated to an oligonucleotide plus strand and the third affinity ligand is conjugated to an oligonucleotide minus strand; (iii) contacting the third complex with a single-stranded connector oligonucleotide and a ligase enzyme, thereby producing an LPMOS, wherein the LPMOS is capable of hybridizing to a forward primer oligonucleotide and a reverse primer oligonucleotide; (iv) performing amplification on the LPMOS, wherein the amplification produces a proximity signal when the first synaptic protein is within a proximity distance threshold with respect to the second synaptic protein; and (v) detecting the proximity signal in the blood sample, wherein the proximity signal indicates the amount of the synaptic protein complex in the blood sample.

In another aspect, the present disclosure provides a method of quantifying an amount of a synaptic protein complex that includes two or more synaptic proteins in a blood sample of a subject identified as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein (e.g., any one of the synaptic proteins listed in Table 1), wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein, wherein the contacting produces a third complex that includes the second complex, the second affinity ligand, and the third affinity ligand, wherein the second affinity ligand is conjugated to an oligonucleotide plus strand and the third affinity ligand is conjugated to an oligonucleotide minus strand; (iii) contacting the third complex with a single-stranded connector oligonucleotide and a ligase enzyme, thereby producing an LPMOS, wherein the LPMOS is capable of hybridizing to a forward primer oligonucleotide and a reverse primer oligonucleotide; (iv) performing amplification on the LPMOS, wherein the amplification produces a proximity signal when the first synaptic protein is within a proximity distance threshold with respect to the second synaptic protein; and (v) detecting the proximity signal in the blood sample, wherein the proximity signal indicates the amount of the synaptic protein complex in the blood sample.

In another aspect, the present disclosure provides a method of quantifying an amount of a synaptic protein complex that includes two or more synaptic proteins in a blood sample of a subject identified as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein selected from the group consisting of NPTX2, NPTX1, and NPTXR, wherein the contacting produces a second complex that includes the first affinity ligand, the first synaptic protein, and the second synaptic protein, wherein the first and second synaptic proteins are different proteins; (ii) contacting the second complex with a second affinity ligand specific to the first synaptic protein and a third affinity ligand specific to the second synaptic protein; and (iii) determining an amount of the first complex in the blood sample of the subject; wherein the amount of the first complex indicates the quantity of the synaptic protein complex in a blood sample of the subject.

In another aspect, the present disclosure provides a method of quantifying an amount of a synaptic protein complex that includes two or more synaptic proteins in a blood sample of a subject identified as having or at risk of developing a neurological disorder, the method including the steps of: (i) contacting a blood sample obtained from the subject with a first affinity ligand specific to a first synaptic protein selected from the group consisting of NPTX2, NPTX1, and NPTXR, wherein the first affinity ligand is immobilized on a surface, wherein the first synaptic protein is part of a first complex with a second synaptic protein, wherein the contacting produces a second complex that includes the first affinity ligand, the first synaptic protein (e.g., any one of the synaptic proteins listed in Table 1), and the second synaptic protein, wherein the first and second synaptic proteins are different proteins; (ii) contacting the second complex with a second affinity ligand specific to the first synaptic protein and a third affinity ligand specific to the second synaptic protein; and (iii) determining an amount of the first complex in the blood sample of the subject; wherein the amount of the first complex indicates the quantity of the synaptic protein complex in a blood sample of the subject.

In some embodiments of any of the foregoing aspects, the first synaptic protein is NPTX2 and the second synaptic protein is NPTXR or the first synaptic protein is NPTXR and the second synaptic protein is NPTX2. In some embodiments of any of the foregoing aspects, the first synaptic protein is NPTX1 and the second synaptic protein is NPTXR or the first synaptic protein is NPTXR and the second synaptic protein is NPTX1. In some embodiments of any of the foregoing aspects, the first synaptic protein is NPTX2 and the second synaptic protein is NPTX1 or the first synaptic protein is NPTX1 and the second synaptic protein is NPTX2. In some embodiments of any of the foregoing aspects and embodiments, the third synaptic protein is NPTX2 and the fourth synaptic protein is NPTXR or the third synaptic protein is NPTXR and the fourth synaptic protein is NPTX2. In some embodiments of any of the foregoing aspects, the third synaptic protein is NPTX1 and the fourth synaptic protein is NPTXR or the third synaptic protein is NPTXR and the fourth synaptic protein is NPTX. In some embodiments, the first synaptic protein is NPTX2 and the second synaptic protein is NPTX1 or the third synaptic protein is NPTX1 and the fourth synaptic protein is NPTX2.

In some embodiments of any of the foregoing aspects, the first synaptic protein is NPTX2 and the second synaptic protein is glutamate ionotropic receptor AMPA type subunit 4 (GluA4). In some embodiments of any of the foregoing aspects, the first synaptic protein is NPTX1 and the second synaptic protein is GluA4. In some embodiments of any of the foregoing aspects, the first synaptic protein is NPTXR and the second synaptic protein is GluA4. In some embodiments of any of any one of the foregoing aspects, the first synaptic protein is NPTX2 and the second synaptic protein is glutamate ionotropic receptor AMPA type subunit 1 (GluA1). In some embodiments of any of the foregoing aspects, the first synaptic protein is NPTX1 and the second synaptic protein is GluA1. In some embodiments of any of the foregoing aspects, the first synaptic protein is NPTXR and the second synaptic protein is GluA1.

In some embodiments of the foregoing aspects and embodiments, the second affinity ligand comprises a first proximity detector and the third affinity ligand comprises a second proximity detector. In some embodiments, the first and second proximity detectors generate a first proximity signal when the first synaptic protein is within a proximity distance threshold with respect to the second synaptic protein; wherein the first proximity signal indicates the amount of the first complex in the blood sample of the subject. In some embodiments, the fifth affinity ligand comprises a third proximity detector and the third affinity ligand comprises a fourth proximity detector. In some embodiments, the third and fourth proximity detectors generate a second proximity signal when the third synaptic protein is within a proximity distance threshold with respect to the fourth synaptic protein; wherein the second proximity signal indicates the amount of the third complex in the blood sample of the subject.

In some embodiments of any of the foregoing aspects and embodiments, the first, second, third, and/or fourth proximity detectors are selected from the group consisting of oligonucleotides, fluorescence resonance energy transfer (FRET) chromophores or bioluminescence resonance energy transfer (BRET) chromophores, biomolecular fluorescence complementation (BiFC) protein or fragments thereof, and an enzyme capable of producing a reactive biotin species.

In some embodiments of any of the foregoing aspects and embodiments, the first, second, third, and/or fourth proximity detectors are oligonucleotides. In some embodiments, the first and third proximity detectors comprise an oligonucleotide plus strand (e.g., SEQ ID NO: 1) and the second and fourth proximity detectors comprise an oligonucleotide minus strand (e.g., SEQ ID NO: 2). In some embodiments, the oligonucleotide plus and minus strands are configured to hybridize to a connector oligonucleotide (e.g., SEQ ID NO: 3). In some embodiments, the oligonucleotide plus strand is configured to hybridize to a forward primer (e.g., SEQ ID NO: 4) and the oligonucleotide minus strand is configured to hybridize to a reverse primer (e.g., SEQ ID NO: 5).

In some embodiments of any of the foregoing aspects and embodiments, the first, second, third, and/or fourth proximity detectors are FRET or BRET chromophores. In some embodiments, the FRET or BRET chromophores comprise a pair of fluorescent proteins selected from the group consisting of cyan fluorescent protein (CFP)-yellow fluorescent protein (YFP) pair and luciferase-YFP. In some embodiments, each of the proteins in the pair of fluorescent proteins are, independently, fused or conjugated to a distinct proximity detector.

In some embodiments of any of the foregoing aspects and embodiments, the first, second, third, and fourth proximity detectors comprise an enzyme capable of producing a reactive biotin species. In some embodiments, the enzyme capable of producing a reactive biotin species is selected from the group consisting of an E. coli biotin ligase, A. aeolicus biotin ligase, B. subtilis biotin ligase, and ascorbate peroxidase. In some embodiments, the enzyme capable of producing a reactive biotin species comprises two complementary halves of the enzyme, wherein each of the two complementary halves are, independently, fused or conjugated to a distinct proximity detector.

In some embodiments of any of the foregoing aspects and embodiments, the first and second and/or third and fourth proximity detectors are each, independently, complementary halves of a bimolecular BiFC protein. In some embodiments, the BiFC protein is enhanced green fluorescent protein (EGFP), YFP, enhanced CFP (ECFP), red fluorescent protein (RFP), enhanced blue fluorescent protein (EBFP), mCherry, mHoneydew, mBanana, mOrange, tdTomato, mTangerine, mStrawberry, mCherry, mGrape1, mRaspberry, mGrape2, mPlum, dsRed, or a luciferase (e.g., sea pansy luciferase, firefly luciferase, click beetle luciferase, copepod luciferase, bacterial luciferase, or dinoflagellate luciferase).

In some embodiments of the foregoing aspects and embodiments, each of the first, second, third, fourth, fifth, and/or sixth affinity ligands comprise an antibody or an antigen-binding fragment thereof, a single-chain polypeptide or oligopeptide, or an aptamer (e.g., a nucleic acid aptamer). In some embodiments, the first, second, third, fourth, fifth, and/or sixth affinity ligand is an antibody or an antigen-binding fragment thereof. In some embodiments, the first, second, third, fourth, fifth, and/or sixth affinity ligand is a single-chain polypeptide or oligopeptide. In some embodiments, the single-chain polypeptide or oligopeptide is a snake venom toxin. In some embodiments, the snake venom toxin is taipoxin. In some embodiments, the first, second, third, fourth, fifth, and/or sixth affinity ligand is an aptamer.

In some embodiments of any of the foregoing aspects and embodiments, the neurological disorder is selected from a group consisting of a neurodegenerative disorder, neurodevelopmental disorder, and neuropsychiatric disorder. In some embodiments, the neurodegenerative disorder is age-related cognitive decline, Alzheimer's disease (AD; e.g., late onset (sporadic) or familial AD), Down syndrome, normal pressure hydrocephalus, Alzheimer's disease-related dementia (ADRD) Parkinson's disease, Huntington's disease, motor neuron disease, spinocerebellar ataxia, spinal muscular atrophy, Friedreich's ataxia, prion disease, or a lysosomal storage disorder. In some embodiments, the AD is sporadic AD or familial AD. In some embodiments, the ADRD is frontotemporal dementia, Lewy body dementia, vascular contributions to cognitive impairment, and dementia, or mixed etiology dementias. In some embodiments, the neurodevelopmental disorder is intellectual disability, X-linked intellectual disability, learning disorder, autism spectrum disorder, developmental motor disorders, tic disorders, cerebral palsy, communication, speech, and language disorders, Fragile X syndrome, Down syndrome, attention deficit hyperactivity disorder, or a neurodevelopmental disorder due to a neurotoxic agent. In some embodiments, the neuropsychiatric disorder is major depression, bipolar disorder, obsessive compulsive disorder, eating disorder, or schizophrenia.

In some embodiments of any of the forgoing aspects and embodiments, the blood sample is a serum sample or a plasma sample.

In some embodiments of any of the forgoing aspects and embodiments, the proximity distance threshold is no more than 40 nm, 35 nm, 25 nm, 20 nm, 15 nm, 10 nm, 5 nm, or 1 nm.

In some embodiments of any of the forgoing aspects and embodiments, one or more of the first, second, third, and/or fourth synaptic proteins are isolated from an exosome from the sample of the subject.

In some embodiments of any of the forgoing aspects and embodiments, the amplification is performed using quantitative real-time polymerase chain reaction.

In some embodiments of any of the forgoing aspects and embodiments, the subject is a human.

DEFINITIONS

Figure 1:
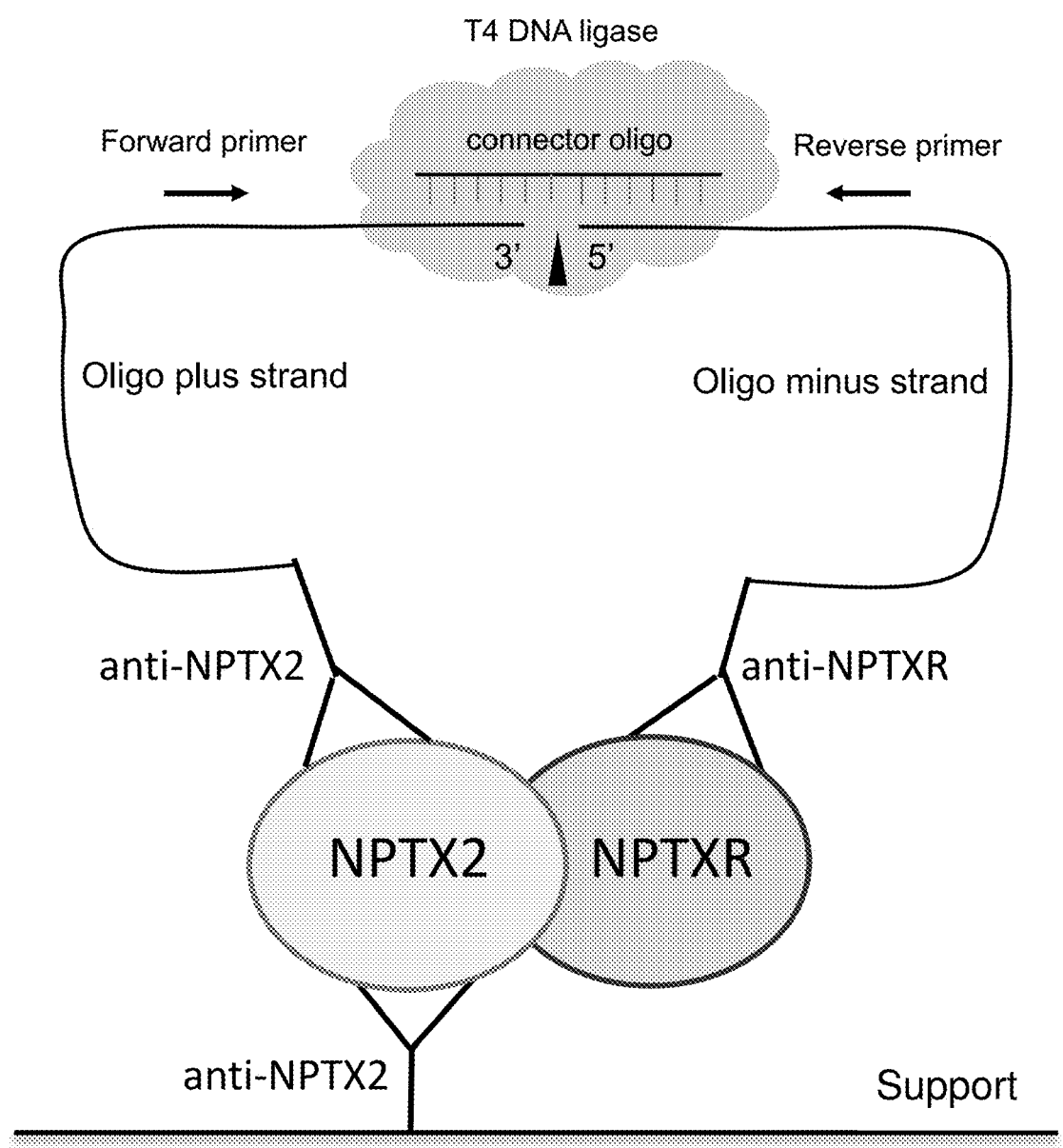
FIG. 1 shows a schematic diagram of an exemplary proximity ligation assay (PLA) of the disclosure. A blood sample (e.g., blood, serum, or plasma) from a subject (e.g., a subject identified as having or at risk of developing a neurological disorder) is contacted in a reaction vessel (e.g., a plate) with a first anti-neuronal pentraxin 2 (NPTX2) antibody immobilized on a surface (e.g., a solid support, e.g., a plate, a resin, a particle, a container) in order to capture synaptic protein complexes containing NPTX2 and neuronal pentraxin receptor (NPTXR). The immobilized anti-NPTX2 antibody captures the NPTX2-NPTXR complex on the surface of the reaction vessel. A second anti-NPTX2 antibody conjugated to a 5' end of an oligonucleotide plus strand (e.g., SEQ ID NO: 1) and an anti-PTXR antibody conjugated to a 3' end of an oligonucleotide minus strand (e.g., SEQ ID NO: 2) are added to the reaction mixture. A ligation mixture containing a connector (e.g., splint) oligonucleotide (SEQ ID NO: 3) capable of binding at or near the 3' end of the oligonucleotide plus strand and at or near the 5' end of the oligonucleotide minus strand, and a ligase (e.g., T4 DNA ligase) is then added to the reaction vessel. Given sufficient physical proximity between the plus and minus strands, the connector oligonucleotide will hybridize to both the plus and the minus strands, bringing them sufficiently close as to facilitate ligation of the 3' end of the plus strand to the 5' end of the minus strand at the ligation site marked by the black arrowhead. The ligated plus-minus oligonucleotide strand (LPMOS) is subsequently amplified using quantitative real-time polymerase chain reaction (qRT-PCR) by annealing a forward primer (e.g., SEQ ID NO: 4) upstream of the ligation site and a reverse primer (SEQ ID NO: 5) downstream of the ligation site. The amplified LPMOS is quantified to assess the level of the target synaptic proteins, in this case a complex of NPTX2 and NPTXR, in the blood sample of the subject.

For convenience, the meaning of some terms and phrases used in the specification, examples, and appended claims are provided below. Unless stated otherwise, or implicit from context, the following terms and phrases include the meanings provided below. The definitions are provided to aid in describing particular embodiments and are not intended to limit the claimed technology. Unless otherwise defined, all technical and scientific terms used herein have the same meaning as commonly understood by one of ordinary skill in the art to which this technology belongs. If there is an apparent discrepancy between the usage of a term in the art and its definition provided herein, the definition provided within the specification shall prevail.

As used herein, "a" or "an" means "at least one" or "one or more" unless otherwise indicated. In addition, the singular forms "a," "an," and "the" include plural referents unless the context clearly dictates otherwise.

As used herein, the terms "ascorbate peroxidase" and "APX" refer to a protein belonging to a family of heme-containing peroxidases that catalyze peroxide-dependent oxidation of various biological substrates. APX may be used in a proximity labeling assay (such as, e.g., a proximity labeling assay disclosed herein) to label a substrate molecule (e.g., protein or nucleic acid) with biotin. APX performs biotinylation by generating a reactive biotin derivative that diffuses from the active site and labels nearby proteins. Accordingly, APX, as used herein, may refer to a proximity detector molecule that facilitates the detection of proteins in close physical proximity by labeling said proteins with biotin, which can be subsequently detected using biochemical methods (i.e., streptavidin-based detection, e.g., streptavidin affinity matrix).

As used herein, "Alzheimer's disease" and "AD" refer to a late-onset neurodegenerative disorder presenting as cognitive decline, insidious loss of short- and long-term memory, attention deficits, language-specific problems, disorientation, impulse control, social withdrawal, anhedonia, and other symptoms. Brain tissue of AD patients exhibits neuropathological features such as extracellular aggregates of amyloid-β protein and neurofibrillary tangles of hyperphosphorylated microtubule-associated tau proteins. Accumulation of these aggregates is associated with neuronal loss and atrophy in a number of brain regions including the frontal, temporal, and parietal lobes of the cerebral cortex as well as subcortical structures like the basal forebrain cholinergic system and the locus coeruleus within the brainstem.

As used herein, the terms "Alzheimer's disease related dementia" and "ADRD" generally refer to related neurological (e.g., neurodegenerative disorders) featuring dementia as a prominent symptom. Non-limiting examples of ADRD include frontotemporal degeneration, Lewy body dementia, vascular contributions to cognitive impairment and dementia, and mixed etiology dementias.

As used herein, the term "antibody" refers to a molecule that specifically binds to, or is immunologically reactive with, a particular antigen and includes at least the variable domain of a heavy chain, and normally includes at least the variable domains of a heavy chain and of a light chain of an immunoglobulin. Antibodies and antigen-binding fragments, variants, or derivatives thereof include, but are not limited to, polyclonal, monoclonal, multispecific, human, humanized, primatized, or chimeric antibodies, heteroconjugate antibodies (e.g., bi- tri- and quad-specific antibodies, diabodies, triabodies, and tetrabodies), single-domain antibodies (sdAb), epitope-binding fragments, e.g., Fab, Fab' and $F(ab')_2$, Fd, Fvs, single-chain Fvs (scFv), rIgG, single-chain antibodies, disulfide-linked Fvs (sdFv), fragments containing either a $V_L$ or $V_H$ domain, fragments produced by an Fab expression library, and anti-idiotypic (anti-Id) antibodies. Antibody molecules of the invention can be of any type (e.g., IgG, IgE, IgM, IgD, IgA, and IgY), class (e.g., IgG1, IgG2, IgG3, IgG4, IgA1 and IgA2) or subclass of immunoglobulin molecule. Moreover, unless otherwise indicated, the term "monoclonal antibody" (mAb) is meant to include both intact molecules as well as antibody fragments (such as, for example, Fab and $F(ab')_2$ fragments) that are capable of specifically binding to a target protein. Fab and $F(ab')_2$ fragments lack the Fc fragment of an intact antibody.

The term "antigen-binding fragment," as used herein, refers to one or more fragments of an immunoglobulin that retain the ability to specifically bind to a target antigen. The antigen-binding function of an immunoglobulin can be performed by fragments of a full-length antibody. The antibody fragments can be a Fab, $F(ab')_2$, scFv, SMIP, diabody, a triabody, an affibody, a nanobody, an aptamer, or a domain antibody. Examples of binding fragments encompassed by the term "antigen-binding fragment" of an antibody include, but are not limited to: (i) a Fab fragment, a monovalent fragment consisting of the $V_L$, $V_H$, $C_L$, and $C_H1$ domains; (ii) a $F(ab')_2$ fragment, a bivalent fragment containing two Fab fragments linked by a disulfide bridge at the hinge region; (iii) a Fd fragment consisting of the $V_H$ and $C_H1$ domains; (iv) a Fv fragment consisting of the $V_L$ and $V_H$ domains of a single arm of an antibody, (v) a dAb (Ward et al., Nature 341:544-546, 1989) including $V_H$ and $V_L$ domains; (vi) a dAb fragment that consists of a $V_H$ domain; (vii) a dAb that consists of a $V_H$ or a $V_L$ domain; (viii) an isolated complementarity determining region (CDR); and (ix) a combination of two or more isolated CDRs which may optionally be joined by a synthetic linker. Furthermore, although the two domains of the Fv fragment, $V_L$ and $V_H$, are coded for by separate genes, they can be joined, using recombinant methods, by a linker that enables them to be made as a single protein chain in which the $V_L$ and $V_H$ regions pair to form monovalent molecules (known as single chain Fv (scFv)). These antibody fragments can be obtained using conventional techniques known to those of skill in the art, and the fragments can be screened for utility in the same manner as intact antibodies. Antigen-binding fragments can be produced by recombinant DNA techniques, enzymatic or chemical cleavage of intact immunoglobulins, or, in certain cases, by chemical peptide synthesis procedures known in the art.

As used herein, the term "aptamer" refers to a synthetic non-coding polynucleotide that can adopt specific three-dimensional conformations and bind to a specific molecule, such as a protein, so to modulate its biological activity. Aptamers typically consist of short strands of oligonucleotides. As described herein, aptamers may be used as ligands for binding to a protein or protein complex in order to facilitate the detection and quantification of the protein or protein complex. Said aptamer may be further conjugated to one or more proximity detectors disclosed herein (e.g., an oligonucleotide, a FRET/BRET fluorophore, or APX/BioID).

As used herein, the terms "bioluminescence resonance energy transfer" and "BRET" refer to a method similar to fluorescence resonance energy transfer (FRET; see below), except for the use of a bioluminescent chromophore which does not require external illumination to emit a detectable signal.

As used herein, the terms "BirA biotin-protein ligase" refer to a protein commonly used as part of a BioID method that facilitates screening of protein-protein interactions by promiscuously biotinylating proteins based on physical proximity. The BirA ligase or functional fragments thereof may be fused or conjugated to a biological molecule (e.g., a protein or a nucleic acid) of interest, which may subsequently be contacted with a sample (e.g., a blood sample) of a subject. Any protein that is physically proximal to the intact ligase is labeled with a biotin moiety, which can be subsequently detected using standard detection protocols (e.g., streptavidin-based detection).

As used herein, the term "blood sample" refers to a specimen (e.g., blood or blood component (e.g., serum or plasma)) isolated from a subject.

As used herein, and unless otherwise indicated, the term "complementary," when used to describe a first nucleotide or nucleoside sequence in relation to a second nucleotide or nucleoside sequence, refers to the ability of an oligonucleotide or polynucleotide that includes the first nucleotide or nucleoside sequence to hybridize and form a duplex structure under certain conditions with an oligonucleotide or polynucleotide that includes the second nucleotide sequence, as will be understood by the skilled person. Physiologically relevant conditions as can be encountered inside an organism, can apply. The skilled person will be able to determine the set of conditions most appropriate for a test of complementarity of two sequences in accordance with the ultimate application of the hybridized nucleotides or nucleosides.

As used herein, the term "complex" refers to a group of two or more polypeptides and constitutes a form of quaternary protein structure. Proteins in a complex are generally linked by non-covalent protein-protein interactions and may be involved in biological functions requiring coordinated activity of the complexed proteins. Types of protein complexes may include obligate complexes in which the stability of a protein's structure may be increased by forming a complex with one or more additional proteins. Non-obligate protein complexes include proteins whose folding is sufficiently stable as to not require additional proteins to improve thermodynamic stability. Protein complexes may be temporally transient or may have long half-lives. For example, obligate protein complexes may have longer half-lives as compared to non-obligate complexes.

As used herein, the terms "connector oligonucleotide" and "splint oligonucleotide" refers to a short nucleic acid sequence that is capable of hybridizing by complementary base pairing to one or more nucleic acid molecules (e.g., oligonucleotides or polynucleotides). A connector oligonucleotide may, e.g., bring two oligonucleotide strands (e.g., a plus strand and a minus strand) to sufficient physical proximity so as to facilitate ligation of the two oligonucleotide strands (e.g., by way of a ligase) and subsequent amplification of the ligated oligonucleotide product.

As used herein, the term "contacting" refers to bringing two or more biological samples and/or molecules (e.g., a blood sample of a subject and an affinity ligand, such as, e.g., an antibody) into sufficient physical proximity as to facilitate physical interaction. Contacting may be done by any possible means. For example, contacting a blood sample with an antibody includes contacting the blood sample in vitro with the antibody. The contacting may be done directly or indirectly. Thus, for example, the antibody may be put into physical contact with the blood sample by the individual performing the method, or alternatively, the antibody may be put into a situation that will permit or cause it to subsequently come into contact with the blood sample. Contacting a blood sample in vitro may be done, for example, by incubating the blood sample with the antibody.

As used herein, the term "exosome" refers to a membrane-tethered extracellular vesicle produced by the endosome of eukaryotic cells that is typically from about 30-150 nm in diameter. Exosomes are produced from the intraluminal vesicles of a multivesicular body that fuse with the cell surface and released as exosomes. Exosomes generally carry markers of cells of origin and are involved in cellular waste management and transport of cargo (e.g., proteins and/or RNA) to nearby cells.

As used herein, the terms "fluorescence resonance energy transfer" (also known as Förster resonance energy transfer) and "FRET" refer to a method of producing a detectable light signal by facilitating energy transfer between two light-sensitive molecules (chromophores). The basic principle of FRET is the transfer of energy from a donor chromophore in an excited electronic state to an acceptor chromophore through non-radiative dipole-dipole coupling. The strength of the FRET signal can be used to ascertain the physical proximity of two fluorophores or ligands attached to said fluorophores.

As used herein, the term "fluorophore" refers to a fluorescent agent (e.g., chemical compound or protein) that emits light of a particular wavelength upon excitation with light of the same or different wavelength. According to the disclosed methods, a fluorophore (e.g., a FRET or biomolecular fluorescence complementation (BiFC) fluorophore) may function as a proximity detector that signals the physical proximity between two or more proteins in a complex.

As used herein, the terms "Glutamate Ionotropic Receptor AMPA Type Subunit 1" and "GluA1" (also known as GluR1) refer to a subunit of α-amino-3-hydroxy-5-methyl-4-isoxazolepropionic acid (AMPA) receptors encoded by the GRIA1 gene and localized at the post-synaptic neuronal membrane. GluA1 subunits typically exist as dimers in AMPA receptors and may interact with components of the post-synaptic density. GluA1 is critical for regulation of AMPA receptor localization, conductance, and open probability by phosphorylation at one or more of four phosphorylation sites. GluA1 also mediates synaptic plasticity, and may, therefore, be important for learning and memory. While GluA1 may be expressed on excitatory or inhibitory neurons, it is thought to be particularly important in mediating excitation of parvalbumin-positive (PV+) interneurons, and thus, regulation of neuronal inhibition and subsequent transmission of activity through neuronal ensembles.

As used herein, the terms "Glutamate Ionotropic Receptor AMPA Type Subunit 4" and "GluA4" (also called GluRA-D2) refer to a subunit of AMPA receptors encoded by the GRIA4 gene and localized at the post-synaptic neuronal membrane. Similar to GluA1, the GluA4 AMPA receptor subunit exists as a dimer and may interact with components of the post-synaptic density. Increased channel kinetics normally result from incorporation of GluA4 subunits into AMPA receptors, thereby, establishing a critical role of this receptor in the timing and duration of synaptic excitation.

Mice with deletions of NPTX2/NPTXR proteins have been shown to have reduced GluA4 expression particularly in PV+ interneurons and subsequent alteration in neuronal network activity.

As used herein, the terms "increasing" and "decreasing" refer to modulating resulting in, respectively, greater or lesser amounts, of function, expression, or activity of a metric relative to a reference. For example, subsequent to contacting a blood sample with an affinity ligand (e.g., an antibody or an antigen-binding fragment thereof, single-chain polypeptide or oligopeptide, or aptamer) in a method described herein, the amount of a marker of a metric (e.g., proximity signal) as described herein may be increased or decreased by at least 5%, 10%, 15%, 20%, 25%, 30%, 35%, 40%, 45%, 50%, 55%, 60%, 65%, 70%, 75%, 80%, 85%, 90%, 95%, or 98% or more relative to a control reference sample. Generally, the metric is measured subsequent to contact with the ligand.

As used herein, the term "affinity ligand" refers to a biological molecule, such as, e.g., a protein (e.g., a single-chain polypeptide, oligopeptide, antibody, or an antigen-binding fragment thereof) or a nucleic acid (e.g., an aptamer) capable of non-covalently binding to a synaptic protein (e.g., NPTX2, NPTX1, NPTXR or any one of the synaptic proteins listed in Table 1).

As used herein, the terms "ligated plus-minus oligonucleotide strand" and "LPMOS" refer to a polynucleotide or oligonucleotide product resulting from the ligation (e.g., by way of a ligase, such as a T4 DNA ligase) of an oligonucleotide plus-strand (e.g., SEQ ID NO: 1) with an oligonucleotide minus strand (e.g., SEQ ID NO: 2) each hybridized to a common connector oligonucleotide.

As used herein, the phrase "learning and memory" refers to a cognitive ability that encompasses the acquisition of skills or knowledge and expression of acquired skills or knowledge (e.g., learning to say a new word and uttering the new word, respectively). "Learning and memory" refers to two independent processes of 1) acquiring new skills or knowledge (i.e., learning); and 2) processing, storing, and recalling the learned skill or knowledge (i.e., memory), which may differ by timescales (learning is generally slower and more effortful than recalling a memory or performing a learned skill) and neurobiological basis. A patient diagnosed with an neurological disorder (e.g., a neurodegenerative, neurodevelopmental, or neuropsychiatric disorder described herein) may have impaired learning and memory relative to a healthy reference patient or population of patients.

As used herein, the terms "Neuronal Pentraxin 1" and "NPTX1" refer to a protein encoded by the NPTX1 gene, which is expressed exclusively in the nervous system. The NPTX1 gene belongs to a family of conserved proteins featuring a cyclic multimeric structure. NPTX1 is a secreted glycoprotein involved in reuptake of synaptic debris into the pre-synaptic cell or neighboring glia.

As used herein, the terms "Neuronal Pentraxin 2" and "NPTX2" refer to a protein encoded by the NPTX2 immediate early gene, which is expressed in the nervous system, liver, kidney, and testes. The NPTX2 gene belongs to a family of conserved proteins featuring a cyclic multimeric structure. NPTX2 is a calcium-dependent lectin capable of binding to ligands in a calcium-dependent fashion. Individual NPTX2 units can form a cyclic pentamer structure. Post-synaptic neuronal AMPA receptors have been shown to associate with NPTX2 at excitatory synapses. NPTX2 has also been shown to be involved in the clustering of different AMPA receptor subunits, including GluA1, GluA2, and GluA3, and is considered to be involved in the development, maturation, and stabilization of excitatory synapses. As an immediate early gene, NPTX2 expression is upregulated by synaptic activity and may be particularly important in balancing synaptic excitation and inhibition within the CNS.

As used herein, the terms "Neuronal Pentraxin Receptor" and "NPTXR" refer to a transmembrane protein encoded by the NPTXR gene, which functions as a receptor for neuronal pentraxin proteins, NPTX1 and NPTX2. NPTXR is known to interact with the GluA1 and GluA4 proteins through its pentraxin domain, and its ablation has been associated with decreased excitatory post-synaptic specializations.

As used herein, the term "normalize," with respect to a mathematical quantity, refers to a method of dividing a numerical quantity (e.g., of a quantity of a first protein or a first protein complex) by another numerical quantity (e.g., of a quantity of a second protein or a second protein complex) to produce a ratio between the two numbers.

As used herein, the term "oligonucleotide" is defined as it is generally understood by the skilled person as a molecule that includes two or more covalently linked nucleosides. Such covalently bound nucleosides may also be referred to as nucleic acid molecules or oligomers. Oligonucleotides are commonly made in the laboratory by solid-phase chemical synthesis followed by purification. When referring to a sequence of the oligonucleotide, reference is made to the sequence or order of nucleobase moieties of the covalently linked nucleotides or nucleosides. The oligonucleotide of the invention may be man-made, and is chemically synthesized, and is typically purified or isolated. The term "oligonucleotide" may refer to a short polynucleotide (e.g., of 100 or fewer linked nucleosides).

The oligonucleotide may be of any length that permits detection of one or more synaptic proteins disclosed herein, and may range from about 10-50 base pairs in length, e.g., about 15-50 base pairs in length or about 18-50 base pairs in length, for example, about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 base pairs in length, such as about 15-30, 15-29, 15-28, 15-27, 15-26, 15-25, 15-24, 15-23, 15-22, 15-21, 15-20, 15-19, 15-18, 15-17, 18-30, 18-29, 18-28, 18-27, 18-26, 18-25, 18-24, 18-23, 18-22, 18-21, 18-20, 19-30, 19-29, 19-28, 19-27, 19-26, 19-25, 19-24, 19-23, 19-22, 19-21, 19-20, 20-30, 20-29, 20-28, 20-27, 20-26, 20-25, 20-24, 20-23, 20-22, 20-21, 21-30, 21-29, 21-28, 21-27, 21-26, 21-25, 21-24, 21-23, or 21-22 base pairs in length. Ranges and lengths intermediate to the above recited ranges and lengths are also contemplated to be part of the invention.

As used herein, the term "oligonucleotide minus strand" refers to a short (e.g., about 60 nucleotides in length) oligonucleotide that is conjugated at its 3' end to a ligand (e.g., single-chain polypeptide, oligopeptide, antibody, antigen-binding fragment thereof, or aptamer). In the case of conjugation to a protein, such as an antibody or an antigen-binding fragment thereof, the oligonucleotide minus strand may feature an amino group at its 3' end as to facilitate formation of a peptide bond with the carboxy terminal of the protein. The 5' end of the minus strand includes 5' monophosphate moiety and a connector oligonucleotide-binding region of generally between 6 and 15 nucleotides that is capable of hybridizing to the connector oligonucleotide by complementary base pairing.

As used herein, the term "oligonucleotide plus strand" refers to a short (e.g., about 60 nucleotides in length) oligonucleotide that is conjugated at its 5' end to a ligand (e.g., single-chain polypeptide, oligopeptide, antibody, antigen-binding fragment thereof, or aptamer). In the case of conjugation to a protein, such as an antibody or an antigen-binding fragment thereof, the oligonucleotide plus strand may feature an amino group at its 5' end as to facilitate formation of a peptide bond with the carboxy terminal of the protein. The 3' end of the plus strand includes an —OH group and a connector oligonucleotide-binding region of generally between 6 and 15 nucleotides that is capable of hybridizing to the connector oligonucleotide by complementary base pairing.

"Percent (%) sequence identity" with respect to a reference polynucleotide or single-chain polypeptide sequence is defined as the percentage of nucleic acids or amino acids in a candidate sequence that are identical to the nucleic acids or amino acids in the reference polynucleotide or single-chain polypeptide sequence, after aligning the sequences and introducing gaps, if necessary, to achieve the maximum percent sequence identity. Alignment for purposes of determining percent nucleic acid or amino acid sequence identity can be achieved in various ways that are within the capabilities of one of skill in the art, for example, using publicly available computer software such as BLAST, BLAST-2, or Megalign software. Those skilled in the art can determine appropriate parameters for aligning sequences, including any algorithms needed to achieve maximal alignment over the full length of the sequences being compared. For example, percent sequence identity values may be generated using the sequence comparison computer program BLAST. As an illustration, the percent sequence identity of a given nucleic acid or amino acid sequence, A, to, with, or against a given nucleic acid or amino acid sequence, B, (which can alternatively be phrased as a given nucleic acid or amino acid sequence, A that has a certain percent sequence identity to, with, or against a given nucleic acid or amino acid sequence, B) is calculated as follows:

100 multiplied by (the fraction X/Y)

where X is the number of nucleotides or amino acids scored as identical matches by a sequence alignment program (e.g., BLAST) in that program's alignment of A and B, and where Y is the total number of nucleic acids in B. It will be appreciated that where the length of nucleic acid or amino acid sequence A is not equal to the length of nucleic acid or amino acid sequence B, the percent sequence identity of A to B will not equal the percent sequence identity of B to A.

As used herein, the terms "polypeptide" is taken to encompass all peptides described in this invention and refers to any polymer consisting essentially of amino acids, regardless of its size, which maintains a comparable level of cross-reactivity to the cross-reactivity of the unmodified polypeptide from which it is derived. Although "protein" is often used in reference to relatively large polypeptides, and "peptide" is often used in reference to small polypeptides, usage of these terms in the art overlaps and varies. The term "polypeptide" as used herein thus refers interchangeably to peptides and polypeptides, unless otherwise noted. Further, the term "polypeptide" is meant to encompass any derivative thereof. A derivative refers to a modified or altered form of the native or original polypeptide. As used herein, a derivative will have a comparable level of cross-reactivity to the cross-reactivity of the unmodified polypeptide from which it is derived. Such modifications include, but are not limited to, amino acid substitutions, modifications, additions or deletions, alterations in the pattern of lipidation, glycosylation or phosphorylation, reactions of free amino, carboxyl, or hydroxyl side groups of the amino acid residues present in the polypeptide with other organic and non-organic molecules, and other modifications, any of which may result in changes in primary, secondary or tertiary structure.

As used herein, the term "proximity detector" refers to a molecule (e.g., a nucleic acid or a protein) that may be used to detect the physical proximity of two or more synaptic proteins in a blood sample of a subject. The proximity detector may be conjugated or fused to an affinity ligand molecule (e.g., single-chain polypeptide, oligopeptide, aptamer, or antibody or an antigen-binding fragment thereof) and may produce a proximity signal when two proximity detectors, each attached to a different affinity ligand, are sufficiently close as to allow for direct or indirect (e.g., by way of an intermediary molecule(s)) physical contact between the two proximity detectors. For example, two proximity detectors that are oligonucleotides (e.g., a plus strand (e.g., SEQ ID NO: 1) and a minus strand (e.g., SEQ ID NO: 2)) may each be independently conjugated to two separate antibodies, wherein each of the antibodies is, independently, bound to a distinct synaptic protein. In the presence of a connector oligonucleotide that is capable of hybridizing to both of the plus and minus strands, and given sufficient physical proximity between the two synaptic proteins, proximity detector oligonucleotides can hybridize to the connector oligonucleotide to form a duplex between each of the plus and minus strand and the connector strand. Upon hybridization with the connector, a ligase enzyme (e.g., a T4 DNA ligase) can be used to ligate the plus and minus strand to produce a ligated plus-minus oligonucleotide strand (LPMOS). Subsequent to the formation of the LPMOS, primer oligonucleotides are annealed to regions downstream and upstream of the connector-binding region of the plus and minus strands, respectively and qRT-PCR is performed to amplify the LPMOS product. The intensity of the amplicon is a direct proxy of the physical proximity (e.g., a proximity signal) between the two synaptic proteins bound with oligonucleotide-conjugated ligands.

As used herein, the term "proximity distance threshold" refers to the minimal distance between two synaptic proteins required to allow for the detection of any physical protein-protein interactions between the two synaptic proteins. According to the present disclosure, a proximity distance threshold may be 40 nm or less (e.g., 35 nm, 30 nm, 25 nm, 20 nm, 15 nm, 10 nm, 5 nm, 4 nm, 3 nm, 2 nm, 1 nm, or less).

As used herein, the term "proximity signal" refers to a signal capable of being detected in an assay disclosed herein. Generally, the proximity signal is a proxy for the physical proximity between two or more synaptic proteins existing in a complex in a sample (e.g., blood sample, such as, e.g., blood, serum, or plasma) obtained from a subject (e.g., a human). Such a proximity signal is produced when two proximity detectors (e.g., oligonucleotide-based proximity detectors, FRET/BRET-based proximity detectors, BiFC-based proximity detectors, or APX/BirA-based proximity detectors) are within a sufficient physical proximity (e.g., within a proximity distance threshold) to one another as to allow for direct or indirect physical interaction between the two proximity detectors.

As used herein, the terms "quantity" or "amount" refers to a level of a protein (e.g., a synaptic protein) or a complex of proteins. By a "decreased quantity" or an "increased quantity" of a protein or a complex of proteins is meant a decrease or increase in the protein or complex level, as compared to a reference (e.g., a decrease or an increase by about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 100%, about 150%, about 200%, about 300%, about 400%, about 500%, or more; a decrease or an increase of more than about 10%, about 15%, about 20%, about 50%, about 75%, about 100%, or about 200%, as compared to a reference; a decrease or an increase by less than about 0.01-fold, about 0.02-fold, about 0.1-fold, about 0.3-fold, about 0.5-fold, about 0.8-fold, or less; or an increase by more than about 1.2-fold, about 1.4-fold, about 1.5-fold, about 1.8-fold, about 2.0-fold, about 3.0-fold, about 3.5-fold, about 4.5-fold, about 5.0-fold, about 10-fold, about 15-fold, about 20-fold, about 30-fold, about 40-fold, about 50-fold, about 100-fold, about 1000-fold, or more). A level of a protein may be expressed in mass/vol (e.g., g/dL, mg/mL, μg/mL, ng/mL) or percentage relative to total protein in a sample.

As used herein, the term "reference blood sample" refers to a blood sample (e.g., blood, serum, or plasma) obtained from a reference subject or population of subjects that do not have nor are suspected of having or developing a neurological disorder (e.g., a neurodegenerative, neurodevelopmental, or neuropsychiatric disorder).

As used herein, the term "resilience" refers to a phenomenon in subjects who live into old age without symptoms of a neurological disorder (e.g., a neurodegenerative disorder, such as, e.g., AD), but are posthumously found to have a high burden of disease pathology (e.g., amyloid beta plaques and tangles of hyperphosphorylated tau protein) in the CNS. Resilient subjects fail to exhibit cognitive decline that is characteristic of Alzheimer's patients having a similar burden.

As used herein, the terms "subject" and "patient" refer to an animal (e.g., a mammal, such as a human). A subject to be diagnosed according to the methods described herein may be one who has been identified as having a with a neurological disorder or one at risk of developing this condition. Non-limiting examples of a neurological disorder include neurodegenerative disease (e.g., AD (e.g., sporadic or familial AD), Down syndrome, age-related cognitive decline, Parkinson's disease, Huntington's disease, frontotemporal lobar degeneration, motor neuron disease, spinocerebellar ataxia, spinal muscular atrophy, Friedreich's ataxia, prior disease, and lysosomal storage disorder), neurodevelopmental disorder (e.g., intellectual disability (e.g., X-linked intellectual disability) learning disorder, autism spectrum disorder, developmental motor disorders, tic disorders, cerebral palsy, communication, speech, and language disorders, Fragile X syndrome, Down syndrome, attention deficit hyperactivity (ADHD) disorder, or a neurodevelopmental disorder due to a neurotoxic agent), and a neuropsychiatric disorder (e.g., major depression, bipolar disorder, obsessive compulsive disorder, eating disorder, and schizophrenia). Diagnosis may be performed using the disclosed methods and/or by any method or technique known in the art. One skilled in the art will understand that a subject to be screened according to the methods of the present disclosure may have been subjected to standard tests or may have been identified, without examination, as one at risk due to the presence of one or more risk factors associated with the disorder.

As used herein, the term "synaptic protein" refers to a protein that is localized to neuronal synapses and may be involved in synaptic function such as scaffolding, neurotransmission, and plasticity, among others. Synaptic proteins may include pre-synaptic and post-synaptic proteins. Non-limiting examples of post-synaptic proteins include neuronal pentraxins (e.g., NPTX2, NPTX1, and NPTXR) or any one of the synaptic proteins listed in Table 1.

As used herein, the terms "vascular contributions to cognitive impairment and dementia" and "VCID" refer to a common form of dementia in older adults resulting from injuries to blood vessels supplying the brain. VCID may occur after one or more strokes. The symptoms of VCID are similar to those of AD and can occur simultaneously.

Other features and advantages of the invention will be apparent from the following Detailed Description, the drawings, and the claims.

DETAILED DESCRIPTION

Featured are methods of diagnosing a subject (e.g., a mammal, such as a human) as having or at risk of developing a neurological disorder (e.g., a neurodegenerative, neurodevelopmental, or neuropsychiatric disorder) by performing a proximity-based protein detection assay (e.g., proximity ligation assay (PLA)) on a blood sample (e.g., blood, plasma, or serum) obtained from the subject. Such methods are suitable detecting the presence of two or more synaptic proteins in a protein complex, wherein an expression level of one or more of the synaptic proteins in the complex may be increased or decreased in the subject having or at risk of developing a neurological disorder as compared to a healthy control subject or population of subjects.

The disclosed methods may be used to diagnose a subject as having or at risk of developing a neurological disease condition, to select a subject identified as having or at risk of developing a neurological disorder for treatment with a therapeutic agent, to assess resilience in a subject identified as having or at risk of developing a neurological disorder, to determine the therapeutic efficacy of a therapeutic agent in a subject identified as having or at risk of developing a neurological disorder, or to assess learning and memory in a subject identified as having or at risk of developing a neurological disorder. Additionally, the disclosed methods may be used to detect the presence of a complex that includes two or more synaptic proteins in a blood sample of a subject identified as having or at risk of developing a neurological disorder.

The present disclosure is based, in part, on the inventors' discovery that detection and quantification of specific synaptic proteins, namely neuronal pentraxins (e.g., Neuronal Pentraxin 1 (NPTX1), Neuronal Pentraxin 2 (NPTX2), and Neuronal Pentraxin Receptor (NPTXR), using the disclosed assays can robustly identify differences in expression levels of said synaptic proteins between patients with a neurological disorder (i.e., Alzheimer's disease (AD)), thereby facilitating the diagnosis and prognosis of patients with AD. The disclosed methods are generally suitable for diagnosing a broad range of neurological disorders, including neurodegenerative, neurodevelopmental, and neuropsychiatric disorders.

Synaptic Proteins

The methods disclosed herein provide a robust approach to detecting levels of synaptic proteins (e.g., NPTX2, NPTX1, NPTXR, or any one of the synaptic proteins listed in Table 1) in a blood sample (e.g., blood, serum, or plasma) obtained from a subject (e.g., a human) for the purpose of diagnosing the subject as having or at risk of developing a neurological disorder (e.g., neurodegenerative, neurodevelopmental, or neuropsychiatric disorder). In some embodiments, the synaptic proteins to be detected include neuronal pentraxins (e.g., NPTX2, NPTX1, and/or NPTX1) or any one of the synaptic proteins listed in Table 1. Due to their low circulating levels in the blood, detection of individual synaptic proteins is usually hampered by a low signal-tonoise ratio. The present disclosure leverages the phenomenon that some synaptic proteins exist in transient or chronic complexes with other synaptic proteins, thus allowing for amplification of weak signals using tandem detection of two or more synaptic proteins with proximity-based detection assays.

Neuronal Pentraxin Proteins

Neuronal pentraxin proteins are members of an evolutionarily conserved family of proteins that exhibit pronounced, if not exclusive, expression in the central nervous system (CNS). Pentraxins as a family feature a cyclic multimeric structure and a "pentraxin" signature sequence (His-X-Cys-X-Ser/Thy-Trp-X-Ser/Thy, where x is any amino acid). Neuronally-expressed pentraxins include NPTX1 (UniProt ID: Q15818), NPTX2 (UniProt ID: P47972), and NPTXR (UniProt ID: O95502), each of which exhibit varying degrees of homology to one another. NPTX1 and NPTX2 are secreted glycoproteins, whereas NPTXR is a transmembrane protein that acts as a receptor to secreted neuronal pentraxins. Functionally, NPTX1 has been shown to be involved in clearing synaptic debris through pre-synaptic reuptake mechanisms. NPTX2, also known as the activity-dependent neuronal pentraxin, is an immediate early gene whose expression is increased following sustained neuronal activity. Unlike NPTX1 and NPTXR, NPTX2 expression is not restricted to the CNS but can also be found in the pancreas, liver, kidneys, and testes. The role of NPTX2 in synaptic function and development has been established due to its known interactions with α-amino-3-hydroxy-5-methylisoxazole-4-propionic acid (AMPA) receptors, which are one of the primary excitatory post-synaptic ionotropic receptors in neurons and play a critical role in regulation of synaptic activity, development, maintenance, and plasticity. In particular, NPTX2 has been associated with AMPA receptor-mediated synaptogenesis and clustering of AMPA receptor subunit proteins, including GluA1, GluA2, and GluA3, thereby demonstrating its role in synaptic maturation. NPTX1 and NPTXR have also been found to colocalize with GluA4 subunits in neuronal cultures, suggesting that these pentraxins may play a role in recruiting GluA4 to the synapse.

Alterations in NPTX2 expression and subsequent changes in AMPA receptor function have been associated with animal models of neurodegenerative disease. For example, NPTX2 knock-out rats with amyloidosis exhibit a decrease in GluR4 expression particularly on parvalbumin-positive (PV+) interneurons (Xiao et al., Elife 6:e23798, 2017), leading to reduced GluA4 expression, disrupted neuronal network activity, and increased excitability of excitatory neurons. Reduced NPTX2 and GluA4 levels have also been shown in postmortem cortical tissue of human AD patients and levels of NPTX2 in the cerebrospinal fluid (CSF) are reduced in subjects with AD, correlating with both cognitive function and hippocampal volume. Therefore, these studies suggest that reduced neuronal inhibition resulting from NPTX2-mediated reduction in AMPA receptor subunits on PV+ interneurons of the CNS may account for changes in cognitive function in AD patients. Interestingly, human subjects who are determined posthumously to exhibit an AD plaque burden comparable to that of diagnosed AD patients, but who fail to exhibit the rapid cognitive decline observed in AD (also known as "resilient" subjects), fail to exhibit the reductions in NPTX2 seen in symptomatic AD patients.

Accordingly, one can leverage NPTX2 expression levels as predictive biomarkers for diagnosis and prognosis of neurological disorders such as AD, among others. Moreover, NPTX2 levels may serve as a useful proxy for identifying resilient patients and for selecting treatment strategies in symptomatic patients. Unfortunately, traditional methods of measuring expression of proteins in the CNS are highly invasive and generally require a brain tissue biopsy or a sample of the cerebrospinal fluid (CSF) from the subject. Such methods, which include well-known protocols for measuring proteins or nucleic acids in tissue samples, may also have difficulty in detecting proteins having low levels of expression. Thus, there exists a need for robust assays to detect synaptic proteins whose expression is altered in a neurological disorder (e.g., neuronal pentraxins and associated proteins) that may be performed on a sample obtained by less invasive methods than a brain tissue or CSF biopsy, such as, e.g., a blood sample from the subject.

In other embodiments, the synaptic proteins to be detected are any one of synaptic proteins listed in Table 1.

TABLE 1

List of synaptic proteins

| Protein name | Abbreviated name | UniProt ID | Subcellular localization |
|---|---|---|---|
| Pre-synaptic | | | |
| Amisyn | STXBP6 | Q8NFX7 | Cytoplasm |
| Amphyphysin | AMPH | P49418 | Plasma membrane; synaptic vesicles |
| Basoon | BSN | Q9UPA5 | Cytoplasm |
| Bridging integrator | BIN1 | O00499 | Cytoplasm; synaptic vesicles |
| Calcium Dependent Secretion Activator | CADPS | Q9ULU8 | Cytoplasm; synaptic vesicles |
| Calcium/Calmodulin Dependent Serine Protein Kinase | CASK | O14936 | Cytoplasm |
| CASK Interacting Protein 1 | CASKIN1 | Q8WXD9 | Cytoplasm; synaptic vesicles |
| ELKS/RAB6-Interacting/CAST Family Member 2 | CAST1 | O15083 | Cytoplasm; synaptic vesicles |
| Complexin | CPLX2 | Q6PUV4 | Plasma membrane |
| DNAJ Heat Shock Protein Family (Hsp40) Member C5 | DNAJC5 | Q9H3Z4 | Cytoplasm; synaptic vesicles |
| Double C2 Domain Alpha | DOC2A | Q14183 | Synaptic vesicles |
| Dynamin | DNM2 | P50570 | Cytoplasm; synaptic vesicles |
| Epsin | EPN1 | Q9Y613 | Cytoplasm |

TABLE 1-continued

List of synaptic proteins

| Protein name | Abbreviated name | UniProt ID | Subcellular localization |
| --- | --- | --- | --- |
| Hrs-2 | HGS | O14964 | Cytoplasm; synaptic vesicles |
| Intersectin | ITSN1 | Q15811 | Cytoplasm; synaptic vesicles |
| Latrophilin | LPHN1 | O94910 | Plasma membrane |
| Liprin-α | PPFIA1 | Q13136 | Cytoplasm |
| Amyloid Beta Precursor Protein Binding Family A Member 1 | APBA1 | Q02410 | Cytoplasm |
| Unc-13 Homolog A | UNC13A | Q9UPW8 | Cytoplasm; synaptic vesicles |
| Syntaxin Binding Protein 3 | STXBP3 | O00186 | Cytoplasm; synaptic vesicles |
| Neurexin | NRX1 | P58400 | Plasma membrane |
| N-ethylmaleimide Sensitive Factor, Vesicle Fusing ATPase | NSF | P46459 | Cytoplasm; synaptic vesicles |
| Solute Carrier Family 6 Member 2 | SLC6A2 | P23975 | Synaptic vesicles; plasma membrane |
| Solute Carrier Family 18 Member A3 | SLC18A3 | Q16572 | Synaptic vesicles; plasma membrane |
| Synuclein Alpha | SNCA | P37840 | Plasma membrane; cytoplasm; synaptic vesicles |
| Calcium Voltage-Gated Channel Subunit Alpha 1A | CACNA1A | O00555 | Plasma membrane |
| Microtubule Associated Protein Tau | Tau | P10636 | Plasma membrane; cytoplasm |
| Pallklin | PLDN | Q9UL45 | Cytoplasm; synaptic vesicles |
| Piccolo | PCLO | Q9Y6VO | Cytoplasm |
| RAB3A, Member RAS Oncogene Family | RAB3A | P20336 | Cytoplasm; synaptic vesicles |
| Rabconnectin-3 | DMXL2 | Q8WTV7 | Cytoplasm |
| Rabphilin | RPH3A | Q9Y2JO | Synaptic vesicles |
| Regulating Synaptic Membrane Exocytosis 1 | RIMS1 | Q86UR5 | Plasma membrane |
| RIMS Binding Protein 2 | RIMBP2 | O15034 | Synaptic vesicles |
| Secretory Carrier Membrane Protein 1 | SCAMP1 | O15126 | Synaptic vesicles |
| Synaptosome Associated Protein 25 | SNAP25 | P60880 | Plasma membrane |
| Snapin | SNAPAP | O95295 | Plasma membrane; cytoplasm |
| Stonin-2 | STN2 | Q8WXE9 | Cytoplasm |
| Synaptic Vesicle Glycoprotein 2A | SV2A | Q7L0J3 | Synaptic vesicles |
| Synapsin | SYN1 | P17600 | Synaptic vesicles |
| Synaptogyrin | SYNGR1 | O43759 | Synaptic vesicles |
| Synaptojanin | SNJ1 | O43426 | Cytoplasm; plasma membrane |
| Synaptophysin | SYP | P08247 | Synaptic vesicles |
| Synaptotagmin | SYT1 | P21579 | Synaptic vesicles |
| Synaptophilin | SNPH | O15079 | Plasma membrane |
| Synaptoporin | SNPR | Q8TBG9 | Plasma membrane |
| Syntaxin | STX1A | Q16623 | Plasma membrane |
| Tomosyn | STXBP5 | Q5T5C0 | Plasma membrane |
| Vesicular Associated Membrane Protein 1 | VAMP1 | P63027 | Synaptic vesicles |
| Vesicle Amine Transport 1 | VAT1 | Q99536 | Synaptic vesicles |
| ATPase H+ Transporting V0 Subunit C | ATP6V0C | P27449 | Plasma membrane |
| NSF Attachment Protein Alpha | NAPA | P54920 | Synaptic vesicles |
| Post-synaptic | | | |
| α-actinin-2 | ACTN2 | P35609 | Cytoplasm |
| α-actinin-4 | ACTN4 | O43707 | Cytoplasm |
| Actin Binding LIM Protein 1 | ABLIM1 | O14639 | Cytoplasm |
| Acotinase 2 | ACO2 | Q99798 | N/A |
| ADAM Metalloprotease 2 | ADAM22 | Q9P0K1 | Plasma membrane |
| Ankyrin Repeat and Sterile Alpha Motif Domain Containin 1B | AIDA1 | Q7Z6G8 | Cytoplasm |
| Aldolase, Fructose-Bisphosphate C | ALDOC | P09972 | Cytoplasm |
| Activity Regulated Cytoskeleton Associated Protein | ARC | Q7LC44 | Cytoplasm; endosomes |

TABLE 1-continued

List of synaptic proteins

| Protein name | Abbreviated name | UniProt ID | Subcellular localization |
|---|---|---|---|
| ADP Ribosylation Factor 5 | ARF5 | P84085 | Cytoplasm |
| ATPase Na+/K+ Transporting Subunit Alpha 3 | ATP1A3 | P13637 | Plasma membrane |
| ATPase Na+/K+ Transporting Subunit Beta 1 | ATP1B1 | P05026 | Plasma membrane |
| ATPase H+ Transporting V0 Subunit D1 | ATP6V0D1 | P61421 | Plasma membrane |
| Calcium/Calmodulin Dependent Protein Kinase II Alpha | CAMKIIα | Q9UQM7 | Cytoplasm; plasma membrane |
| Calcium/Calmodulin Dependent Protein Kinase II Beta | CAMKIIβ | Q13554 | Cytoplasm; plasma membrane |
| Capping Actin Protein of Muscle Z-Line Subunit Alpha 2 | CAPZA2 | P47755 | Cytoplasm |
| Collapsin Response Mediator Protein 1 | CRMP1 | Q14194 | Cytoplasm |
| Collapsin Response Mediator Protein 2 | CRMP2 | Q16555 | Cytoplasm |
| DLG Associated Protein 2 | DLGAP2 | Q9P1A6 | Plasma membrane |
| DLG Associated Protein 4 | DLGAP4 | Q9Y2H0 | Plasma membrane |
| Dynamin 1 | DNM1 | Q05193 | Cytoplasm |
| Family With Sequence Similarity 81 Member A | FAM81A | Q8TBF8 | N/A |
| Glyceraldehyde-3-Phosphate Dehydrogenase | GAPDH | P04406 | Cytoplasm |
| Gyanylate Cyclase Activator 1A | GCAP | P43080 | Plasma membrane |
| Gelsolin | GSN | P06396 | Cytoplasm |
| Glutamate Ionotropic Receptor AMPA Type Subunit 1 | GLUA1 | P42261 | Plasma membrane |
| Glutamate Ionotropic Receptor AMPA Type Subunit 2 | GLUA2 | P42262 | Plasma membrane |
| Glutamate Ionotropic Receptor AMPA Type Subunit 3 | GLUA3 | P42263 | Plasma membrane |
| Glutamate Ionotropic Receptor AMPA Type Subunit 4 | GLUA4 | P48058 | Plasma membrane |
| Glutamate Dehydrogenase | GLUD1 | P00367 | Cytoplasm |
| Glutamate Ammonia Ligase | GLUL | P15104 | Plasma membrane; cytoplasm |
| Glutamate Ionotropic Receptor Kainate Type Subunit 2 | GLUK2 | Q13002 | Plasma membrane |
| Glutamate Ionotropic Receptor NMDA Type Subunit 1 | GLUN1 | Q05586 | Plasma membrane |
| Glutamate Ionotropic Receptor NMDA Type Subunit 2A | GLUN2A | Q12879 | Plasma membrane |
| Glutamate Ionotropic Receptor NMDA Type Subunit 2B | GLUN2B | Q13224 | Plasma membrane |
| G Protein Subunit Alpha O1 | GNAO1 | P09471 | Plasma membrane |
| G Protein Subunit Beta 1 | GNB1 | P62873 | Plasma membrane; cytoplasm |
| G Protein Subunit Beta 2 | GNB2 | P62879 | Cytoplasm |
| Homer Scaffold Protein 1 | HOMER1 | Q86YM7 | Cytoplasm |
| IQ Motif And Sec7 Domain ArfGEF1 | IQSEC1 | Q6DN90 | Cytoplasm |
| IQ Motif and Sec7 Domain ArfGEF2 | IQSEC2 | Q5JU85 | Cytoplasm |
| BAR/IMD Domain Containing Adaptor Protein 2 | IRSP53 | Q9UQB8 | Plasma membrane; cytoplasm |
| Kalirin RhoGEF Kinase | KALRN | O60229 | Cytoplasm |
| Potassium Inwardly Rectifying Channel Subfamily J Member 4 | KCNJ4 | P48050 | Plasma membrane |
| Lactate Dehydrogenase A | LDHA | P00338 | Cytoplasm |

TABLE 1-continued

List of synaptic proteins

| Protein name | Abbreviated name | UniProt ID | Subcellular localization |
|---|---|---|---|
| Leucine Rich Glioma Inactivated 1 | LGI1 | O95970 | Cytoplasm |
| Lin-7 Homolog A, Crumbs Cell Polarity Complex Component | LIN7A | O14910 | Plasma membrane |
| Mitogen-Activated Protein Kinase 1 | MAPK1 | P28482 | Cytoplasm |
| Mitogen-Activated Protein Kinase 3 | MAPK3 | P27361 | Cytoplasm |
| Myelin Basic Protein | MBP | P02686 | Plasma membrane; cytoplasm |
| Myelin Oligodendrocyte Glycoprotein | MOG | Q16653 | Plasma membrane |
| Syntaxin Binding Protein 1 | MUNC18-1 | P61764 | Plasma membrane, cytosol |
| Neurofilament Light | NEFL | P07196 | Cytoplasm |
| Neurexin 1 | NRXN1 | P58400 | Plasma membrane |
| N-Ethylmaleimide Sensitive Factor, Vesicle Fusing ATPase | NSF | P46459 | Cytoplasm |
| Protein Phosphatase 2 Catalytic Subunit Alpha | PPP2CA | P67775 | Cytoplasm |
| Protein Phosphatase 3 Catalytic Subunit Alpha | PPP3CA | Q08209 | Plasma membrane; cytoplasm |
| Peroxiredoxin 1 | PRDX1 | Q06830 | Cytoplasm |
| Peroxiredoxin 2 | PRDX2 | P32119 | Cytoplasm |
| Peroxiredoxin 6 | PRDX6 | P30041 | Cytoplasm |
| Protein Kinase C Beta | PKCβ | P05771 | Plasma membrane; cytoplasm |
| Protein Kinase C Gamma | PKCγ | P05129 | Plasma membrane; cytoplasm |
| Pyruvate Kinase M1/2 | PKM | P14618 | Cytoplasm |
| Discs Large MAGUK Scaffold Protein 2 | PSD-93 | Q15700 | Plasma membrane |
| Discs Large MAGUK Scaffold Protein 4 | PSD-95 | P78352 | Plasma membrane |
| RAB6A, Member RAS Oncogene Family | RAB6A | P20340 | Cytoplasm |
| Rac Family Small GTPase 1 | RAC1 | P63000 | Plasma membrane; cytoplasm |
| RAP2A, Membrane of RAS Oncogene Family | RAP2A | P10114 | Cytoplasm |
| Reticulon 1 | RTN1 | Q16799 | Plasma membrane; cytoplasm |
| Discs Large MAGUK Scaffold Protein 3 | SAP102 | Q92796 | Plasma membrane; cytoplasm |
| Sideroflexin 3 | SFXN3 | Q9BWM7 | Plasma membrane |
| Solute Carrier Family Member 3 | SLC25A3 | Q00325 | Plasma membrane |
| Solute Carrier Family Member 4 | SLC25A4 | P12235 | Plasma membrane |
| Solute Carrier Family Member 5 | SLC25A5 | P05141 | Plasma membrane |
| Solute Carrier Family Member 22 | SLC25A22 | Q9H936 | Plasma membrane |
| βII-Spectrin | Spectrin Beta, Non-Erythrocytic 1 | Q01082 | Plasma membrane; cytoplasm |
| Calcium Voltage-Gated Channel Auxiliary Subunit Gamma 2 | STARGAZIN | Q9Y698 | Plasma membrane |
| Synaptic Ras GTPase Activating Protein 1 | SYNGAP | Q96PV0 | Plasma membrane; cytosol |
| Synaptotagmin-1 | SYT1 | P21579 | Plasma membrane; synaptic vesicles |
| Tubulin Alpha 1A | TUBA1A | Q71U36 | Cytoplasm |
| Tubulin Beta 6 Class V | TUBB6 | Q9BUF5 | Cytoplasm |
| Vesicle Associated Membrane Protein 2 | VAMP2 | P63027 | Plasma membrane; synaptic vesicles |
| Voltage Dependent Anion Channel 1 | VDAC1 | P21796 | Plasma membrane |
| Voltage Dependent Anion Channel 2 | VDAC2 | P45880 | Plasma membrane |

TABLE 1-continued

List of synaptic proteins

| Protein name | Abbreviated name | UniProt ID | Subcellular localization |
| --- | --- | --- | --- |
| Tyrosine 3-Monooxygenase/Tryptophan 5-Monooxygenase Activation Protein Eta | 14-3-3η | Q04917 | Plasma membrane; cytoplasm |

In some embodiments, a blood sample of a subject contains one or more neuronal pentraxin proteins (e.g., NPTX2, NPTX1, or NPTXR) complexed with one or more neuronal pentraxin proteins of a different type (e.g., NPTX2-NPTX1, NPTX2-NPTXR, or NPTX1-NPTXR). In some embodiments, a blood sample of a subject contains one or more neuronal pentraxin proteins complexed with one or more of the synaptic proteins listed in Table 1. In some embodiments, the neuronal pentraxin protein is in complex with GluA1 (e.g., NPTX2-GluA1, NPTX1-GluA1, or NPTXR-GluA1). In some embodiments, the neuronal pentraxin protein is in complex with GluA4 (e.g., NPTX2-GluA4, NPTX1-GluA4, or NPTXR-GluA4). In some embodiments, a complex of synaptic proteins contains at least 2 (e.g., at least 2, 3, 4, 5, 6, 7, 8, 9, 10, 15, 20, or more) synaptic proteins. In some embodiments, at least one of the synaptic proteins in the protein complex is a neuronal pentraxin. In some embodiments, at least one of the synaptic proteins in the protein complex is NPTX2. In some embodiments, at least one of the synaptic proteins in the protein complex is NPTX1. In some embodiments, at least one of the synaptic proteins in the protein complex is NPTXR. In some embodiments, at least one of the synaptic proteins in the protein complex is an AMPA receptor subunit. In some embodiments, at least one of the synaptic proteins in the protein complex is GluA1. In some embodiments, at least one of the synaptic proteins in the protein complex is GluA4. In some embodiments, the AMPA receptor subunit protein (e.g., GluA1 or GluA2) is native to an excitatory synapse of an inhibitory CNS neuron (e.g., a parvalbumin-positive interneuron).

In some embodiments, the synaptic proteins in the blood sample of a subject are derived from exosomes in the blood sample.

Assays

Provided herein are methods for measuring and quantifying levels of one or more synaptic proteins, such as neuronal pentraxins (e.g., NPTX1, NPTX2, and/or NPTXR) or any one of the synaptic proteins listed in Table 1, from a blood sample (e.g., blood, serum, or plasma) of a subject (e.g., a mammal, such as a human) diagnosed as having or at risk of developing a neurological disorder (e.g., a neurodegenerative, neurodevelopmental, or neuropsychiatric disorder). The disclosed methods have advantages over traditional methods of assaying protein levels in the CNS as they require a relatively non-invasive process for obtaining a sample from the subject (i.e., by way of phlebotomy) and can be used to quantify synaptic proteins that are typically found at low levels in the blood. Generally, the disclosed assays are based on proximity detection of two or more synaptic proteins in a protein complex in a blood sample of a subject. Detection of at least two synaptic proteins in a complex is advantageous compared to the detection of individual synaptic proteins because detection of individual synaptic proteins is hampered by the low levels of said synaptic proteins in the blood. Moreover, the disclosed assays are particularly advantageous for robustly stratifying subjects as those having or at risk of developing a neurological disorder and healthy individuals. The method is capable of detecting synaptic proteins that exist transiently or chronically as complexes with one or more additional synaptic proteins.

Proximity Ligation Assay

A first proximity-based method disclosed herein for detecting the presence of two or more synaptic proteins in a blood sample obtained from a subject is a method based on the proximity ligation assay (PLA), which is a screening assay capable of detecting physically proximal protein-protein interactions between two or more proteins in a sample. The basic principle behind PLA is that two affinity ligands (e.g., antibodies or antigen binding fragments thereof, single-chain polypeptides, or aptamers) are each independently conjugated to a unique synthetic oligonucleotide (proximity detector). Traditional PLA methods generally incorporate the use of sequence-matched oligonucleotides (e.g., backbone oligonucleotides and splint oligonucleotides) that hybridize to the ligand-conjugated proximity detector oligonucleotides and are converted to circular oligonucleotides by ligation (e.g., by way of a ligase enzyme). Rolling circle amplification is subsequently used to amplify the ligand-conjugated oligonucleotides. The present disclosure provides a modified PLA method in which a first affinity ligand (e.g., single-chain polypeptide, oligopeptide, antibody, or an antigen-binding fragment thereof, or aptamer) specific to a target synaptic protein (e.g., NPTX1, NPTX2, or NPTXR or any one of the synaptic proteins listed in Table 1) is either immobilized on a surface (e.g., a solid support, e.g., a plate, a resin, a particle, a container, a membrane, or a bead) or free-floating in a solution (e.g., a PLA reaction mixture). The former type of PLA in which the first affinity ligand is immobilized on a surface is generally referred to as solid phase PLA, whereas the latter is referred to as homogenous PLA. The advantage of homogenous PLA is that a solid support is not required to immobilize the target protein. In some embodiments, the PLA is solid phase PLA. In some embodiments, the PLA is homogenous PLA. A blood sample (e.g., blood, serum, or plasma) obtained from a subject and containing the one or more of the synaptic proteins is contacted with the first affinity ligand (e.g., immobilized or free-floating affinity ligand). Subsequently, two different affinity ligands conjugated to proximity detector oligonucleotide and specific for the target synaptic protein and another synaptic protein in complex with the target synaptic protein are added to the reaction mixture. A connector oligonucleotide having sequence complementarity with a region of each of the conjugated oligonucleotides is then added along with a ligase enzyme (e.g., a T4 DNA ligase) to ligate the ligand-conjugated oligonucleotides. Primers specific to each of the ligand-conjugated oligonucleotides are subsequently annealed and quantitative real-time polymerase chain reaction (qRT-PCR) is performed to amplify the ligated ligand-conjugated oligonucleotides. A central requirement of this assay is that the two oligonucleotide-conjugated affinity ligands are sufficiently proximal within the sample as to allow for the physical interaction between the ligand-conjugated oligonucleotides and the connector oligonucleotide. Thus, the intensity of the amplified signal correlates (e.g., linearly, supra-linearly, multiplicatively, or exponentially) with the physical proximity of the two affinity ligands, and, thus, the physical proximity of the proteins to which they are bound. The advantage of using the disclosed PLA assay over traditional assays that independently measure the levels of a specific target protein is that PLA methods allow for the detection of a native protein complex as it exists in body fluids (e.g., CSF of blood) and in brain tissue. Therefore, the PLA assays provide an assessment of the function of the target protein in concert with other proteins, and not merely the expression of the target protein.

Another proximity-based method contemplated by the present disclosure for detecting the presence of two or more synaptic proteins in a blood sample obtained from a subject employs fluorescent molecules (e.g., chromophores, such as, e.g., fluorescent proteins) as proximity detectors. Non-limiting examples of fluorescent proximity detectors include FRET, BRET, and BiFC proteins. The core principle behind such methods is the generation of a proximity signal (e.g., a signal indicating the existence of two physically proximal proteins in a protein complex) when two fluorescent or luminescent proteins of a protein pair or two complementary halves of a fluorescent protein are sufficiently close. Such fluorescent or luminescent proteins or complementary fragments thereof may be fused or conjugated to an affinity ligand specific to a synaptic protein using routine methods in order to facilitate detection of said synaptic protein.

Accordingly, the present disclosure provides a proximity-based fluorescence detection method in which a first affinity ligand (e.g., an antibody or an antigen-binding fragment thereof, single-chain polypeptide or oligopeptide, or aptamer) specific to a target synaptic protein (e.g., NPTX1, NPTX2, NPTXR, or any one of the synaptic proteins listed in Table 1) is either immobilized on a surface or free-floating in a solution (e.g., a PLA reaction mixture). A blood sample obtained from a subject and containing the two or more synaptic proteins is contacted with the first affinity ligand (e.g., immobilized or free-floating affinity ligand). Subsequently, two different affinity ligands (e.g., an antibody or an antigen-binding fragment thereof, single-chain polypeptide, oligopeptide, or aptamer), each conjugated to proximity detector oligonucleotide and specific to the target synaptic protein, are added to the reaction mixture. For FRET- or BRET-based detection, each of the affinity ligands is fused or conjugated to a single member of a fluorescent protein pair described herein. For BiFC-based detection, each of the two affinity ligands is fused or conjugated to a complementary half of a BiFC protein. Conventional fluorescence imaging methods are performed to detect a proximity signal generated by close apposition between the two fluorescent proteins (FRET or BRET) or complementary halves of a fluorescent protein (BiFC). The intensity of the fluorescence or luminescence signal corresponds (e.g., linearly, supra-linearly, multiplicatively, or exponentially) with the physical proximity of the two affinity ligands, and, thus, the physical proximity of the synaptic proteins to which they are bound.

Yet another proximity-based detection assay suitable for use with the disclosed methods is based on proximity ligation of reactive biotin species using enzymes capable of biotinylation, such as, e.g., ascorbate peroxidase (APX) and BirA biotin-protein ligase (BirA). This approach is based on the principle that biotinylating enzymes within a sufficient physical proximity to a synaptic protein will label the protein with a biotin moiety that can be detected using conventional methods (e.g., streptavidin-based detection methods, such as, e.g., a streptavidin affinity matrix). Accordingly, a biotinylating enzyme or a functional fragment thereof can be conjugated or fused to an affinity ligand (e.g., a single-chain polypeptide, oligopeptide, antibody or an antigen-binding fragment thereof, or an aptamer) specific to a synaptic protein. When two affinity ligands and their corresponding synaptic proteins are sufficiently close (e.g., within a proximity distance threshold), the biotinylating enzyme acts as a proximity detector by biotinylating the synaptic proteins. The biotin moiety is subsequently detected using, e.g., a streptavidin affinity matrix, to produce a detectable proximity signal that indicates that two or more synaptic proteins interact in a complex.

Affinity Ligands

Affinity ligands suitable for use with the disclosed methods include ligands that bind to one or more binding sites of a synaptic protein (e.g., NPTX1, NPTX2, NPTXR, or any one of the synaptic proteins listed in Table 1). Any ligand that binds to a synaptic protein can be used in the methods described herein, including an antibody or an antigen-binding fragment thereof, a single-chain polypeptide or oligopeptide, or an aptamer. In some embodiments, the affinity ligand is an antibody or an antigen-binding fragment thereof. In some embodiments, the antibody or the antigen-binding fragment thereof is specific to (i.e., preferentially binds to) a synaptic protein. In some embodiments, the affinity ligand is a single-chain polypeptide or oligopeptide. In some embodiments, the single-chain polypeptide or oligopeptide is specific to a synaptic protein. In some embodiments, the affinity ligand is an aptamer (e.g., a nucleic acid aptamer). In some embodiments, the aptamer is specific to a synaptic protein. In some embodiments, the affinity ligand (e.g., a first affinity ligand) is immobilized on a surface (e.g., a solid support, e.g., a plate, a resin, a particle, a container, a membrane, or a bead). In some embodiments, the affinity ligand (e.g., a first affinity ligand) is not immobilized on a surface (e.g., affinity ligand is free-floating in a solution, such as, e.g., a PLA reaction mixture).

i. Antibodies

The present disclosure contemplates the use of antibodies or antigen-binding fragments thereof as affinity ligands that preferentially bind to a synaptic protein (e.g., NPTX1, NPTX2, NPTXR, or any one of the synaptic proteins listed in Table 1) obtained from a blood sample of a subject (e.g., subject diagnosed as having or at risk of developing a neurological disorder). Antibodies or antigen-binding fragments thereof that specifically bind to a synaptic protein are those that do not specifically bind to any proteins other than a specific synaptic protein (e.g., interaction of a target synaptic protein-specific antibody or an antigen-binding fragment thereof with a non-target synaptic protein yields a signal indistinguishable from background). In some embodiments, the antibody or antigen-binding fragment thereof is conjugated or fused to a proximity detector disclosed herein (e.g., an oligonucleotide, a FRET or BRET protein, a BiFC protein or a functional fragment thereof, or a protein capable of biotinylation or a functional fragment thereof).

The antibody may be raised against a human synaptic protein or against a synaptic protein from another animal (e.g., non-human primate, cow, pig, sheep, goat, cat, dog, rat, mouse, rabbit, guinea pig, or any other non-human mammal that expresses the target synaptic protein). The antibody that binds specifically to a target synaptic protein may bind only a human synaptic protein, or may be capable of binding the synaptic protein from humans and other mammals. The antibody can be produced by immunization of an animal (e.g., rabbit, guinea pig, rat, mouse, sheep, donkey, goat, hamster, or chicken) with the synaptic protein.

Additionally, antibodies or antigen-binding fragments thereof suitable for use with the disclosed methods may be used in a variety of forms, such as a monoclonal antibody or antigen-binding fragment thereof, a polyclonal antibody or antigen-binding fragment thereof, a humanized antibody or antigen-binding fragment thereof, a primatized antibody or antigen-binding fragment thereof, a bispecific antibody or antigen-binding fragment thereof, a multi-specific antibody or antigen-binding fragment thereof, a dual-variable immunoglobulin domain, a monovalent antibody or antigen-binding fragment thereof, a chimeric antibody or antigen-binding fragment thereof, a single-chain Fv molecule (scFv), a diabody, a triabody, a nanobody, an antibody-like protein scaffold, a domain antibody, a Fv fragment, a Fab fragment, a F(ab')$_2$ molecule, and a tandem scFv (taFv), among others Antibodies or antigen-binding fragments thereof described herein include those that specifically bind to a synaptic protein with a $K_D$ value of less than 100 nM (e.g., 95 nM, 90 nM, 85 nM, 80 nM, 75 nM, 70 nM, 65 nM, 60 nM, 55 nM, 50 nM, 45 nM, 40 nM, 35 nM, 30 nM, 25 nM, 20 nM, 15 nM, 10 nM, 5 nM, 4 nM, 3 nM, 2 nM, or 1 nM). In some embodiments, the antibodies or antigen-binding fragments thereof described herein specifically bind to a synaptic protein with a $K_D$ value of less than 1 nM (e.g., (e.g., 990 pM, 980 pM, 970 pM, 960 pM, 950 pM, 940 pM, 930 pM, 920 pM, 910 pM, 900 pM, 890 pM, 880 pM, 870 pM, 860 pM, 850 pM, 840 pM, 830 pM, 820 pM, 810 pM, 800 pM, 790 pM, 780 pM, 770 pM, 760 pM, 750 pM, 740 pM, 730 pM, 720 pM, 710 pM, 700 pM, 690 pM, 680 pM, 670 pM, 660 pM, 650 pM, 640 pM, 630 pM, 620 pM, 610 pM, 600 pM, 590 pM, 580 pM, 570 pM, 560 pM, 550 pM, 540 pM, 530 pM, 520 pM, 510 pM, 500 pM, 490 pM, 480 pM, 470 pM, 460 pM, 450 pM, 440 pM, 430 pM, 420 pM, 410 pM, 400 pM, 390 pM, 380 pM, 370 pM, 360 pM, 350 pM, 340 pM, 330 pM, 320 pM, 310 pM, 300 pM, 290 pM, 280 pM, 270 pM, 260 pM, 250 pM, 240 pM, 230 pM, 220 pM, 210 pM, 200 pM, 190 pM, 180 pM, 170 pM, 160 pM, 150 pM, 140 pM, 130 pM, 120 pM, 110 pM, 100 pM, 90 pM, 80 pM, 70 pM, 60 pM, 50 pM, 40 pM, 30 pM, 20 pM, 10 pM, 5 pM, or 1 pM)

Examples of experiments that can be used to determine the $K_D$ or $EC_{50}$ of a synaptic protein-specific antibody or antigen-binding fragment thereof include, e.g., surface plasmon resonance, isothermal titration calorimetry, fluorescence anisotropy, ELISA-based assays, gene expression assays, and protein expression assays, among others. ELISA represents a particularly useful method for analyzing antibody activity, as such assays typically require minimal concentrations of antibodies. A common signal that is analyzed in a typical ELISA assay is luminescence, which is typically the result of the activity of a peroxidase conjugated to a secondary antibody that specifically binds a primary antibody. Antibodies and antigen-binding fragments thereof described herein are capable of binding to a synaptic protein and epitopes therein. Antibodies and antigen-binding fragments thereof described herein may additionally bind isolated peptides derived from a synaptic protein that structurally pre-organize various residues in a manner that simulates the conformation of the above epitopes in the native protein. In a direct ELISA experiment, this binding can be quantified, e.g., by analyzing the luminescence that occurs upon incubation of an HRP substrate (e.g., 2,2'-azino-di-3-ethylbenzthiazoline sulfonate) with an antigen-antibody complex bound to a HRP-conjugated secondary antibody.

Prior to performing the methods described herein to a mammalian subject (e.g., a human), it may be desirable to conjugate the antibody or fragment thereof to a second molecule (e.g., a proximity detector), e g., to facilitate detection of a synaptic protein in a synaptic protein complex. Antibodies and fragments thereof can be conjugated to other molecules at either the N-terminus or C-terminus of a light or heavy chain of the antibody using any one of a variety of established conjugation strategies that are well-known in the art. Examples of pairs of reactive functional groups that can be used to covalently tether an antibody or fragment thereof to another molecule include, without limitation, thiol pairs, carboxylic acids and amino groups, ketones and amino groups, aldehydes and amino groups, thiols and alpha,beta-unsaturated moieties (such as maleimides or dehydroalanine), thiols and alpha-halo amides, carboxylic acids and hydrazides, aldehydes and hydrazides, and ketones and hydrazides.

Antibodies or antigen-binding fragments thereof disclosed herein can be covalently appended directly to another molecule by chemical conjugation as described. Alternatively, fusion proteins containing antibodies or antigen-binding fragments thereof can be expressed recombinantly from a cell (e.g., a eukaryotic cell or prokaryotic cell). This can be accomplished, for example, by incorporating a polynucleotide encoding the fusion protein into the nuclear genome of a cell (e.g., using techniques described herein or known in the art). Optionally, antibodies and fragments thereof described herein can be joined to a second molecule by forming a covalent bond between the antibody and a linker. This linker can then be conjugated to another molecule, or the linker can be conjugated to another molecule prior to ligation to the antibody or fragment thereof. Examples of linkers that can be used for the formation of a conjugate include polypeptide linkers, such as those that contain naturally occurring or non-naturally occurring amino acids. In some embodiments, it may be desirable to include D-amino acids in the linker, as these residues are not present in naturally-occurring proteins and are thus more resistant to degradation by endogenous proteases. Fusion proteins containing polypeptide linkers can be made using conventional chemical synthesis techniques or through recombinant expression of a polynucleotide encoding the fusion protein in a cell (e.g., a prokaryotic or eukaryotic cell). Linkers can be prepared using a variety of strategies that are well known in the art, and depending on the reactive components of the linker, can be cleaved by enzymatic hydrolysis, photolysis, hydrolysis under acidic conditions, hydrolysis under basic conditions, oxidation, disulfide reduction, nucleophilic cleavage, or organometallic cleavage (Leriche et al., *Bioorg Med Chem* 20:571-582, 2012).

In some embodiments, the antibody or antigen-binding fragment is immobilized on a surface (e.g., a solid support, e.g., a plate, a resin, a particle, a container, a membrane, or a bead). In some embodiments, the antibody or antigen-binding fragment is not immobilized on a surface (e.g., antibody or antigen-binding fragment thereof is free-floating in a solution).

ii. Polypeptides

According to the methods disclosed herein, structured (e.g., having a secondary or tertiary structure) or unstructured (i.e., linear) single-chain polypeptides or oligopeptides may be used as affinity ligands that specifically bind to a synaptic protein for detection of two or more synaptic proteins in a protein complex. Within the context of the present disclosure, a polypeptide or oligopeptide affinity ligand may be directed against one or more (e.g., 1, 2, 3, 4, 5, 6, 7, 8, 9, 10, 15, 20, 25, 30, or more) amino acid residues of the synaptic protein. In some embodiments, the polypeptide or oligopeptide includes one or more (e.g., 1, 2, 3, 4, 5, 6, or more) CDRs covalently bound to one another, for instance, by an amide bond, a thioether bond, a carbon-carbon bond, or a disulfide bridge). In some embodiments, the polypeptide or oligopeptide is a recombinant protein. In some embodiments, the polypeptide or oligopeptide includes a portion or fragment of a protein that binds to the synaptic protein in situ. In some embodiments, the portion or fragment of a protein that binds to the synaptic protein may be modified (e.g., mutated) so as to achieve desirable properties, such as, e.g., affinity, solubility, half-life, and stability, among others. In some embodiments, the polypeptides or oligopeptides are engineered synthetic amino acid polymers having a desirable affinity for a synaptic protein. In some embodiments, the single-chain polypeptide or oligopeptide is a snake venom toxin. In some embodiments, the snake venom toxin is taipoxin. In some embodiments, the polypeptide or oligopeptide affinity ligand is conjugated or fused to a proximity detector disclosed herein (e.g., an oligonucleotide, a FRET protein, or a protein capable of biotinylation). In some embodiments, the polypeptide or oligopeptide is immobilized on a surface (e.g., a solid support, e.g., a plate, a resin, a particle, a container, a membrane, or a bead). In some embodiments, the polypeptide or oligopeptide is not immobilized on a surface (e.g., polypeptide or oligopeptide is free-floating in solution).

iii. Aptamers

The present disclosure also contemplates aptamers (e.g., nucleic acid aptamers, such as single-stranded or double-stranded DNA, RNA, or XNA aptamers) for use as affinity ligands that specifically bind to a synaptic protein for detection of two or more synaptic proteins in a protein complex. Aptamers are oligonucleotide (e.g., DNA, RNA, or XNA) or peptide molecules that preferentially bind to target proteins by way of non-covalent interactions (e.g., electrostatic or hydrophobic interactions). In some embodiments, an aptamer affinity ligand is specific to a synaptic protein (e.g., NPTX1, NPTX2, NPTXR, or any one of the synaptic proteins listed in Table 1).

Nucleic acid aptamers can be synthesized using well-known methods, which can involve, e.g., introduction of a nucleotide at each stage in the synthesis reaction to control the final sequence. Certain modified aptamers may be used in any described methods, devices, and kits. Aptamers containing nucleotides containing modified bases have several properties that are different from those of standard aptamers that contain only naturally occurring nucleotides (i.e., unmodified nucleotides), such as, e.g., improved half-life, nuclease resistance, and thermostability. Modified nucleotides can be introduced into the synthesis process at the desired positions in the sequence. Other functionalities may be introduced as desired using known chemical modifications of nucleotides.

Peptide aptamers may also be used in conjunction with the disclosed methods. Peptide aptamers are generally small, ordered, soluble, engineered proteins designed for specific binding to a target molecule. The general structure of peptide aptamers includes one or more peptide loops of variable amino acid sequences linked to a protein scaffold.

In some embodiments, the aptamer affinity ligand includes (e.g., is conjugated or fused to) to a proximity detector disclosed herein (e.g., an oligonucleotide, a FRET protein, or a protein capable of biotinylation). In the case of nucleic acid aptamers combined with an oligonucleotide proximity detector, the aptamer may be synthesized such that the oligonucleotide proximity detector (e.g., oligonucleotide plus or minus strand) is part of the aptamer sequence, without a requirement for conjugation of the oligonucleotide to the aptamer sequence. In some embodiments, the aptamer is immobilized on a surface (e.g., a solid support, e.g., a plate, a resin, a particle, a container, a membrane, or a bead). In some embodiments, the aptamer is not immobilized on a surface (e.g., aptamer is free-floating in a solution).

Proximity Detectors

The disclosed methods are based, in part, on the detection of complexed synaptic proteins in a blood sample of a subject using proximity-based detection assays (e.g., proximity ligation assay described herein) whose sensitivity is dependent on the physical proximity of the synaptic proteins in a protein complex. Such proximity detection may be aided by conjugating a proximity detector to affinity ligands disclosed herein, such that when two or more proximity detector-conjugated affinity ligands are sufficiently adjacent, the proximity detectors can physically interact to produce a proximity signal whose magnitude is proportional (e.g., linearly, supra-linearly, multiplicatively, or exponentially proportional) to the quantity of a target synaptic protein in the protein complex. Accordingly, the present disclosure provides multiple proximity detectors that may be used in conjunction with the methods disclosed herein.

i. Oligonucleotides

In some embodiments, proximity detection of synaptic proteins in a protein complex employs single-stranded oligonucleotides as proximity detectors. The oligonucleotides may be used according to the modified PLA protocol described herein. Specifically, oligonucleotide-based proximity detectors may include an oligonucleotide plus strand (e.g., SEQ ID NO: 1) conjugated to an affinity ligand (e.g., a non-immobilized affinity ligand) that is specific to a first synaptic protein (e.g., NPTX2, NPTX1, or NPTXR) and an oligonucleotide minus strand (e.g., SEQ ID NO: 2) conjugated to a different affinity ligand that is specific to a second synaptic protein (e.g., NPTX2, NPTX1, or NPTXR or any one of the synaptic proteins listed in Table 1, provided that the second synaptic protein is of a different type than the first synaptic protein) that exists in a complex with the first protein. The oligonucleotide plus strand may be conjugated to its corresponding affinity ligand at its 5' end, whereas the oligonucleotide minus strand may be conjugated to its corresponding affinity ligand at its 3' end. The plus and minus strands may include bindings sites for forward (e.g., SEQ ID NO: 4) and reverse primers (e.g., SEQ ID NO: 5) that may be used in a qRT-PCR reaction described herein. In order to detect physical proximity between the plus and minus strands, a connector oligonucleotide (e.g., a splint oligonucleotide, such as, e.g., SEQ ID NO: 3) may be used to hybridize to or near the 3' end of the plus strand and 5' end of the minus strand to produce a duplex structure that brings the plus and minus strands in close apposition. In some embodiments, the oligonucleotide plus strand has between 6 and 15 nucleotides at or near its 3' end (e.g., 20, 19, 18, 17, 16, 15, 14, 13, 12, 11, 10, 9, 8, 7, 6, 5, 4, 3, 2, 1, or 0 nucleotides from the 3' end) that are capable of hybridizing by complementary base pairing (e.g., perfect or partial complementarity) to the connector oligonucleotide. In some embodiments, the oligonucleotide minus strand has between 6 and 15 nucleotides at or near its 5' end (e.g., 20, 19, 18, 17, 16, 15, 14, 13, 12, 11, 10, 9, 8, 7, 6, 5, 4, 3, 2, 1, or 0 nucleotides from the 5' end) that are capable of hybridizing complementary base pairing (e.g., by way of perfect or partial complementarity) to the connector oligonucleotide. The plus and minus strands that are juxtaposed by virtue of their hybridization to the connect oligonucleotide can be ligated using a ligase enzyme which catalyzes the formation of a phosphodiester bond between two adjacent nucleotides (e.g., a T4 DNA ligase, *E. coli* DNA ligase, or a mammalian DNA ligase). Such ligation of the plus and minus oligonucleotide strands produces a ligated plus-minus oligonucleotide strand (LPMOS) that may subsequently be amplified using known methods for nucleic acid amplification (e.g., qRT-PCR). Accordingly, the magnitude of the amplified signal from the LPMOS amplicon indicates the amount of protein complexes containing the first and the second synaptic protein. In some embodiments, the LPMOS amplicon has a length of 60 to 100 (e.g., 65 to 95, 70 to 90, or 75 to 85) nucleotides.

In some embodiments, the oligonucleotide plus strand has a nucleic acid sequence of SEQ ID NO: 1 or is a variant thereof having at least 70% (e.g., at least 75%, 80%, 85%, 90%, 95%, 96%, 97%, 98%, 99%, or more) sequence identity to the nucleic acid sequence of SEQ ID NO: 1.

(SEQ ID NO: 1)
5' CGCATCGCCCTTGGACTACGACTGACGAACCGCTTTGCCTGACTGAT

CGCTAAATCGTG 3'

In some embodiments, the 5' end of the oligonucleotide plus strand includes an amino group. In some embodiments, the oligonucleotide plus strand includes DNA or RNA. In some embodiments, the oligonucleotide plus strand includes 30 to 100 (e.g., 35 to 95, 40 to 90, 45 to 85, 50 to 80, 55 to 75, or 60 to 70) nucleotides or nucleosides. In some embodiments, the oligonucleotide plus strand is capable of hybridizing to a forward primer. In some embodiments, the forward primer has the nucleic acid sequence of SEQ ID NO: 4 (5' CATCGCCCTTGGACTACGA 3') or is a variant thereof having at least 70% (e.g., at least 75%, 80%, 85%, 90%, 95%, 96%, 97%, 98%, 99%, or more) sequence identity to the nucleic acid sequence of SEQ ID NO: 4.

In some embodiments, the oligonucleotide minus strand has a nucleic acid sequence of SEQ ID NO: 2 or is a variant thereof having at least 70% (e.g., at least 75%, 80%, 85%, 90%, 95%, 96%, 97%, 98%, 99%, or more) sequence identity to the nucleic acid sequence of SEQ ID NO: 2.

(SEQ ID NO: 2)
5' TCGTGTCTAAAGTCCGTTACCTTGATTCCCCTAACCCTCTTGAAAAA

TTCGGCATCGGTGA 3'

In some embodiments, the 3' end of the oligonucleotide minus strand includes an amino group. In some embodiments, the 5' end of the oligonucleotide minus strand includes a 5' monophosphate moiety. In some embodiments, the oligonucleotide minus strand includes DNA or RNA. In some embodiments, the oligonucleotide minus strand includes 30 to 100 (e.g., 35 to 95, 40 to 90, 45 to 85, 50 to 80, 55 to 75, or 60 to 70) nucleotides or nucleosides. In some embodiments, the oligonucleotide minus strand is capable of hybridizing to a reverse primer. In some embodiments, the reverse primer has the nucleic acid sequence of SEQ ID NO: 5 (5' GGGAATCAAGGTAACGGACTTTAG 3') or is a variant thereof having at least 70% (e.g., at least 75%, 80%, 85%, 90%, 95%, 96%, 97%, 98%, 99%, or more) sequence identity to the nucleic acid sequence of SEQ ID NO: 5.

In some embodiments, the connector oligonucleotide has a nucleic acid sequence of SEQ ID NO: 3 is a variant thereof having at least 70% (e.g., at least 75%, 80%, 85%, 90%, 95%, 96%, 97%, 98%, 99%, or more) sequence identity to the nucleic acid sequence of SEQ ID NO: 3.

(SEQ ID NO: 3)
5' TACTTAGACACGACACGATTTAGTTT 3'

In some embodiments, the connector oligonucleotide includes DNA or RNA. In some embodiments, the connector oligonucleotide includes 10 to 30 (e.g., 12 to 28, 14 to 26, 16 to 24, or 18 to 22) nucleotides or nucleosides.

ii. Fluorescence Resonance Energy Transfer

The present disclosure also contemplates the use of fluorescence resonance energy transfer (FRET; also known as Förster resonance energy transfer) molecules (e.g., proteins) for use as proximity detectors for detecting the presence of two or more synaptic proteins in a protein complex. The basic principle underlying FRET technology is the transfer of energy between two light-sensitive molecules (chromophores), a donor chromophore and an acceptor chromophore, by way of non-radiative dipole-dipole coupling. Because the efficiency of this energy transfer is inversely proportional to the sixth power of the physical distance between the donor and acceptor chromophores, the FRET method is particularly well-suited to measure distance between the chromophores with high sensitivity. The transfer of energy commences when the excited (acceptor) chromophore emits a virtual (i.e., undetectable) photon that is instantaneously absorbed by the donor chromophore. Given its advantageous properties, the FRET technique is useful for assessing protein-protein interactions, such as, e.g., the physical interactions between synaptic proteins (e.g., NPTX1, NPTX2, NPTXR, or any one of the synaptic proteins listed in Table 1) in a protein complex. The FRET fluorescence signal is amenable to routine fluorescence imaging methods. A number of well-known chromophores have been developed for use with FRET. Non-limiting examples of chromophores suitable for use as FRET proximity detectors include cyan fluorescent protein (CFP)-yellow fluorescent protein (YFP) pairs or any other green fluorescent protein (GFP) derivatives. These proteins can be fused to protein affinity ligands or conjugated to nucleic acid affinity ligands of the disclosure using well-known methods, such as, e.g., the methods described herein.

A variant of FRET, called bioluminescence resonance energy transfer (BRET), may also be used as a proximity detector for use with the disclosed methods. The benefit of BRET as compared to FRET is that it does not require external illumination to commence the fluorescence transfer, thereby improving the signal-to-noise ratio and reducing photobleaching. BRET relies on the use of bioluminescent proteins, such as *R. reniformis* luciferase or *O. gracilirostris* luciferase, or variants thereof.

iii. Bimolecular Fluorescence Complementation

According to the present disclosure, biomolecular fluorescence complementation (BiFC) may also be used for proximity detection methods described herein. BiFC is premised on the production of a fluorescent signal by fusing complementary fragments of a fluorescent reporter protein (e.g., e.g., enhanced GFP, enhanced CFP, YFP, RFP, enhanced BFP, mCherry, mHoneydew, mBanana, mOrange, tdTomato, mTangerine, mStrawberry, mCherry, mGrape1, mRaspberry, mGrape2, mPlum or dsRed) to two target proteins that are thought to interact (e.g., in a protein complex). Physical interaction or proximity between the two target proteins allows for the complementary fluorescent protein fragments to interact, thereby returning the protein to its native structure, and resulting in the production of a fluorescence signal. Accordingly, one complementary fragment of a fluorescent reporter may be fused to a first affinity ligand specific to a first synaptic protein and the other fragment may be fused to a second affinity ligand specific to the second synaptic protein, wherein the two synaptic proteins are thought to interact with each other in a protein complex. Therefore, each half of the fluorescent reporter protein acts as a proximity detector that, when sufficiently close to its complementary half, will produce a proximity signal indicating the interaction between the two synaptic proteins in a complex. As in FRET, standard fluorescence imaging methods may be used to detect the fluorescence signal generated by the BiFC substrate proteins.

iv. Biotin Ligase or Ascorbate Peroxidase

Additionally, the disclosed methods may employ biotin-based proximity detection methods, such as, e.g., methods employing biotinylating proteins such as ascorbate peroxidase (APX) or birA biotin-protein ligase (BirA). APX is a heme-containing peroxidase that catalyzes oxidation of various molecules. APX is capable of oxidizing biotin to produce a reactive biotin species that diffuses from the active site and promiscuously biotinylates nearby proteins at tyrosine, tryptophan, cysteine, and histidine residues. An established method for assessing protein-protein interactions using biotinylation with the APX enzyme is APEX (pea APX) and APEX2 (soybean APX) technology. APEX (and APEX2) features a fast rate of biotinylation that occurs over minutes timescale, thereby facilitating efficient detection of labeled molecules. Analogous proximity biotinylation methods to the APEX technology include BioID, TurboID, and MiniTurbo methods which employ the E. coli BirA enzyme, BioID2 which uses an A. aeolicus biotin ligase, and BASU, which uses B. subtilis biotin ligase.

In the context of the present disclosure, an APX enzyme or any one of the other aforementioned biotinylating enzymes may be fused or conjugated to an affinity ligand specific to a first synaptic protein or a second synaptic protein, or both. Given sufficient physical proximity between the two synaptic proteins, the APX enzyme will transfer a reactive biotin moiety onto the first and/or second synaptic protein, thereby producing a proximity signal that can be detected using routine methods (e.g., streptavidin-based detection methods, e.g., streptavidin affinity matrix). Alternatively, the APX enzyme or any one of the other aforementioned biotinylating enzymes may be separated into two complementary fragments, each of which can be fused or conjugated to a first affinity ligand specific to a first synaptic protein and second affinity ligand specific to a second synaptic protein, respectively. If the two synaptic proteins are sufficiently close for the two complementary halves of a biotinylating enzyme to join, the enzyme will be rendered functional, thereby allowing the production of a reactive biotin species that will biotinylate one or both of the synaptic proteins. Thus, the transferred biotin moiety acts as a proximity signal that may be detected using routine methods. The amount of biotinylation may be proportional (e.g., linearly, supra-linearly, multiplicatively, or exponentially) to the physical distance between the first and the second synaptic protein.

Samples

The disclosed methods can be performed using a sample from the subject (e.g., a human, such as a human at risk of developing a neurological disorder). In particular, the sample is a blood sample (e.g., blood, serum, or plasma) obtained from a subject (e.g., a human subject diagnosed as having or at risk of developing a neurological disorder). The volume of sample used in the assay will vary depending on the type of assay being performed and the support used (e.g., a solid support, e.g., a plate, a resin, a particle, a container, a membrane, or a bead). The volume of sample used can be from about 1 µL to about 500 µL (e.g., from about 50 µL to about 200 µL for an assay using multi-well plates). In some embodiments, the volume of the sample is 50 µL. The sample can be diluted before use in the assay with a buffer that will not interfere with binding to the binding or detection agent (e.g., water, PBS, or a buffer used in the methods of the assay), and may be diluted 1:2, 1:3, 1:4, 1:5, 1:10, 1:15, 1:20, 1:100 or more.

Quantification of Synaptic Proteins

The amount of a synaptic protein (e.g., NPTX2, NPTX1, NPTXR, or any one of the synaptic proteins listed in Table 1) in a blood sample obtained from a subject (e.g., a human, such as a human subject identified as having or at risk of developing a neurological disorder) may be quantified according to routine detection methods, such as, e.g., the detection methods disclosed herein. As is described herein, a quantity of a synaptic protein may be ascertained by determining the amount of a first synaptic protein (e.g., NPTX2, NPTX1, or NPTXR) in complex with a second synaptic protein (e.g., NPTX2, NPTX1, NPTXR, or any one of the synaptic proteins listed in Table 1, provided that the first and the second synaptic proteins are of different types) using the disclosed proximity-based assays. In the case of nucleic acid-based proximity detectors disclosed herein, quantification of one or more synaptic proteins can be performed using conventional nucleic acid amplification and detection methods (e.g., PCR, such as, qRT-PCR, microarray, and sequencing, among others).

In some embodiments, the amount of one or more synaptic proteins is quantified using qRT-PCR. qRT-PCR generally employs at least one primer, and, in many cases, two primers (e.g., forward and reverse primers). Primers useful for use in conjunction with the present disclosure include oligonucleotide primers capable of acting as a point of initiation of nucleic acid synthesis within or adjacent to oligonucleotide sequences. Primers may be produced using conventional methods (e.g., synthetically). Such primers are usually produced to be single-stranded in order to improve amplification efficiency. The primers may be DNA or RNA primers. Generally, results of a qRT-PCR run are represented in the form of a cycle threshold (C(T)) value, which is the point at which the fluorescent intensity of the sample crosses the intensity of the background. A lower C(T) value reflects a higher number of amplicons formed. qRT-PCR may be used to measure the quantity using relative quantification or absolute quantification. Absolute quantification allows for measurement of the exact amount of a target nucleic acid molecule by comparison to a calibration curve. Relative quantification relies on an internal reference gene to quantify fold-differences in expression of a target nucleic acid. In relative quantification, the measured quantity is relative to the internal reference gene. Measurement of the amount of a synaptic protein in a blood sample of a subject may also be performed by averaging across multiple qRT-PCR runs.

In cases requiring quantification of a synaptic protein in a blood sample of a subject by detection of a fluorescence or luminescence signal emitted by a protein (e.g., FRET, BRET, or BiFC protein), conventional fluorescence imaging techniques (e.g., total internal reflection fluorescence microscopy, light sheet fluorescence microscopy, fluorescence-lifetime imaging microscopy, or fluorescence confocal laser scanning microscopy) may be employed to quantify the amount of synaptic protein(s) in the sample. Various parameters of the fluorescence signal (e.g., amplitude, duration, decay time constant, or waveform) may be used to analyze the quantity of one or more of the synaptic proteins in the sample.

Quantification of one or more synaptic proteins in a blood sample of a subject may also be performed in cases where the proximity detector (e.g., proximity detector described herein) is an enzyme capable of producing a reactive biotin species. In such cases, a biotin moiety attached to a synaptic protein(s) is the substrate for detection. Conventional techniques may be employed to detect biotinylated synaptic proteins in the sample. For example, due to its strong association with streptavidin, the presence of a biotin moiety on a protein may be detected using streptavidin-based detection assays (e.g., streptavidin affinity matrix). If the identity of the biotinylated synaptic protein is known a priori, co-labeling with an antibody or antigen-binding fragment thereof specific to the synaptic protein may be used to confirm the identity of the biotinylated protein.

Neurological Disorders

The present disclosure contemplates methods for diagnosis and prognosis of various neurological disorders, including neurodegenerative disorders, neurodevelopmental disorders, or neuropsychiatric disorders in a subject.

Neurodegenerative Disorders

Neurodegeneration is a pathophysiological process that is observed in a number of diseases associated with progressive dementia, such as late onset (sporadic) or familial AD and Alzheimer's disease related dementias (ADRD; such as, e.g., frontotemporal degeneration (FTD), Lewy body dementia (LBD), vascular contributions to cognitive impairment and dementia (VCID) and mixed etiology dementias (MED)), Parkinson's disease (PD), Huntington's disease (HD), lysosomal storage disorders (e.g., neuronal ceroid lipofuscinosis), and prion disease. A key feature of this process is the neuronal degeneration and death that causes the wholesale destruction of brain tissue and the accompanying gamut of behavioral deficits including cognitive decline, language impairments, and motor impairment, among others. The present disclosure features diagnostic and prognostic methods for subjects afflicted with one or more of the neurodegenerative disorders described herein.

i. Alzheimer's Disease

AD is a neurodegenerative disorder characterized by progressive neuronal loss in the frontal, temporal, and parietal lobes of the cerebral cortex as well as subcortical structures like the basal forebrain cholinergic system and the locus coeruleus within the brainstem. The clinical presentation of AD is a progressive decline in a number of cognitive functions including short and long-term memory, spatial navigation, language fluency, impulse control, anhedonia, and social withdrawal. Neuronal atrophy in brains of AD patients is linked to accumulation of extracellular and intracellular protein inclusions. Aggregates of insoluble amyloid-β (Aβ) protein are often found in the extracellular space, while neurofibrillary tangles (NFTs) of hyperphosphorylated tau proteins are usually found in intracellular compartments of affected neurons. These neuropathologies are considered to be important in the etiology of AD.

Previous studies have implicated neuronal pentraxin proteins in the etiology of AD (Xiao et al., Elife 6:e23798, 2017). In particular, Xiao et al. found that NPTX2-null rats with amyloidosis exhibit a decrease in GluR4 AMPA receptor subunit expression specifically on parvalbumin-positive (PV+) interneurons in the CNS. This study also demonstrated decreased levels of NPTX2 in posthumous samples of AD patients and a significant correlation between NPTX2 levels in the cerebrospinal fluid (CSF) and cognitive performance and hippocampal volume of AD patients. PV+ interneurons have been demonstrated to be particularly sensitive to degeneration and are reduced by up to 60% in brains of AD patients (Chapman et al., Front Cell Neurosci 13:575, 2019).

Ii. Parkinson's Disease with or without Associated Dementia

PD is a progressive disorder that affects movement, and it is recognized as the second most common neurodegenerative disease after AD. Common symptoms of PD include resting tremor, rigidity, and bradykinesia, and non-motor symptoms, such as depression, constipation, pain, sleep disorders, genitourinary problems, cognitive decline, and olfactory dysfunction, are also increasingly being associated with this disorder. A key feature of PD is the death of dopaminergic neurons in the substantia nigra pars compacta, and, for that reason, most current treatments for PD focus on increasing dopamine. Another well-known neuropathological hallmark of PD is the presence of Lewy bodies containing α-synuclein in affected brain regions, which are thought to contribute to the disease.

PD thought to result from a combination of genetic and environmental risk factors. There is no single gene responsible for all PD cases, and the vast majority of cases seem to be sporadic and not directly inherited. Mutations in the genes encoding parkin, PTEN-induced putative kinase 1 (PINK1), leucine-rich repeat kinase 2 (LRRK2), and Parkinsonism-associated deglycase (DJ-1) have been found to be associated with PD, but they represent only a small subset of the total number of the cases. Occupational exposure to some pesticides and herbicides has also been proposed as a risk factor for PD.

Previous studies have demonstrated an upregulation of human NPTX2 mRNA in sporadic forms of PD, particularly in Lewy bodies of cortical neurons and glial cells in the substantia nigra, suggesting a potential involvement of NPTX2 in the neurodegeneration observed in PD (Chapman et al., Front Cell Neurosci 13:575, 2019). Additionally, NPTX2 levels are reduced in the cerebrospinal fluid (CSF) of patients with dementia and Lewy body disease (DLB) (van Steenovet et al., Mol. Neurodegen. 15:36, 2020)

iii. Frontotemporal Degeneration

FTD is a clinical syndrome characterized by progressive neurodegeneration in the frontal and temporal lobes of the cerebral cortex. The manifestation of FTD is complex and heterogeneous, and may present as one of three clinically distinct variants including: 1) behavioral-variant frontotemporal dementia (BVFTD), characterized by changes in behavior and personality, apathy, social withdrawal, perseverative behaviors, attentional deficits, disinhibition, and a pronounced degeneration of the frontal lobe; 2) semantic dementia (SD), characterized by fluent, anomic aphasia, progressive loss of semantic knowledge of words, objects, and concepts and a pronounced degeneration of the anterior temporal lobes. Furthermore, SD variant of FTD exhibit a flat affect, social deficits, perseverative behaviors, and disinhibition; or 3) progressive nonfluent aphasia characterized by motor deficits in speech production, reduced language expression, and pronounced degeneration of the perisylvian cortex. Neuronal loss in brains of FTD patients is associated with one of three distinct neuropathologies: 1) the presence of tau-positive neuronal and glial inclusions; 2) ubiquitin (ub)-positive and TAR DNA-binding protein 43 (TDP43)-positive, but tau-negative inclusions; or 3) ub and fused in sarcoma (FUS)-positive, but tau and TDP-43-negative inclusions. These neuropathologies are considered to be important in the etiology of FTD.

Nearly half of FTD patients have a first-degree family member with dementia, ALS, or PD, suggesting a strong genetic link to the cause of the disease. A number of mutations in chromosome 17q21 have been linked to FTD presentation.

Previous studies have demonstrated lower levels of CSF NPTX1, NPTX2, and NPTXR in symptomatic HD mutation carriers (van der Ende et al., *J Neurol Neurosurg Psychiatry* 91:612-21, 2020). Notably, NPTX2 levels in the CSF correlated with clinical measures of disease severity, and grey matter volume of multiple brain regions and predicted decline in phonemic verbal fluency and clinical measures of dementia.

iv. Huntington's Disease

HD is an autosomal dominant neurological amyloidogenic disease. Five to ten individuals per 100,000 individuals are affected with this autosomal disease. However, the prevalence in the US is much higher, studies have shown that under 200,000 US individuals 50% have the risk of developing HD, in particular 30,000 patients are registered in the US while only 100,000 patients are registered worldwide.

HD results from a trinucleotide CAG repeat expansion in the Huntingtin (HTT) gene, in particular in exon 1 of the HTT gene located on chromosome 4 (MacDonald et al., Cell 72, (1993), 971-983), which is translated into a polyglutamine (polyQ) stretch in the HTT protein. HD occurs when the polyQ tract exceeds a 35-40 glutamine residues in length with a strong inverse correlation between repeat length and age-of-onset of disease. This polyQ stretch leads to a misfolding and aggregation of HTT in neuronal and glial cells of the CNS. With advancing age, accumulation of HTT aggregates leads to degeneration of striatal GABA-ergic neurons and cortical pyramidal neurons. Symptoms of HD include involuntary movements, lack of motor coordination, depression, and cognitive decline, such as, e.g., memory loss and/or dementia.

Neurodevelopmental Disorders

Neurodevelopmental disorders are a set of conditions characterized by a disturbance in the typical development of the nervous system, leading to neurodivergence and disruptions in brain function, including but not limited to learning, memory, emotional regulation, impulse control, communication deficits, and motoric deficits. Neurodevelopmental disorders may result from abnormal development of the nervous system that are caused by genetic disorders, social deprivation, metabolic diseases, immune disorders, infectious diseases, nutritional factors, physical trauma, or toxic or environmental factors. Non-limiting examples of neurodevelopmental disorders that may be suitable for screening using the disclosed methods include intellectual disability, learning disorders (e.g., dyslexia or dyscalculia), autism spectrum disorders (e.g., autism or Asperger syndrome), motor disorders (e.g., developmental coordination disorder or stereotypic movement disorder), tic disorders (e.g., Tourette's syndrome), traumatic brain injury (e.g., congenital injuries), communication, speech, and language disorders, genetic disorders (e.g., Fragile-X syndrome, Down syndrome, attention deficit hyperactivity disorder (ADHD), hypogonadotropic hypogonadal syndromes, and disorders due to neurotoxic agents (e.g., fetal alcohol spectrum disorder, Minimata disease caused by mercury, behavioral disorders caused by heavy metals such as lead, chromium, and platinum, hydrocarbons, PBDE, PCB, medications, or illicit drugs). Accordingly, the present disclosure features diagnostic and prognostic methods for subjects afflicted with one or more of the aforementioned neurodevelopmental disorders, among others.

Neuropsychiatric Disorders

Neuropsychiatric disorders are a heterogenous group of conditions featuring abnormal affect, cognition, and/or behavior. Often these disorders arise as a result of organic damage to the cerebral cortex, although extra-cerebral areas of the CNS may also be affected. Neuropsychiatric disorders typically present with various psychiatric symptoms, including but not limited to anxiety, neuroticism, apathy, mood disorder, hallucinations, delusions, behavioral and personality changes, delirium, and dementia. Non-limiting examples of neuropsychiatric disorders suitable for screening using the disclosed methods include major depression, bipolar disorder, obsessive compulsive disorder, eating disorder, and schizophrenia.

Diagnostic and Prognostic Methods

Diagnosis and Prognosis

The proximity-based detection assays described herein can be used to provide a subject (e.g., a human) with a diagnosis or a prognosis indicating the presence of a neurological disorder (e.g., neurodegenerative, neurodevelopmental, or neuropsychiatric disorder), clinical outcome with or without medical treatment, responsiveness to therapeutic agents, resilience of a patient to the neurological disorder, or severity of symptoms within a particular cognitive domain (e.g., learning and memory) in the subject. In particular, the disclosed methods may be used to provide a diagnosis or prognosis to a subject having or suspected of having a neurological disorder based on the detection of one or more synaptic proteins (e.g., NPTX2, NPTX1, NPTXR, or any one of the synaptic proteins listed in Table 1) in a blood sample (e.g., blood, serum, or plasma) from the subject. The diagnostic or prognostic methods may be performed in a prodromal subject or in a symptomatic subject having or at risk of developing a neurological disorder. Risk factors may include genetic mutations, environmental factors (e.g., exposure to neurotoxins), infections, trauma, age, sex, ethnicity, weight, socioeconomic status, diet, personal lifestyle, or pre-existing conditions, among others.

The assays described herein can be used to measure the level of one or more synaptic proteins in a blood sample of a subject having or at risk of developing a neurological disorder. A level of complexed synaptic protein(s) measured from the blood sample can be used to determine whether the subject has or is at risk of developing a neurological disorder by comparing said level in the blood sample from the subject to a reference blood sample. The reference blood sample may be from one or more healthy subject of similar age, sex, geographical location, lifestyle, et cetera. For example, the level of a neuronal pentraxin (e.g., NPTX2, NPTX1, or NPTXR) in complex with another synaptic protein (e.g., NPTX2, NPTX1, NPTXR, or any one of the synaptic proteins listed in Table 1, provided that the two synaptic proteins are of different types) in the blood sample of may be indicative of disease status in the subject from which the blood sample is obtained. In particular, increased levels of protein complexes containing both NPTX2 and NPTXR in a blood sample of subject having or suspected of having a neurological disorder as compared to a reference blood sample may be indicative of a positive diagnosis of the subject as having or at risk of developing the neurological disorder. In another example, increased levels of protein complexes containing both NPTX1 and NPTXR in a blood sample of subject having or suspected of having a neurological disorder as compared to a reference blood sample may be indicative of a positive diagnosis of the subject as having or at risk of developing the neurological disorder. In another example, decreased levels of protein complexes containing both NPTX2 and GluA4 in a blood sample of subject having or suspected of having a neurological disorder as compared to a reference blood sample may be indicative of a positive diagnosis of the subject as having or at risk of developing the neurological disorder. Additionally, ratios of synaptic protein levels measured in a blood sample of a subject may be indicative of disease status. For example, a decrease in the ratio of NPTX2-GluA4 synaptic protein complexes to NPTX2-NPTXR synaptic protein complexes in a blood sample of a subject may indicate that the subject has or is at risk of developing a neurological disorder. Similarly, a decrease in the ratio of NPTX2-GluA4 synaptic protein complexes to NPTX1-NPTXR synaptic protein complexes in a blood sample of a subject may indicate that the subject has or is at risk of developing a neurological disorder. A decrease in the level of a synaptic protein (or synaptic protein complex) or a ratio of synaptic protein complexes may be a decrease by 5%, 10%, 15%, 20%, 25%, 30%, 35%, 40%, 45%, 50%, 55%, 60%, 65%, 70%, 75%, 80%, 85%, 90%, 95%, or more relative to a level of the synaptic protein or ratio of synaptic protein complexes in a reference blood sample. An increase in the level of a synaptic protein (or synaptic protein complex) or a ratio of synaptic protein complexes may be a decrease by 5%, 10%, 15%, 20%, 25%, 30%, 35%, 40%, 45%, 50%, 55%, 60%, 65%, 70%, 75%, 80%, 85%, 90%, 95%, 100%, 150%, 200%, 250%, 300%, 350%, 400%, 450%, 500%, 600%, 700%, 800%, 900%, 1000%, or more relative to a level of the synaptic protein or ratio of synaptic protein complexes in a reference blood sample.

The assays disclosed herein may be used as diagnostic methods in conjunction with other conventional methods of diagnosing neurological disorders, such as, e.g., the methods described in the Diagnostic and Statistical Manual of Mental Disorders, Fifth Edition and the International Classification of Diseases, 11th Revision.

For example, diagnosis of neurological disorders in a subject may be guided by neuropsychological testing to assess the degree of cognitive impairment in a subject. The subject's cognitive function may be assessed by performing cognitive tests that evaluate performance across one or more cognitive domains including but not limited to complex attention, executive function, learning and memory, language, perceptual-motor function, and social cognition. Comparison of cognitive function in the subject relative to a norm appropriate for the subjects age, medical history, education, socioeconomic status, and lifestyle (e.g., a reference population, such as, e.g., a general population) may be done to determine the diagnosis with respect to a neurological disorder in the subject. Non-limiting examples of cognitive tests include Eight-item Informant Interview to Differentiate Aging and Dementia (AD8), Annual Wellness Visit (AWV), General Practitioner Assessment of Cognition (GPCOG), Health Risk Assessment (HRA), Memory Impairment Screen (MIS), Mini Mental Status Exam (MMSE), Montreal Cognitive Assessment (MoCA), St. Louis University Mental Status Exam (SLUMS), and Short Informant Questionnaire on Cognitive Decline in the Elderly (Short IQCODE). Additionally or alternatively, the use of F18-fluorodeoxyglucose PET scans or MRI scans may be used to determine the presence of neurodegeneration in a subject with a neurological disorder (e.g., a neurodegenerative disorder).

Furthermore, the subject may be tested for the presence of biomarkers specific to the particular neurological disorder of interest. For example, a subject may be tested for the presence of biomarkers that indicate that the subject has AD, such as the presence of Aβ plaques or NFTs of hyperphosphorylated tau proteins in the forebrain of the subject, presence of mutations in the APP, PSEN1, PSEN2, and/or TREM2 genes in the subject, as well as variations in the ε4 allele of APOE.

The subject's cognitive function may be assessed by performing cognitive tests that evaluate performance across one or more cognitive domains including but not limited to learning and memory, complex attention, executive function, language, perceptual-motor function, and social cognition. Comparison of cognitive function in the subject relative to a norm appropriate for the subjects age, medical history, education, socioeconomic status, and lifestyle (e.g., a reference population, such as, e.g., a general population) may be done to determine or confirm the diagnosis with respect to a neurological disorder in the subject.

Disease Severity

The methods described herein may also be used to evaluate disease severity in a subject identified as having or at risk of developing a neurological disorder. For example, subjects having increased levels of protein complexes containing both NPTX2 and NPTXR, or NPTX1 and NPTXR in a blood sample of subject having or suspected of having a neurological disorder as compared to a reference blood sample may be indicative of a higher than normal (e.g., with respect to a reference patient or patient population) disease severity in the subject. In another example, decreased levels of protein complexes containing both NPTX2 and GluA4 or decreased ratios NPTX2-GluA4 synaptic protein complexes to NPTX2-NPTXR complexes in a blood sample of a subject may be indicative of a higher than normal disease severity in the subject. A decrease in the level of a synaptic protein (or synaptic protein complex) or a ratio of synaptic protein complexes may be a decrease by 5%, 10%, 15%, 20%, 25%, 30%, 35%, 40%, 45%, 50%, 55%, 60%, 65%, 70%, 75%, 80%, 85%, 90%, 95%, or more relative to a level of the synaptic protein or ratio of synaptic protein complexes in a reference blood sample. An increase in the level of a synaptic protein (or synaptic protein complex) or a ratio of synaptic protein complexes may be a decrease by 5%, 10%, 15%, 20%, 25%, 30%, 35%, 40%, 45%, 50%, 55%, 60%, 65%, 70%, 75%, 80%, 85%, 90%, 95%, 100%, 150%, 200%, 250%, 300%, 350%, 400%, 450%, 500%, 600%, 700%, 800%, 900%, 1000%, or more relative to a level of the synaptic protein or ratio of synaptic protein complexes in a reference blood sample. Once severity of the neurological disorder is assessed, a corresponding course of treatment can be recommended. For example, subjects identified as having high disease severity may be administered more frequent and/or more aggressive treatment regimens that subjects identified as having normal or low disease severity. Therefore, the presently disclosed assays can be used to detect potentially debilitating or life-threatening conditions and assess the need for an appropriate therapeutic response.

Monitoring

A subject who has or is at risk of developing a neurological disorder described herein can be monitored using the methods disclosed herein. Monitoring may be a suitable approach for subjects whose present disease state, whether determined using the disclosed methods or well-known methods in the art, indicates a potential for exacerbation of disease symptoms. Alternatively, monitoring may be performed in subjects who were diagnosed using the disclosed methods or methods well-known in the art as having a neurological disorder, but who are asymptomatic at the time of evaluation. Monitoring may be performed using the disclosed methods at regular intervals (e.g., once a year, twice a year, once every three months, once monthly, bi-monthly, or once weekly) to determine whether the levels of the synaptic proteins or their ratios are stable or fluctuating. A decrease in the level of NPTX2-NPTXR and/or NPTX1-NPTXR complexes in a blood sample of the subject may indicate an improvement of disease status. Additionally, an increase in the level of NPTX2-GluA4 or the ratio of NPTX2-GluA4 to NPTX2-NPTXR or the ratio of NPTX2-GluA4 to NPTX1-NPTXR in a blood sample of the subject may indicate an improvement of disease status. Conversely, an increase in the level of NPTX2-NPTXR and/or NPTX1-NPTXR complexes in a blood sample of the subject may indicate an exacerbation of disease status. Similarly, a decrease in the level of NPTX2-GluA4 or the ratio of NPTX2-GluA4 to NPTX2-NPTXR or the ratio of NPTX2-GluA4 to NPTX1-NPTXR in a blood sample of the subject may indicate an exacerbation of disease status. A decrease in the level of a synaptic protein (or synaptic protein complex) or a ratio of synaptic protein complexes may be a decrease by 5%, 10%, 15%, 20%, 25%, 30%, 35%, 40%, 45%, 50%, 55%, 60%, 65%, 70%, 75%, 80%, 85%, 90%, 95%, or more relative to a level of the synaptic protein or ratio of synaptic protein complexes in a reference blood sample. An increase in the level of a synaptic protein (or synaptic protein complex) or a ratio of synaptic protein complexes may be a decrease by 5%, 10%, 15%, 20%, 25%, 30%, 35%, 40%, 45%, 50%, 55%, 60%, 65%, 70%, 75%, 80%, 85%, 90%, 95%, 100%, 150%, 200%, 250%, 300%, 350%, 400%, 450%, 500%, 600%, 700%, 800%, 900%, 1000%, or more relative to a level of the synaptic protein or ratio of synaptic protein complexes in a reference blood sample.

Treatment Efficacy

The disclosed methods can also be used to evaluate or predict treatment efficacy of a therapeutic agent in a subject identified as having or at risk of developing a neurological disorder. For example, the levels of synaptic proteins disclosed herein in a blood sample of a subject can be measured prior to or after the onset of treatment and then measured on an ongoing basis during treatment (e.g., once a day, once a week, bi-weekly, once a month, bi-monthly, once every three months, or twice a year). A decrease in the level of NPTX2-NPTXR and/or NPTX1-NPTXR complexes in a blood sample of the subject during the course of treatment may indicate improvement and demonstrate the effectiveness of the treatment. Additionally, an increase in the level of NPTX2-GluA4 or the ratio of NPTX2-GluA4 to NPTX2-NPTXR or the ratio of NPTX2-GluA4 to NPTX1-NPTXR in a blood sample of the subject may also indicate a therapeutic efficacy. Conversely, an increase in the level of NPTX2-NPTXR and/or NPTX1-NPTXR complexes in a blood sample of the subject may indicate a lack of therapeutic efficacy. Similarly, a decrease in the level of NPTX2-GluA4 or the ratio of NPTX2-GluA4 to NPTX2-NPTXR or the ratio of NPTX2-GluA4 to NPTX1-NPTXR in a blood sample of the subject may indicate a lack of therapeutic efficacy. A decrease in the level of a synaptic protein (or synaptic protein complex) or a ratio of synaptic protein complexes may be a decrease by 5%, 10%, 15%, 20%, 25%, 30%, 35%, 40%, 45%, 50%, 55%, 60%, 65%, 70%, 75%, 80%, 85%, 90%, 95%, or more relative to a level of the synaptic protein or ratio of synaptic protein complexes in a reference blood sample. An increase in the level of a synaptic protein (or synaptic protein complex) or a ratio of synaptic protein complexes may be a decrease by 5%, 10%, 15%, 20%, 25%, 30%, 35%, 40%, 45%, 50%, 55%, 60%, 65%, 70%, 75%, 80%, 85%, 90%, 95%, 100%, 150%, 200%, 250%, 300%, 350%, 400%, 450%, 500%, 600%, 700%, 800%, 900%, 1000%, or more relative to a level of the synaptic protein or ratio of synaptic protein complexes in a reference blood sample.

Resilience

In the context of a neurodegenerative disease, resilience refers to the phenomenon in which some subjects who are asymptomatic during the course of their lifetime may be posthumously found to exhibit neuropathological features indicative of a neurodegenerative disease burden. For example, patients who are resilient to AD fail to show any symptoms of cognitive decline during their lifetime but are discovered to have a high burden of amyloid beta plaques and/or hyperphosphorylated tau protein tangles after death. In such cases, it may be advantageous to perform the disclosed assay on a blood sample from a subject, such as, e.g., subjects having a history of familial neurodegenerative disease or subjects who are exposed to environmental toxins that may precipitate a neurodegenerative disease, in order to determine whether the subject will develop symptoms of a neurodegenerative disease (i.e., subject is not resilient) or not (e.g., subject is resilient). Accordingly, the assays described herein can be used to assess resilience in a subject with a neurological disorder (e.g., a neurodegenerative disorder) by measuring the levels of one or more synaptic proteins (e.g., NPTX2, NPTX1, NPTXR, or any one of the synaptic proteins listed in Table 1) in a blood sample (e.g., blood, serum, or plasma) obtained from the subject.

For example, a decrease in the level of NPTX2-NPTXR and/or NPTX1-NPTXR complexes in a blood sample of the subject during the course of treatment may indicate that the subject is resilient to the neurological disorder. Additionally, an increase in the level of NPTX2-GluA4 or the ratio of NPTX2-GluA4 to NPTX2-NPTXR or the ratio of NPTX2-GluA4 to NPTX1-NPTXR in a blood sample of the subject may also indicate resilience. Conversely, an increase in the level of NPTX2-NPTXR and/or NPTX1-NPTXR complexes in a blood sample of the subject may indicate that the subject is not resilient to the neurological disorder. Similarly, a decrease in the level of NPTX2-GluA4 or the ratio of NPTX2-GluA4 to NPTX2-NPTXR or the ratio of NPTX2-GluA4 to NPTX1-NPTXR in a blood sample of the subject may also indicate a lack of resilience to the neurological disorder. A decrease in the level of a synaptic protein (or synaptic protein complex) or a ratio of synaptic protein complexes may be a decrease by 5%, 10%, 15%, 20%, 25%, 30%, 35%, 40%, 45%, 50%, 55%, 60%, 65%, 70%, 75%, 80%, 85%, 90%, 95%, or more relative to a level of the synaptic protein or ratio of synaptic protein complexes in a reference blood sample. An increase in the level of a synaptic protein (or synaptic protein complex) or a ratio of synaptic protein complexes may be a decrease by 5%, 10%, 15%, 20%, 25%, 30%, 35%, 40%, 45%, 50%, 55%, 60%, 65%, 70%, 75%, 80%, 85%, 90%, 95%, 100%, 150%, 200%, 250%, 300%, 350%, 400%, 450%, 500%, 600%, 700%, 800%, 900%, 1000%, or more relative to a level of the synaptic protein or ratio of synaptic protein complexes in a reference blood sample.

Kits

The disclosure also features kits for use in measuring levels of synaptic proteins in a blood sample from a subject (e.g., a human subject, such as a human subject diagnosed as having or at risk of developing a neurological disorder). The kit may include one or more of the following: a support (e.g., a plate (e.g., a multi-well plate)), a ligand immobilized to the support (e.g., an antibody specific to a synaptic protein disclosed herein), two or more non-immobilized ligands (e.g., antibodies specific to two or more synaptic protein disclosed herein) each having a proximity detector conjugated thereto (e.g., an oligonucleotide plus strand (e.g., SEQ ID NO: 1) and oligonucleotide minus strand (e.g., SEQ ID NO: 2), a connector oligonucleotide (e.g., SEQ ID NO: 3), and a DNA ligase enzyme (e.g., T4 DNA ligase), reagents (e.g., primers and buffers) for a quantitative real-time polymerase chain reaction assay, and instructions for performing the detection assay.

EXAMPLES

The following examples are put forth so as to provide those of ordinary skill in the art with a description of how the compositions and methods described herein may be used, made, and evaluated, and are intended to be purely exemplary of the disclosure and are not intended to limit the scope of what the inventors regard as their disclosure.

Example 1: Use of a Proximity Ligation Assay to Detect Synaptic Protein Complexes Containing Neuronal Pentraxin 2 and Neuronal Pentraxin Receptor in Human Cerebrospinal Fluid A proximity ligation assay (PLA) was performed on human cerebrospinal fluid (CSF) samples to determine if synaptic protein complexes can be detected in the CSF using this assay. FIG. 1 shows a schematic diagram summarizing the PLA assay of the disclosure. As a first step, an ELISA plate was coated with rabbit anti-NPTX2 antibodies (5 pg/mL). The reaction mixture was subsequently blocked with 0.1 mg/mL of salmon sperm DNA and incubated at room temperature for one hour. 50 μL of the CSF sample was added to the plate and incubated at 4° C. overnight. The reaction mixture was washed with Tris-buffered saline containing 0.1% Tween detergent (TBST), and 50 μL of PLA probes (1 μg/mL of oligonucleotide plus strand (SEQ ID NO: 1) conjugated to a rabbit anti-NPTX2 antibody and 1 μg/mL of oligonucleotide minus strand (SEQ ID NO: 2) conjugated to sheep anti-NPTXR antibody in TBS with 0.1 mg/mL salmon sperm DNA and 1% bovine serum albumin (BSA)) was added to the reaction mixture and incubated for one hour. After washing with TBST, 50 μL of ligation reaction mixture containing 1 μL of T4 DNA ligase, 0.5 μL of a connector (splint) oligonucleotide (SEQ ID NO: 3) at a concentration of 20 μM, 5 μL of 10×T4 ligase buffer, and 43.5 μL of water was added to the reaction plate and allowed to incubate for one hour. After washing with phosphate buffered saline (PBS), 50 μL of dithiothreitol (DTT; 20 mM) was added to the reaction mixture and allowed to incubate for one hour. The released ligation products were subsequently collected into Eppendorf tubes and quantitative real-time polymerase chain reaction (PCR) was performed on the ligated products in a 384-well plate using forward (SEQ ID NO: 4) and reverse primers (SEQ ID NO: 5).

Figure 2:
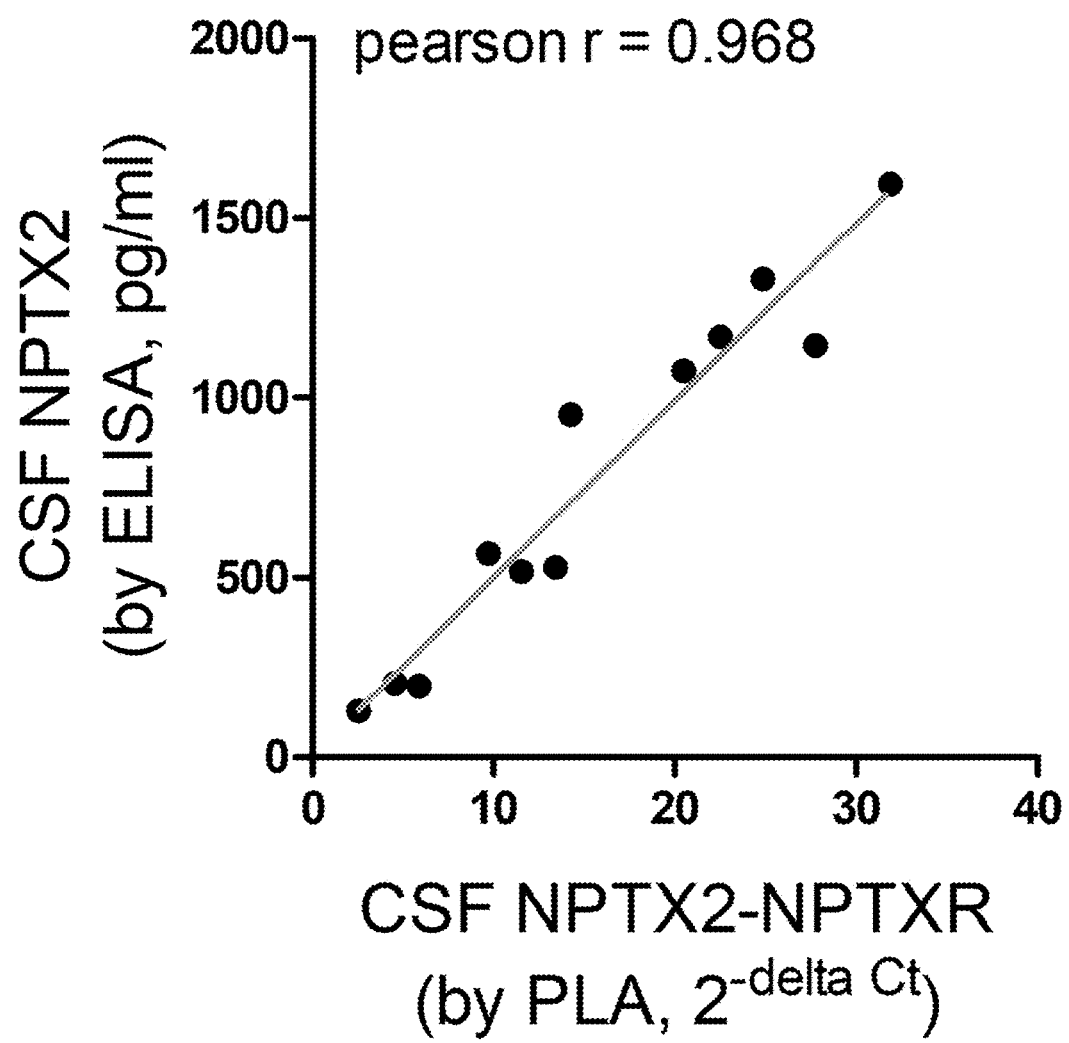
FIG. 2 shows a scatter plot of cerebrospinal fluid (CSF)-derived NPTX2 levels as measured by ELISA versus the level of NPTX2-NPTXR complex as independently measured by the PLA method of the disclosure. Pearson correlation analysis shows that PLA measurements strongly correlate with ELISA measurements (n=12).

NPTX2 levels in human CSF were determined using the NPTX2-NPTXR PLA procedure described above and compared to quantification of NPTX2 performed on human CSF samples using ELISA. Pearson correlation analysis demonstrated a strong correlation between PLA measurements of NPTX2-NPTXR and ELISA measurements of NPTX2 (FIG. 2; n=12; Pearson correlation coefficient r=0.968).

Figure 3A:
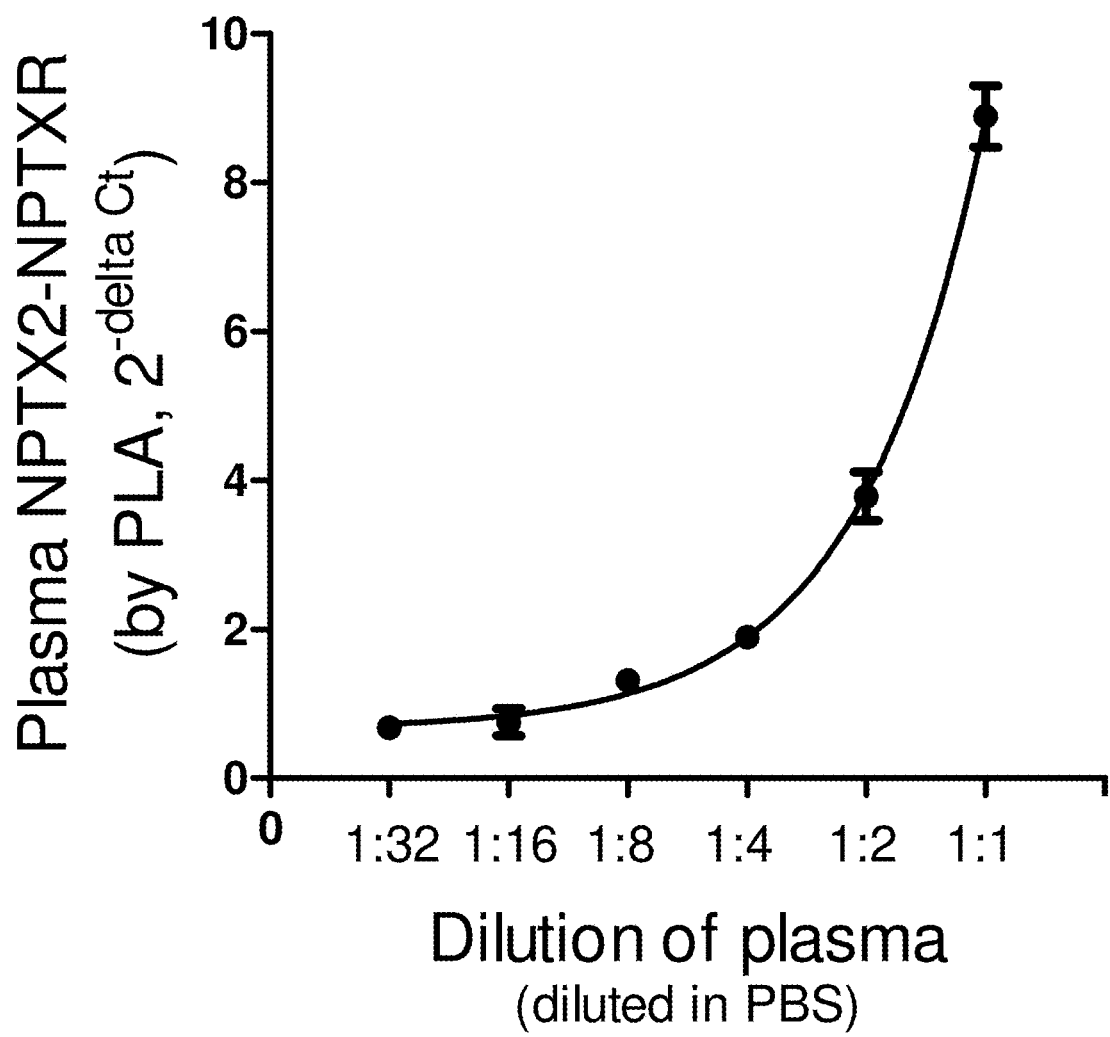
FIGS. 3A and 3B show scatter plots of quantified NPTX2-NPTXR protein complexes measured by PLA in plasma serially diluted with phosphate buffered saline (PBS)+1% bovine serum albumin (BSA)(FIG. 3A) or NPTX2-depleted plasma (FIG. 3B). Solid lines represent four-parameter logistic regression performed on the dilution curve.
Figure 3B:
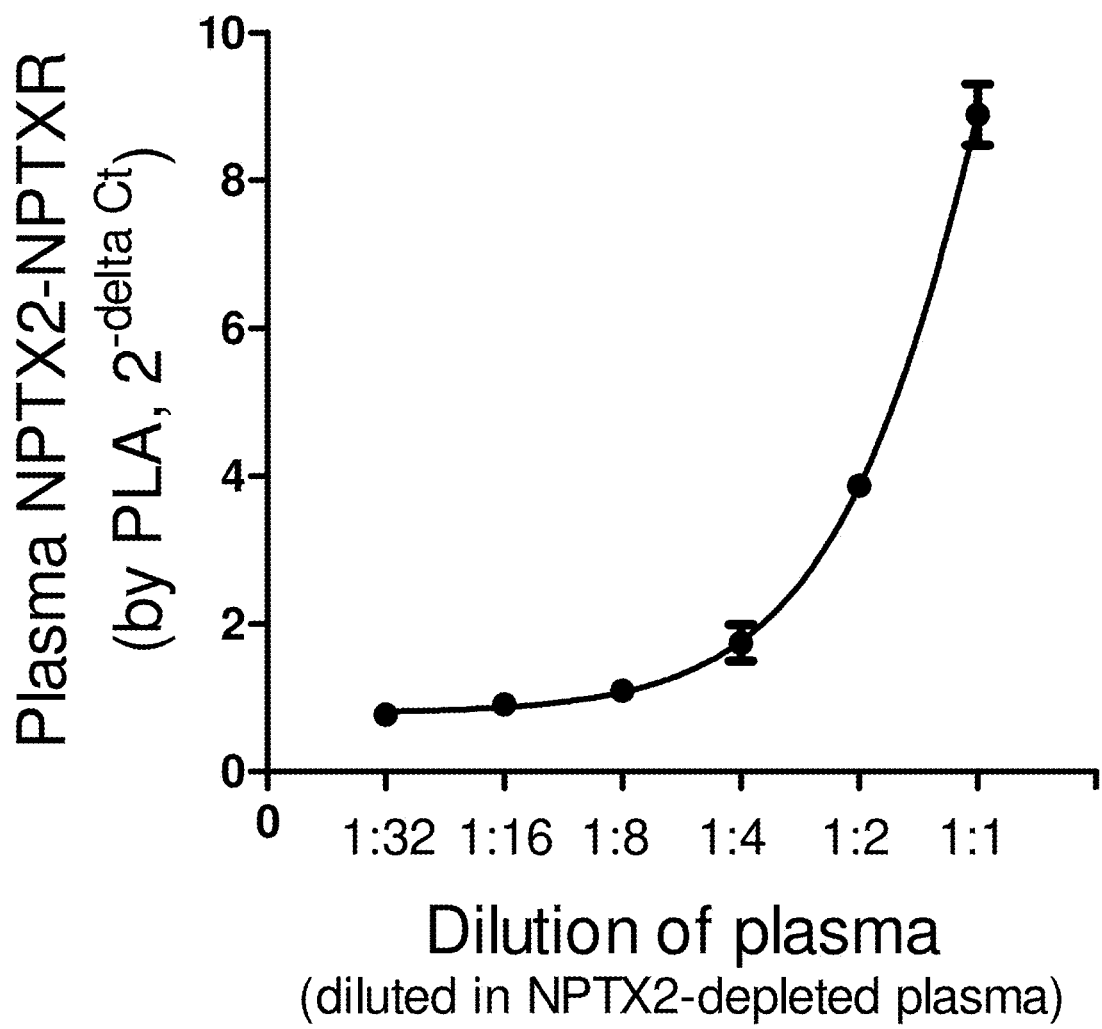

Example 2: Use of a Proximity Ligation Assay to Detect Synaptic Protein Complexes Containing Neuronal Pentraxin 2 and Neuronal Pentraxin Receptor in Human Blood A PLA was performed on human blood samples to determine if synaptic protein complexes can be detected in the blood using this assay. An NPTX2-NPTXR PLA assay described in Example 1, above, was performed on a 50 μL sample of human plasma. Plasma samples were two-fold-serially diluted with PBS and 1% BSA or NPTX2-depleted plasma. Dilution curves were subsequently produced for PBS-diluted plasma samples (FIG. 3A) and plasma samples diluted in NPTX2-depleted plasma (FIG. 3B).

Figure 4:
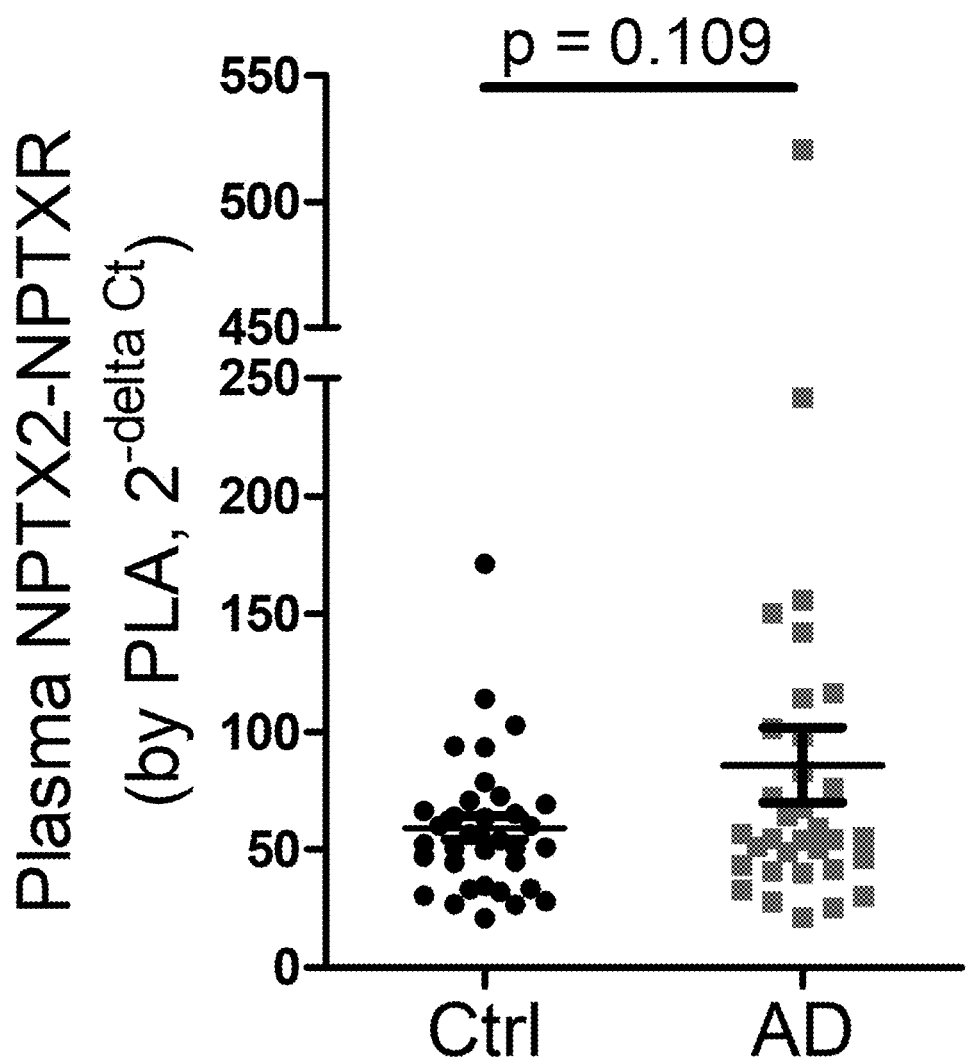
FIG. 4 shows a scatter plot of quantified NPTX2-NPTXR protein complexes measured by PLA in plasma samples from clinically-diagnosed Alzheimer's disease (AD) patients and matched healthy controls (Ctrl). NPTX2-NPTXR tended to elevate in the AD group (Ctrl: n=34; AD: n=33; p=0.109, two-tailed t-test). Mean±standard error of the mean (SEM) are superimposed as solid lines over the data points.

The NPTX2-NPTX4 PLA assay described above was subsequently performed on 50 μL samples of plasma obtained from clinically-diagnosed Alzheimer's disease (AD) patients (n=33) and matched healthy controls (Ctrl; n=34). NPTX2-NPTXR tended to elevate in AD group (FIG. 4), although statistical significance was not attained (p=0.109, two-tailed t-test).

Figure 5A:
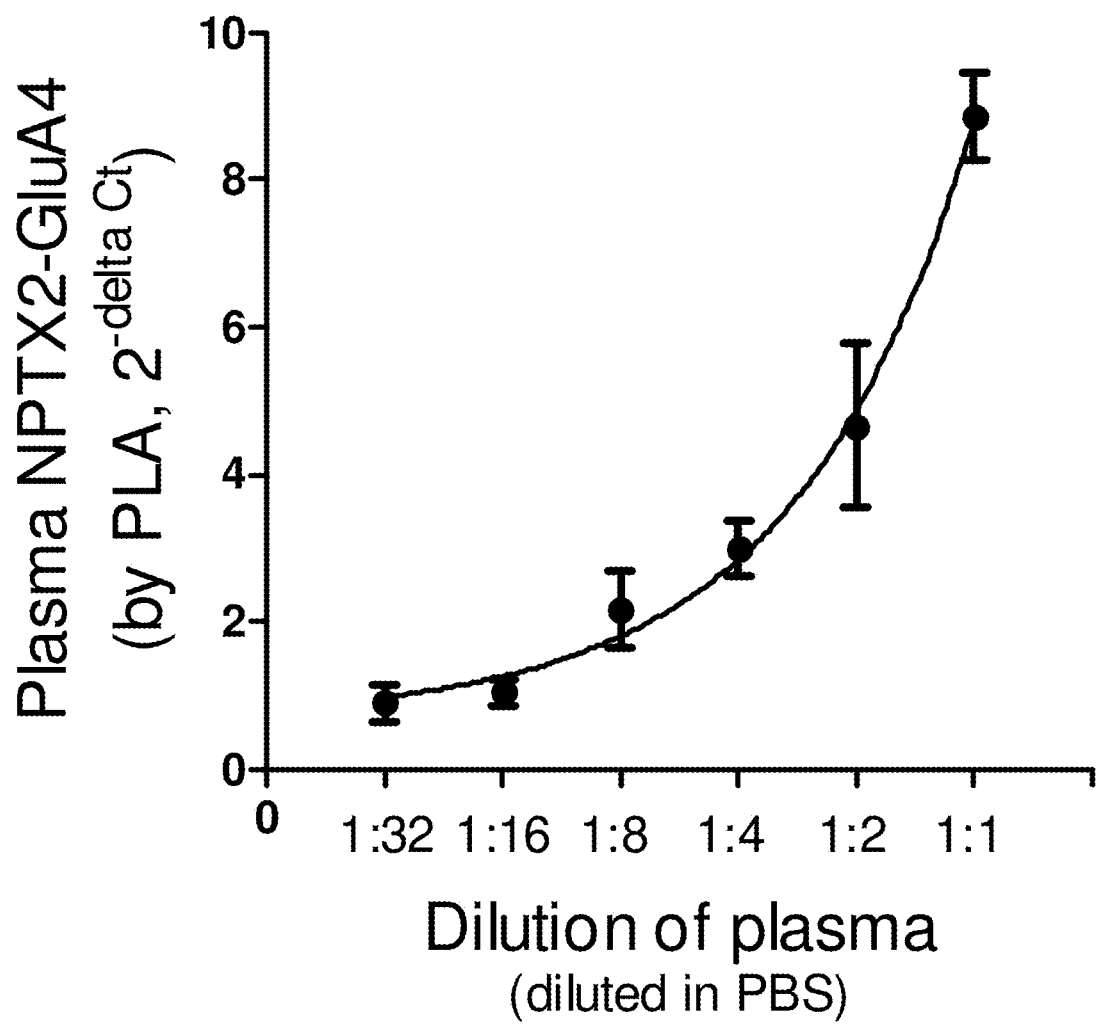
FIGS. 5A and 5B show dilution plots obtained from PLA experiments assaying the presence of complexes of NPTX2 and glutamate ionotropic receptor AMPA type subunit 4 (GluA4) proteins in human plasma samples. In this case, an anti-NPTX2 antibody was immobilized on a solid support and oligonucleotide-conjugated anti-NPTX2 and GluA4 antibodies were employed. Plasma samples were two-fold serially diluted in PBS or NPTX2-depleted plasma. Solid lines represent four-parameter logistic regression applied to the dilution curve.
Figure 5B:
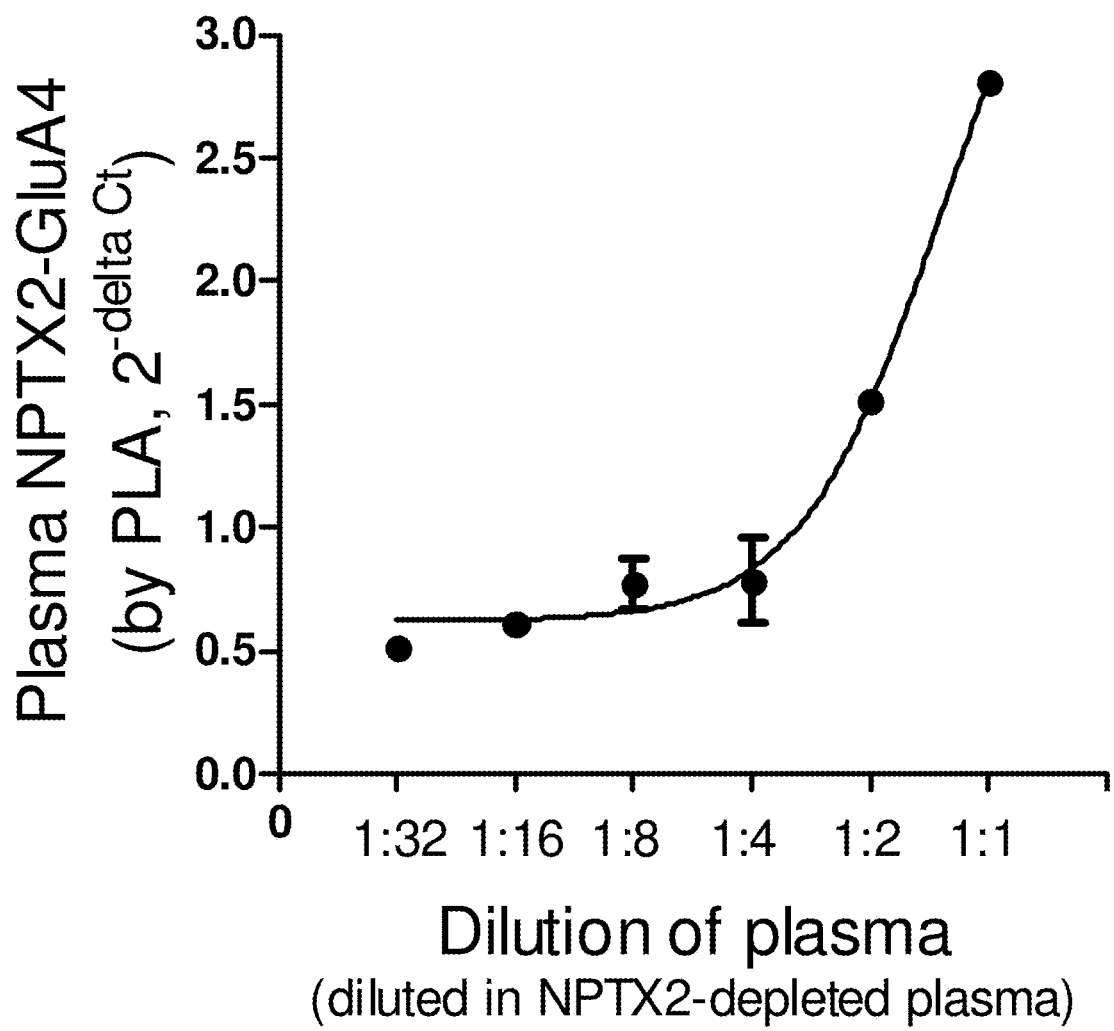

Example 3: Use of a Proximity Ligation Assay to Detect Synaptic Protein Complexes Containing Neuronal Pentraxin 2 and Glutamate Ionotropic Receptor AMPA Subunit 4 in Human Blood The PLA assay described above was performed on human plasma samples to determine the presence of synaptic protein complexes containing NPTX2 and the glutamate ionotropic receptor AMPA subunit 4 (GluA4) in the blood (NPTX2-GluA4). The PLA assay was described as performed above, except that instead of using 1 μg/mL of oligonucleotide minus strand (SEQ ID NO: 2) conjugated to sheep anti-NPTXR antibody, 1 μg/mL of oligonucleotide minus strand conjugated to rabbit anti-GluA4 antibody was employed. Dilution curves were generated for human plasma samples serially diluted in PBS (FIG. 5A) or NPTX2-depleted plasma (FIG. 5B).

Figure 6A:
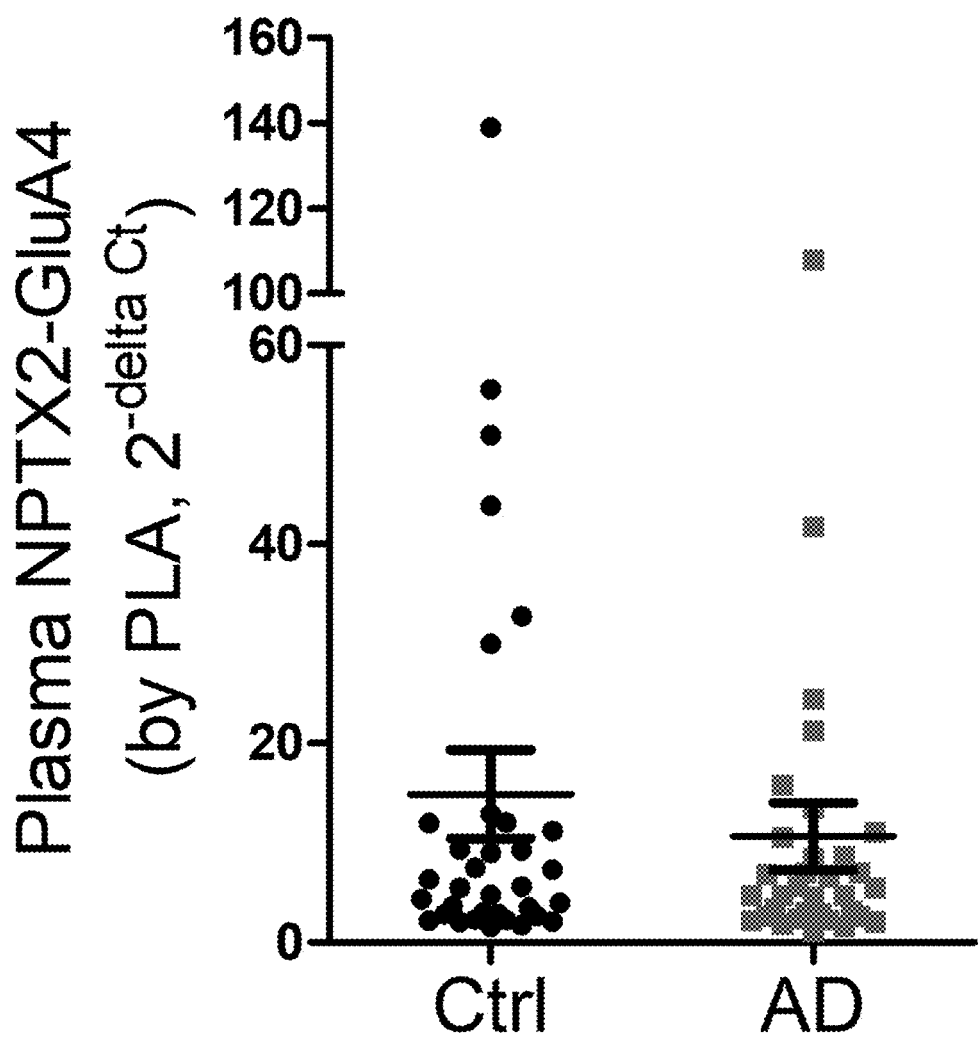
FIGS. 6A and 6B show scatter plots of synaptic protein complexes measured by PLA in plasma samples from clinically diagnosed AD patients and healthy controls (Ctrl). PLA assay was performed to detect the level of NPTX2-GLuA4 complexes (FIG. 6A), which showed no significant differences between Ctrl and AD patients. When normalized by the level of NPTX2-NPTXR complex in the sample, NPTX2-GluA4 levels are significantly reduced in AD patients as compared to Ctrl patients (FIG. 6B; Ctrl: n=34; AD: n=33; p=0.039, two-tailed t-test). Mean±SEM are superimposed as solid lines over the data points.
Figure 6B:
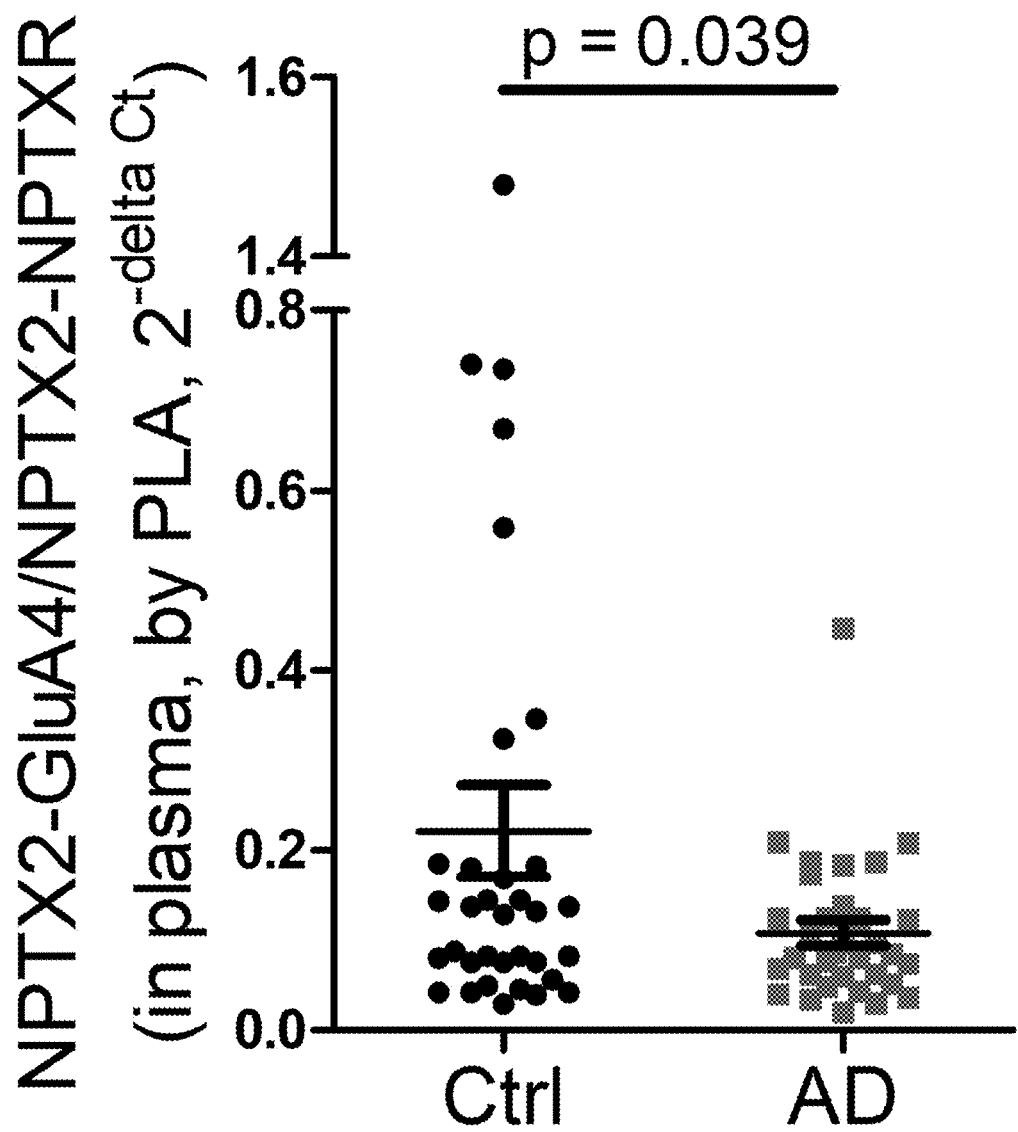

The NPTX2-GluA4 PLA assay described above was subsequently performed on 50 μL samples of plasma obtained from clinically-diagnosed AD patients (n=33) and matched healthy controls (Ctrl; n=34). Plasma levels of NPTX2-GluA4 did not show significant differences between Ctrl and AD patients (FIG. 6A). However, a ratio of plasma NPTX2-GluA4 levels to NPTX2-NPTXR levels showed a significant decrease in AD patients as compared to Ctrl patients (FIG. 6B; p=0.039, two-tailed t-test). These findings indicate that the ratio of NPTX2-GluA4 to NPTX2-NPTXR levels in human blood samples can be used to stratify AD patients from healthy control patients.

Figure 7A:
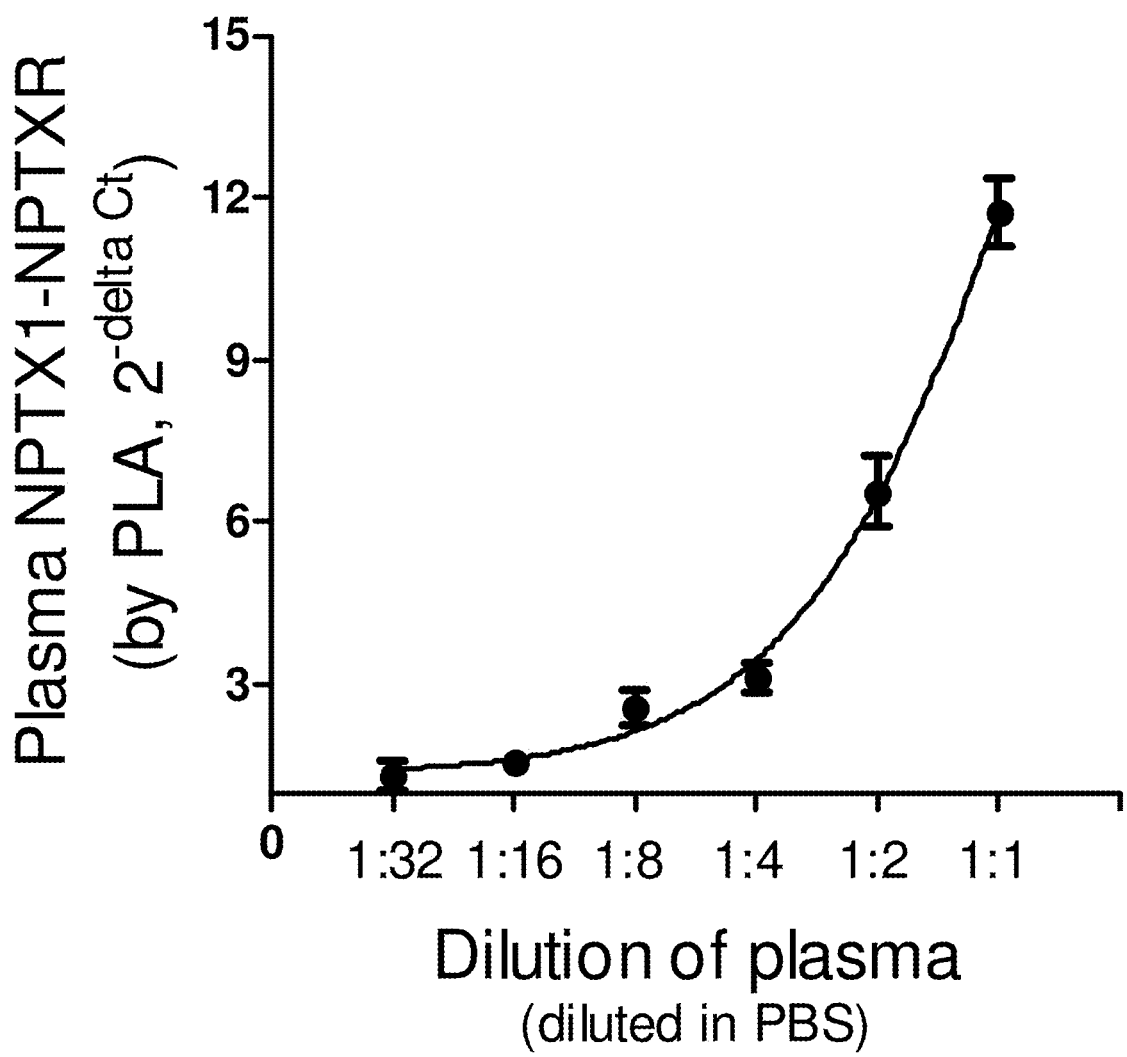
FIGS. 7A and 7B show dilution plots obtained from PLA experiments assaying the presence of neuronal pentraxin 1 (NPTX1)-NPTXR protein complexes in human plasma samples. Plasma samples were two-fold serially diluted in PBS (FIG. 7A) or NPTX1-depleted plasma (FIG. 7B). Solid lines represent four-parameter logistic regression applied to the dilution curve.
Figure 7B:
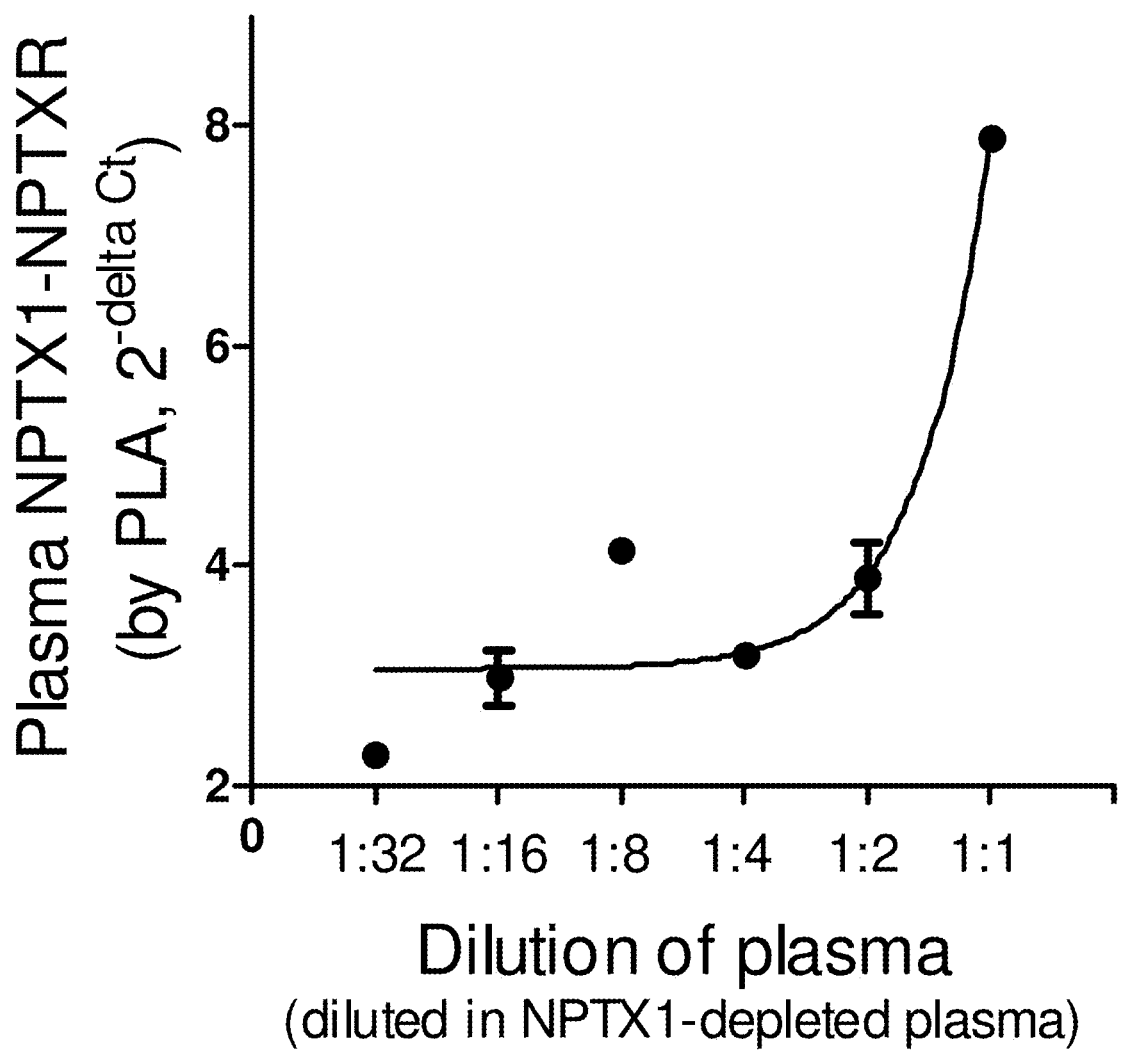

Example 4: Use of a Proximity Ligation Assay to Detect Synaptic Protein Complexes Containing Neuronal Pentraxin 1 and Neuronal Pentraxin Receptor in Human Blood The PLA assay described above was performed on human plasma samples to determine the presence of synaptic protein complexes containing neuronal pentraxin 1 (NPTX1) and NPTXR in the blood (NPTX1-NPTXR). The PLA assay was described as performed above, except that the immobilized antibody was a rabbit anti-NPTX1 antibody, and 1 µg/mL of oligonucleotide minus strand (SEQ ID NO: 2) conjugated to sheep anti-NPTXR antibody was used. Dilution curves were generated for human plasma samples serially diluted in PBS (FIG. 7A) or NPTX2-depleted plasma (FIG. 7B).

Figure 8A:
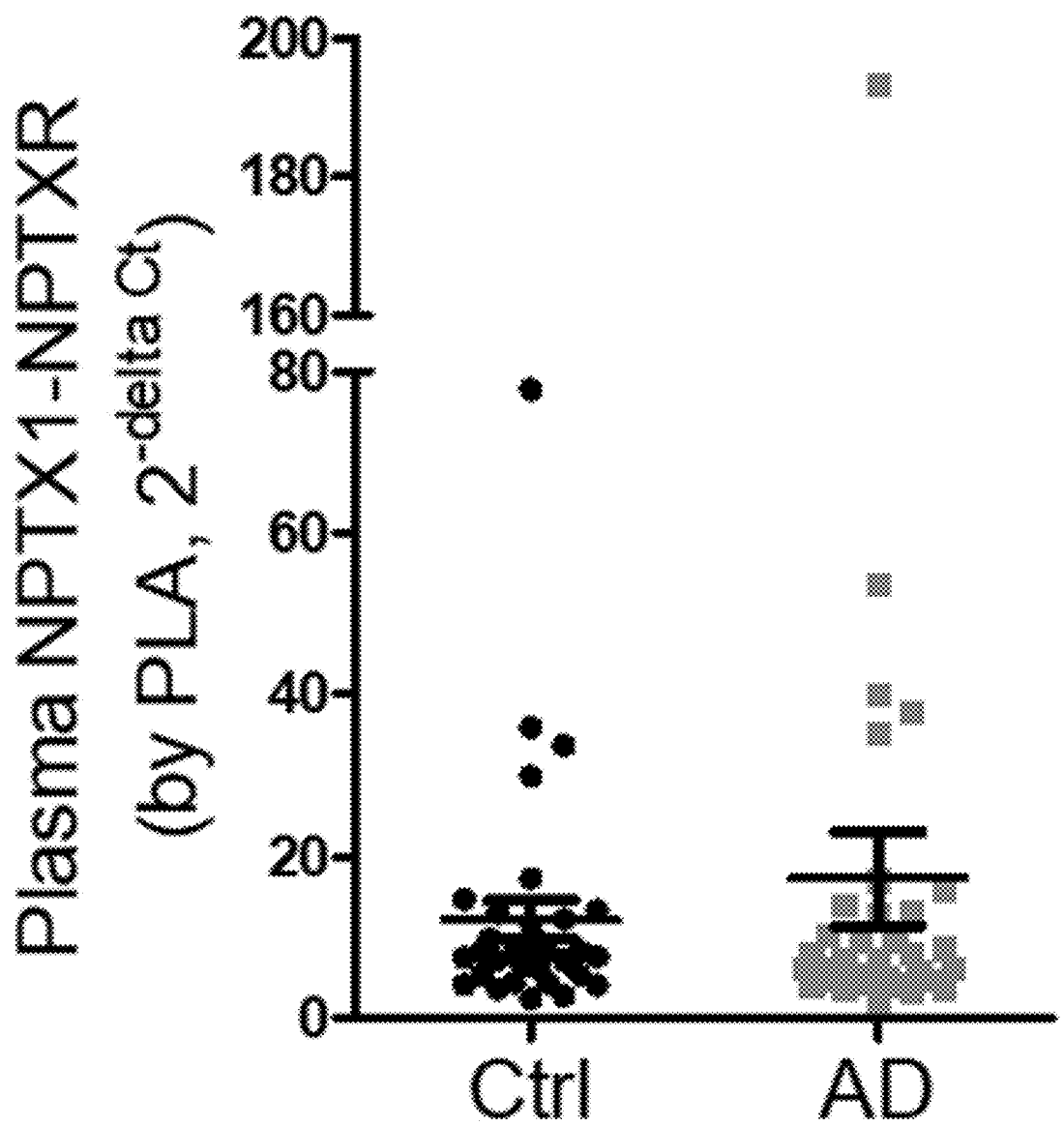
FIGS. 8A and 8B show scatter plots of quantified NPTX1-NPTXR and NPTX2-GluA4 protein complexes measured by PLA in plasma samples from clinically-diagnosed AD patients and matched healthy Ctrl patients. NPTX1-NPTXR levels tended to elevate in the AD group (FIG. 8A; Ctrl: n=34; AD: n=33). When taking the ratio of the levels of NPTX2-GluA4 complex to NPTX1-NPTXR complex (FIG. 8B), the AD group tended to show a reduction in the ratio as compared to the Ctrl group (Ctrl: n=34; AD: n=33; p=0.154, two-tailed t-test). Mean±SEM are superimposed as solid lines over the data points.
Figure 8B:
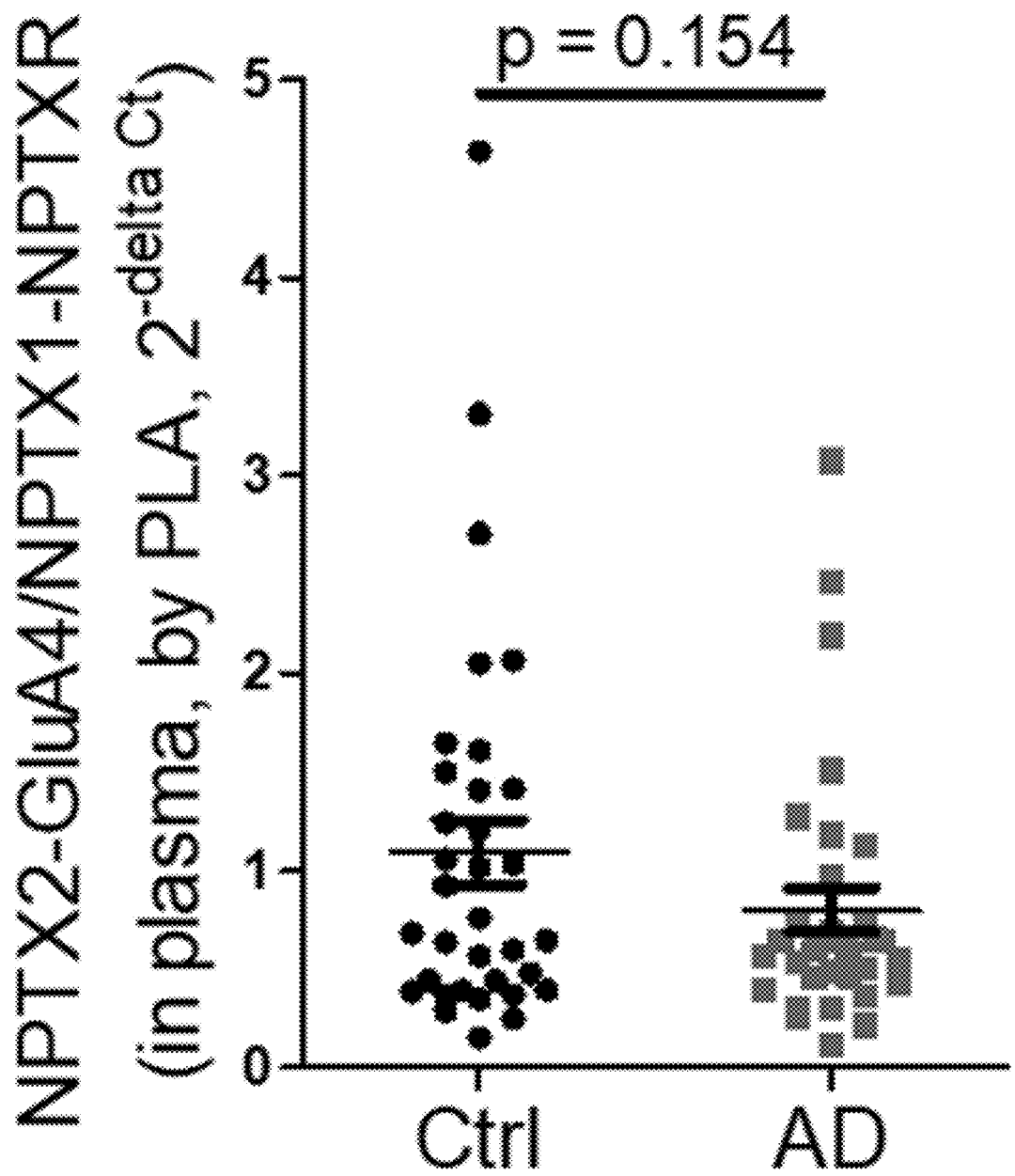

The NPTX1-NPTXR PLA assay described above was subsequently performed on 50 µL samples of plasma obtained from clinically-diagnosed AD patients (n=33) and matched healthy controls (Ctrl; n=34). Plasma levels of NPTX1-NPTXR did not show significant differences between Ctrl and AD patients (FIG. 8A). However, a ratio of plasma NPTX2-GluA4 levels to NPTX2-NPTXR levels showed a tendency to decrease in AD patients as compared to Ctrl patients (FIG. 8B; p=0.154, two-tailed t-test).

Summary

Figure 12:
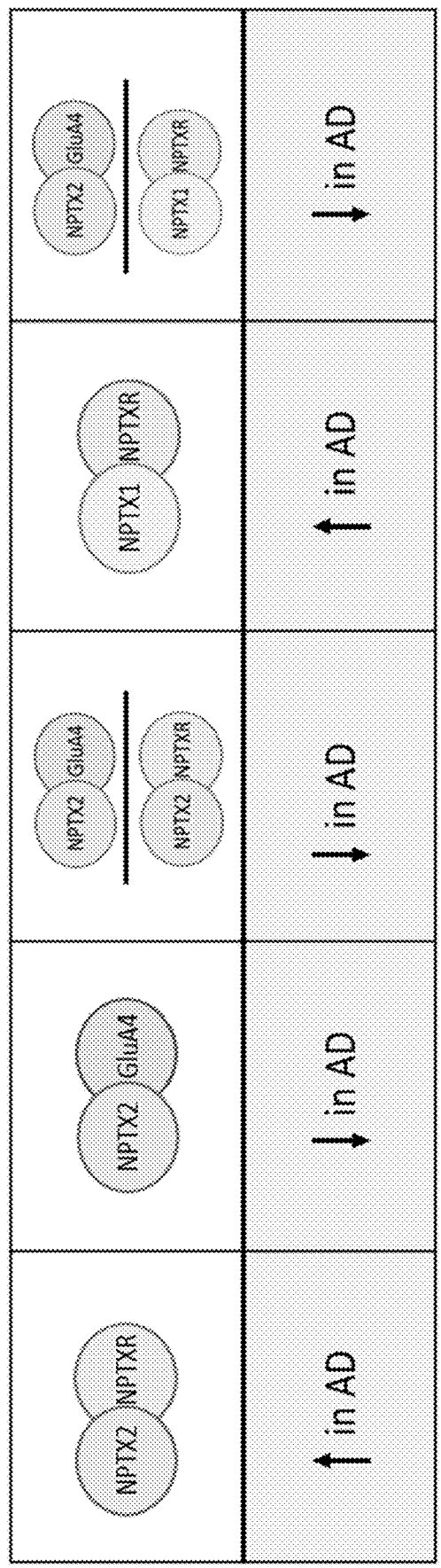
FIG. 12 shows a schematic summary of the aforementioned figures. NPTX2-NPTXR and NPTX1-NPTXR complexes tend to show increased levels in clinically-diagnosed AD patients, whereas NPTX2-GluA4 complexes or the ratios of NPTX2-GluA4 to NPTX2-NPTXR or NPTX2-GluA4 to NPTX1-NPTXR complexes tend to be reduced in AD patients. These findings demonstrate that neuronal pentraxin proteins are detectable in human blood using the PLA method of the disclosure and that the ratio of NPTX2-GluA4 to NPTX2-NPTXR can statistically distinguish between Ctrl and AD patients.

In conclusion, the above examples demonstrate that neuronal pentraxins are detectable in human blood using the disclosed PLA method. Of particular value is the finding that the ratio of blood NPTX2-GluA4 complex to NPTX2-NPTXR complex can be used to distinguish AD patients from healthy control patients (FIG. 12), thereby providing an avenue for employing the disclosed methods as a diagnostic or prognostic tool for neurological disorders, such as, e.g., AD, among others.

Example 5. Use of a Proximity Ligation Assay to Detect Synaptic Protein Complexes Containing Neuronal Pentraxin 2, Glutamate Ionotropic Receptor AMPA Subunit 4, and Neuronal Pentraxin Receptor in Human Blood In a larger sample of clinically-diagnosed AD patients, the PLA assay described above was performed on human plasma samples to determine the presence of synaptic protein complexes containing NPTX2 and GluA4 in the blood (NPTX2-GluA4). The NPTX2-GluA4 PLA assay was performed using 1 µg/mL of oligonucleotide minus strand conjugated to rabbit anti-GluA4 antibody. Additionally, the NPTX2-GluA4 PLA assay described above was additionally performed on 50 µL samples of plasma obtained from the same population of clinically-diagnosed AD patients and matched healthy controls.

Figure 9:
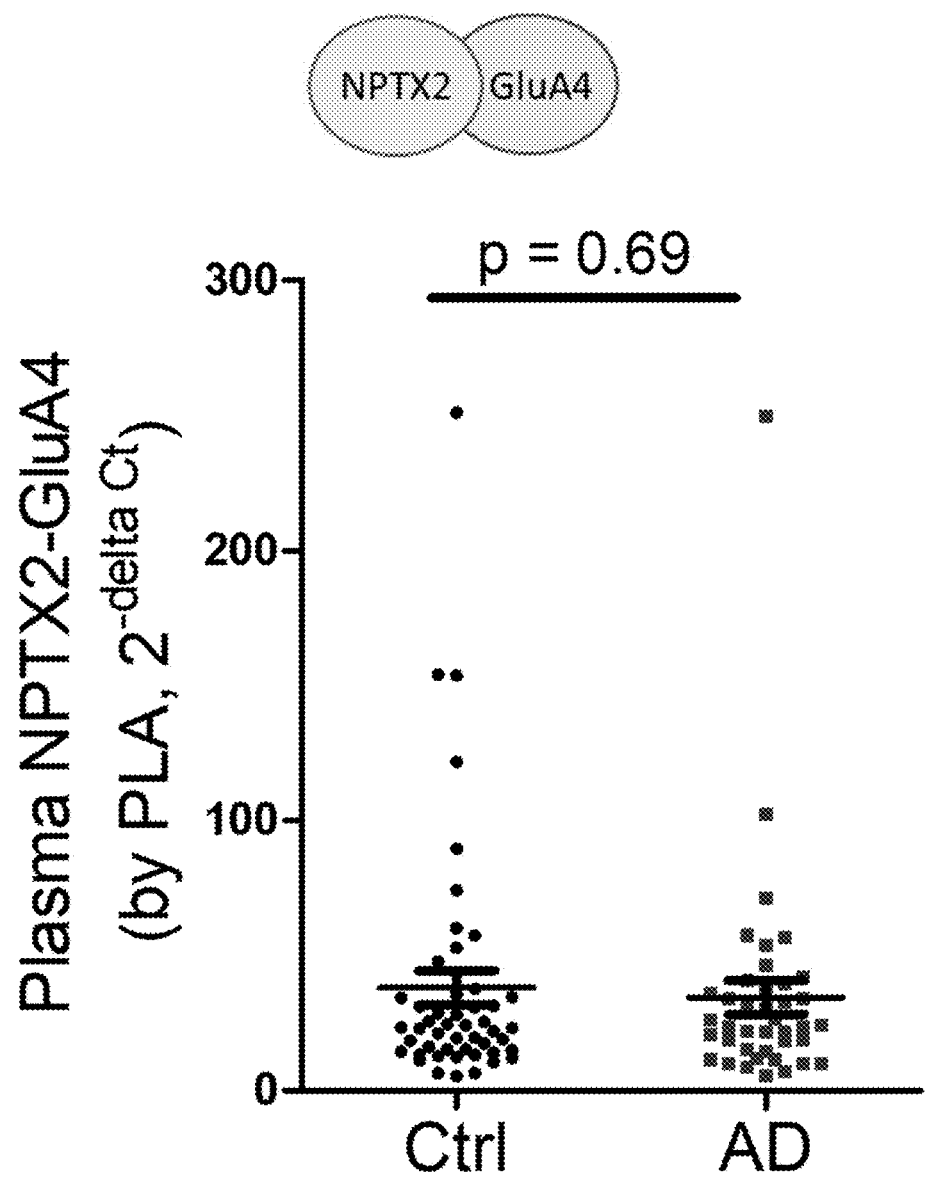
FIG. 9 shows a scatter plot of quantified NPTX2-GluA4 protein complexes measured by PLA in plasma samples from clinically-diagnosed AD patients and Ctrl (Ctrl: n=50; AD: n=40; p=0.69, two-tailed t-test). Mean±SEM are superimposed as solid lines over the data points.
Figure 10:
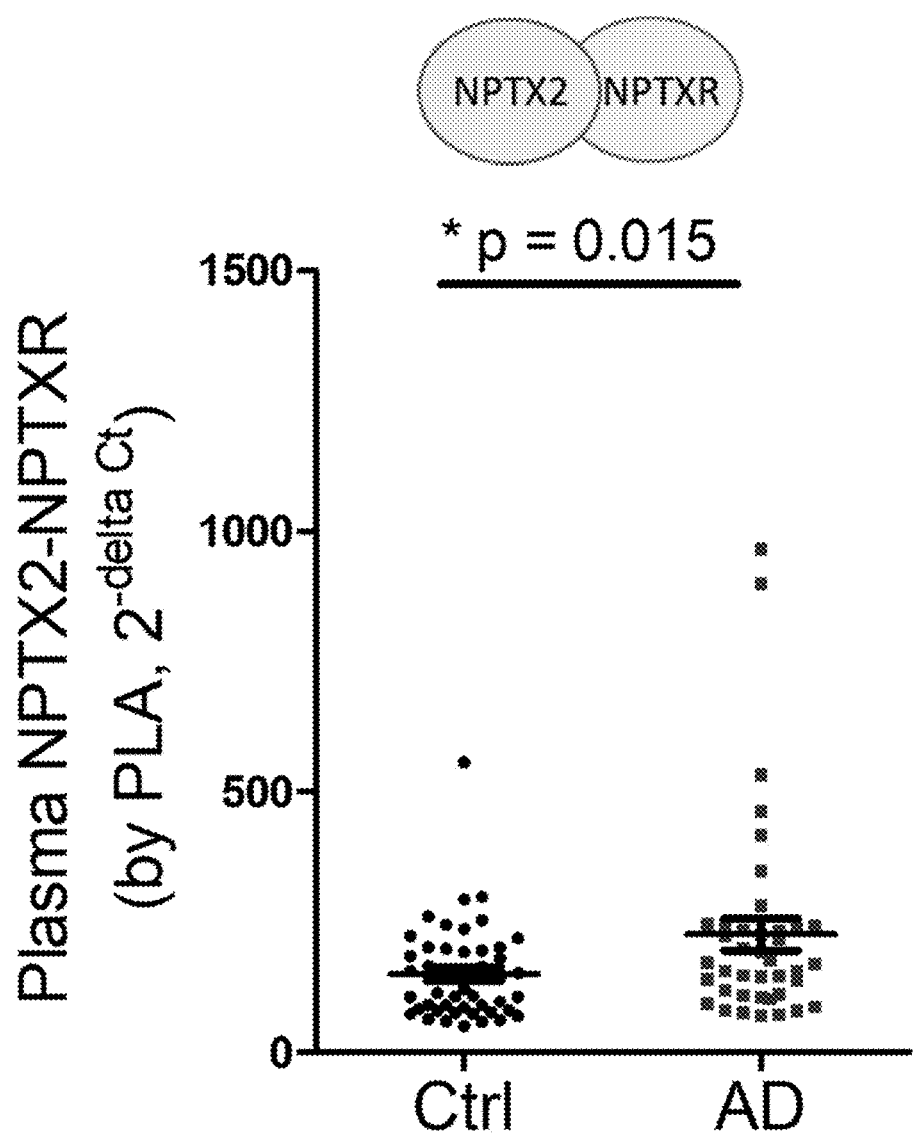
FIG. 10 shows a scatter plot of quantified NPTX2-NPTXR protein complexes measured by PLA in plasma samples from clinically-diagnosed AD patients and Ctrl. NPTX2-NPTXR levels were significantly elevated in the AD group (Ctrl: n=50; AD: n=40; p=0.015, two-tailed t-test). Mean±SEM are superimposed as solid lines over the data points.
Figure 11:
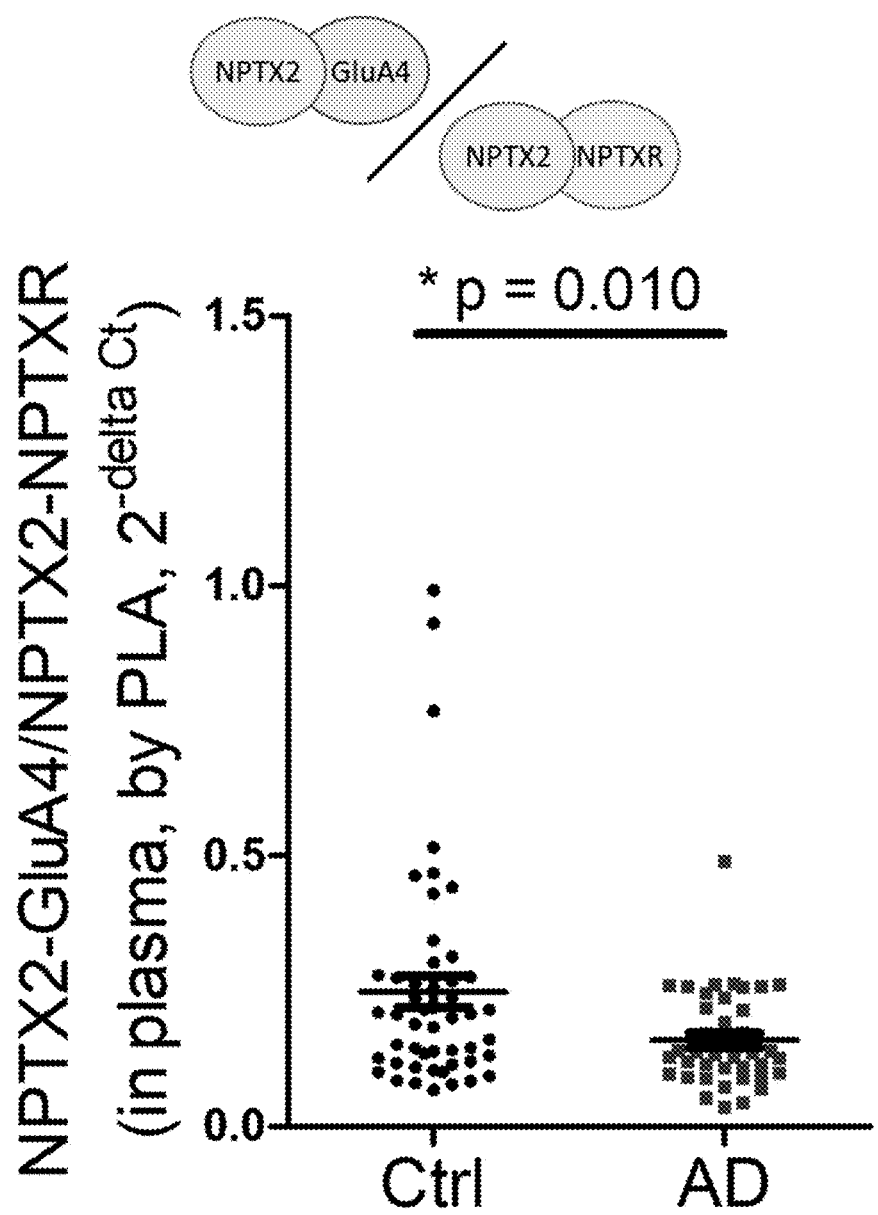
FIG. 11 shows a scatter plot of quantified NPTX2-GluA4 and NPTX2-NPTXR protein complexes measured by PLA in plasma samples from clinically-diagnosed AD patients and Ctrl. When taking the ratio of the levels of NPTX2-GluA4 complex (FIG. 9) to NPTX2-NPTXR complex (FIG. 10), the AD group showed a significant reduction in the ratio as compared to the Ctrl group (Ctrl: n=50; AD: n=40; p=0.010, two-tailed t-test). Mean±SEM are superimposed as solid lines over the data points.

In this larger population of subjects, plasma levels of NPTX2-GluA4 did not show significant differences between Ctrl and AD patients (FIG. 9). However, plasma levels of NPTX2-NPTXR did show significant differences between Ctrl and AD patients (FIG. 10). Furthermore, a ratio of plasma NPTX2-GluA4 levels to NPTX2-NPTXR levels showed a significant decrease in AD patients as compared to Ctrl patients (FIG. 11; p=0.010, two-tailed t-test). These findings further exemplify that the ratio of NPTX2-GluA4 to NPTX2-NPTXR levels in human blood samples can be used to stratify AD patients from healthy control patients.

OTHER EMBODIMENTS

Various modifications and variations of the described disclosure will be apparent to those skilled in the art without departing from the scope and spirit of the disclosure. Although the disclosure has been described in connection with specific embodiments, it should be understood that the disclosure as claimed should not be unduly limited to such specific embodiments. Indeed, various modifications of the described modes for carrying out the disclosure that are obvious to those skilled in the art are intended to be within the scope of the disclosure.

Other embodiments are in the claims.

The invention claimed is:

1. A method of identifying a subject as having or at risk of developing Alzheimer's disease, the method comprising:
   (i) contacting a blood sample obtained from the subject with a first affinity ligand specific to a first synaptic protein selected from neuronal pentraxin 2 (NPTX2) and glutamate ionotropic receptor AMPA type subunit 4 (GluA4) and a second affinity ligand specific to a second synaptic protein selected from NPTX2 and GluA4 wherein the first and second synaptic proteins are different proteins and are in a first complex, wherein the contacting produces a second complex comprising the first affinity ligand, the first synaptic protein, the second affinity ligand, and the second synaptic protein, and wherein the first affinity ligand is conjugated to a first oligonucleotide plus strand and the second affinity ligand is conjugated to a first oligonucleotide minus strand;
   (ii) contacting the second complex with a first single-stranded connector oligonucleotide and a ligase enzyme, thereby producing a first ligated plus-minus oligonucleotide strand (LPMOS), wherein the first LPMOS is capable of hybridizing to a first forward primer oligonucleotide and a first reverse primer oligonucleotide;
   (iii) performing amplification on the first LPMOS, wherein the amplification produces a first proximity signal when the first synaptic protein is within a proximity distance threshold with respect to the second synaptic protein; and
   (iv) detecting the first proximity signal in the blood sample, wherein the proximity signal indicates an amount of the first complex in the blood sample;
   (v) contacting the blood sample obtained from the subject with a third affinity ligand specific to a third synaptic protein selected from NPTX2 and neuronal pentraxin receptor (NPTXR) and a fourth affinity ligand specific to a fourth synaptic protein selected from NPTX2 and NPTXR, wherein the third and fourth synaptic proteins are different proteins and are in a third complex, wherein the contacting produces a fourth complex comprising the third affinity ligand, the third synaptic protein, the fourth affinity ligand, and the fourth synaptic protein, and wherein the third affinity ligand is conjugated to a second oligonucleotide plus strand and the fourth affinity ligand is conjugated to a second oligonucleotide minus strand;
   (vi) contacting the fourth complex with a second single-stranded connector oligonucleotide and the ligase enzyme, thereby producing a second LPMOS, wherein the second LPMOS is capable of hybridizing to a second forward primer oligonucleotide and a second reverse primer oligonucleotide;
   (vii) performing amplification on the second LPMOS, wherein the amplification produces a second proximity signal when the third synaptic protein is within a proximity distance threshold with respect to the fourth synaptic protein;
   (viii) detecting the second proximity signal in the blood sample, wherein the proximity signal indicates an amount of the third complex in the blood sample; and
   (ix) quantifying a ratio of the first complex to the third complex by dividing the amount of the first complex by the amount of the third complex;
   wherein a decrease in the ratio of the first complex to the third complex in the blood sample of the subject as compared to a ratio of the first complex to the third complex in a reference blood sample identifies the subject as having or at risk of developing Alzheimer's disease.

2. The method of claim 1, wherein the method further comprises contacting the blood sample with an immobilized affinity ligand specific to the first synaptic protein.

3. The method of claim 1, wherein the Alzheimer's disease is sporadic Alzheimer's disease or familial Alzheimer's disease.

4. The method of claim 1, wherein the amplification is performed using quantitative real-time polymerase chain reaction.

5. The method of claim 1, wherein the subject is a human.

6. The method of claim 1, wherein the reference blood sample is a blood sample that has been obtained from a reference subject or population of subjects that do not have or are not suspected of having Alzheimer's disease.

7. A method of selecting a subject identified as having or at risk of developing Alzheimer's disease for treatment with a therapeutic agent, the method comprising:
   (i) contacting a blood sample obtained from the subject with a first affinity ligand specific to a first synaptic protein selected from neuronal pentraxin 2 (NPTX2) and glutamate ionotropic receptor AMPA type subunit 4 (GluA4) and a second affinity ligand specific to a second synaptic protein selected from NPTX2 and GluA4 wherein the first and second synaptic proteins are different proteins and are in a first complex, wherein the contacting produces a second complex comprising the first affinity ligand, the first synaptic protein, the second affinity ligand, and the second synaptic protein, and wherein the first affinity ligand is conjugated to a first oligonucleotide plus strand and the second affinity ligand is conjugated to a first oligonucleotide minus strand;
   (ii) contacting the second complex with a first single-stranded connector oligonucleotide and a ligase enzyme, thereby producing a first ligated plus-minus oligonucleotide strand (LPMOS), wherein the first LPMOS is capable of hybridizing to a first forward primer oligonucleotide and a first reverse primer oligonucleotide;
   (iii) performing amplification on the first LPMOS, wherein the amplification produces a first proximity signal when the first synaptic protein is within a proximity distance threshold with respect to the second synaptic protein; and
   (iv) detecting the first proximity signal in the blood sample, wherein the proximity signal indicates an amount of the first complex in the blood sample;
   (v) contacting the blood sample obtained from the subject with a third affinity ligand specific to a third synaptic protein selected from NPTX2 and neuronal pentraxin receptor (NPTXR) and a fourth affinity ligand specific to a fourth synaptic protein selected from NPTX2 and NPTXR, wherein the third and fourth synaptic proteins are different proteins and are in a third complex, wherein the contacting produces a fourth complex comprising the third affinity ligand, the third synaptic protein, the fourth affinity ligand, and the fourth synaptic protein, and wherein the third affinity ligand is conjugated to a second oligonucleotide plus strand and the fourth affinity ligand is conjugated to a second oligonucleotide minus strand;
   (vi) contacting the fourth complex with a second single-stranded connector oligonucleotide and the ligase enzyme, thereby producing a second LPMOS, wherein the second LPMOS is capable of hybridizing to a second forward primer oligonucleotide and a second reverse primer oligonucleotide;
   (vii) performing amplification on the second LPMOS, wherein the amplification produces a second proximity signal when the third synaptic protein is within a proximity distance threshold with respect to the fourth synaptic protein;
   (viii) detecting the second proximity signal in the blood sample, wherein the proximity signal indicates an amount of the third complex in the blood sample; and
   (ix) quantifying a ratio of the first complex to the third complex by dividing the amount of the first complex by the amount of the third complex;
   wherein the subject is selected for treatment with the therapeutic agent if the ratio of the first complex to the third complex in the blood sample of the subject is decreased as compared to a ratio of a first complex to the third complex in a reference blood sample.

8. A method of assessing resilience in a subject who may have or may be at risk of developing a neurodegenerative disorder, the method comprising:
   (i) contacting a blood sample obtained from the subject with a first affinity ligand specific to a first synaptic protein selected from neuronal pentraxin 2 (NPTX2) and glutamate ionotropic receptor AMPA type subunit 4 (GluA4) and a second affinity ligand specific to a second synaptic protein selected from NPTX2 and GluA4 wherein the first and second synaptic proteins are different proteins and are in a first complex, wherein the contacting produces a second complex comprising the first affinity ligand, the first synaptic protein, the second affinity ligand, and the second synaptic protein, and wherein the first affinity ligand is conjugated to a first oligonucleotide plus strand and the second affinity ligand is conjugated to a first oligonucleotide minus strand;
   (ii) contacting the second complex with a first single-stranded connector oligonucleotide and a ligase enzyme, thereby producing a first ligated plus-minus oligonucleotide strand (LPMOS), wherein the first LPMOS is capable of hybridizing to a first forward primer oligonucleotide and a first reverse primer oligonucleotide;
   (iii) performing amplification on the first LPMOS, wherein the amplification produces a first proximity signal when the first synaptic protein is within a proximity distance threshold with respect to the second synaptic protein; and
   (iv) detecting the first proximity signal in the blood sample, wherein the proximity signal indicates an amount of the first complex in the blood sample;
   (v) contacting the blood sample obtained from the subject with a third affinity ligand specific to a third synaptic protein selected from NPTX2 and neuronal pentraxin receptor (NPTXR) and a fourth affinity ligand specific to a fourth synaptic protein selected from NPTX2 and NPTXR, wherein the third and fourth synaptic proteins are different proteins and are in a third complex, wherein the contacting produces a fourth complex comprising the third affinity ligand, the third synaptic protein, the fourth affinity ligand, and the fourth synaptic protein, and wherein the third affinity ligand is conjugated to a second oligonucleotide plus strand and the fourth affinity ligand is conjugated to a second oligonucleotide minus strand;
   (vi) contacting the fourth complex with a second single-stranded connector oligonucleotide and the ligase enzyme, thereby producing a second LPMOS, wherein the second LPMOS is capable of hybridizing to a second forward primer oligonucleotide and a second reverse primer oligonucleotide;
   (vii) performing amplification on the second LPMOS, wherein the amplification produces a second proximity signal when the third synaptic protein is within a proximity distance threshold with respect to the fourth synaptic protein;

(viii) detecting the second proximity signal in the blood sample, wherein the proximity signal indicates an amount of the third complex in the blood sample; and
(ix) quantifying a ratio of the first complex to the third complex by dividing the amount of the first complex by the amount of the third complex;
wherein the subject is determined to not be resilient to the Alzheimer's disease if the ratio of the first complex to the third complex in the blood sample of the subject is decreased as compared to a ratio of the first complex to the third complex in a reference blood sample, wherein the subject is determined to be resilient to the Alzheimer's disease if the ratio of the first complex to the third complex in the blood sample of the subject is unchanged or increased as compared to a ratio of the first complex to the third complex in the reference blood sample.

\* \* \* \* \*